US006426751B1

(12) United States Patent
Patel et al.

(10) Patent No.: US 6,426,751 B1
(45) Date of Patent: Jul. 30, 2002

(54) FONT FEATURE FILE PROCESSING

(75) Inventors: Sairus P. Patel, Palo Alto; Jeremy A. Hall, San Jose, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/286,366

(22) Filed: Apr. 1, 1999

(51) Int. Cl.[7] .............................................. G06T 11/00
(52) U.S. Cl. ....................................... 345/468; 345/471
(58) Field of Search ................................ 345/467–469, 345/471, 472, 947, 948, 462, 468

(56) References Cited

U.S. PATENT DOCUMENTS

| | | | | |
|---|---|---|---|---|
| 4,594,674 A | * | 6/1986 | Boulia et al. ................ | 364/523 |
| 4,827,530 A | * | 5/1989 | Yamaguchi et al. ........... | 382/13 |
| 5,506,940 A | * | 4/1996 | Bamford et al. ............. | 395/110 |
| 5,533,180 A | * | 7/1996 | Zhou et al. .................. | 395/150 |
| 5,726,768 A | * | 3/1998 | Ishikawa et al. ............. | 358/442 |
| 5,803,629 A | * | 9/1998 | Neville et al. ............... | 400/304 |

OTHER PUBLICATIONS

Macromedia Fontographer User's manual version 4.1, Aug. 1993, Altsys Corporation, Second Edition, p. 314.*
Macromedia Fontographer User's manual version 4.1, Aug. 1993, Altsys Corporation, Second Edition, pp. 5–11, & 18.*
Apple Computer, "Making Newton OS Fonts," downloaded from www./fonts.apple.com/Newton/Index.html, 6 pgs, (Apr. 13, 1999).
Apple Computer, "How GX does Justification" Introduction, downloaded from www.fonts.apple.com/WhitePapers/GX-Justification.html, 3 pgs, (Feb. 4, 1998).
Apple Computer, "Adding Basic AAT Support to a Font," downloaded from www./fonts.apple.com/Adding AAT/, 6pgs. (published before Apr. 1, 1999).
Apple Computer, "About the AAT Font Tool," Introduction, downloaded from www./fonts.apple.com/tooldir/, 2 pgs, published before Apr. 1, 1999).
Apple Computer, "How to Use Add Lists," Introduction, downloaded from www.fonts.apple.com./Tools/ tooldir/, 6 pgs, (published before Apr. 1, 1999).
Apple Computer, "Font Tools," Introduction, downloaded from www.fonts.apple.com/Tools/Index.html, 6 pgs, (published before Apr. 1, 1999).
Apple Computer, "Using Justification Input Files," Introduction, downloaded from www.fonts.apple.com/Tools/tooldir/, 11 pgs, (published before Apr. 1, 1999).
Apple Computer, "About Morph Input Files," Introduction, downloaded from www.fonts.apple.com/Tools/tooldir/, 12 pgs, (published before Apr. 1, 1999).
Apple Computer, "The 'mort' table," Introduction, downloaded from www.fonts.apple.com/TTRefMan/RM06/Chap6mrt.html, 17 pgs, (Sep. 30, 1996).
Apple Computer, "The 'just' table" Introduction, downloaded from www.fonts.apple.com/TTRefMan/RMO6/Chap6just.html, 18 pgs, (Sep. 30, 1996.

* cited by examiner

*Primary Examiner*—Jeffery Brier
*Assistant Examiner*—J. F. Cunningham
(74) *Attorney, Agent, or Firm*—Fish & Richardson P.C.

(57) ABSTRACT

Methods and apparatus that process a front-end editable text file—a feature file—that specifies features for a font, and in particular to an OpenType™ font. The specified features are parsed and stored in the font as font data. The feature file contains simple logic statements for the specification of various typographical features, such as layout features, expressed in a high-level feature definition language. The feature file may contain override values for fields in font tables. The feature file can be processed in combination with an existing font file to establish an enhanced font file.

25 Claims, 4 Drawing Sheets

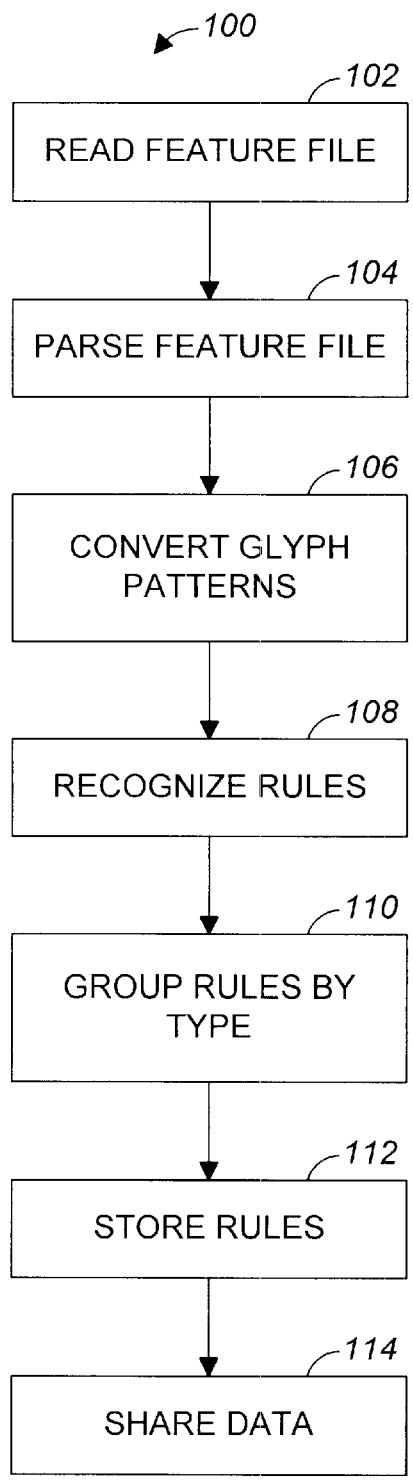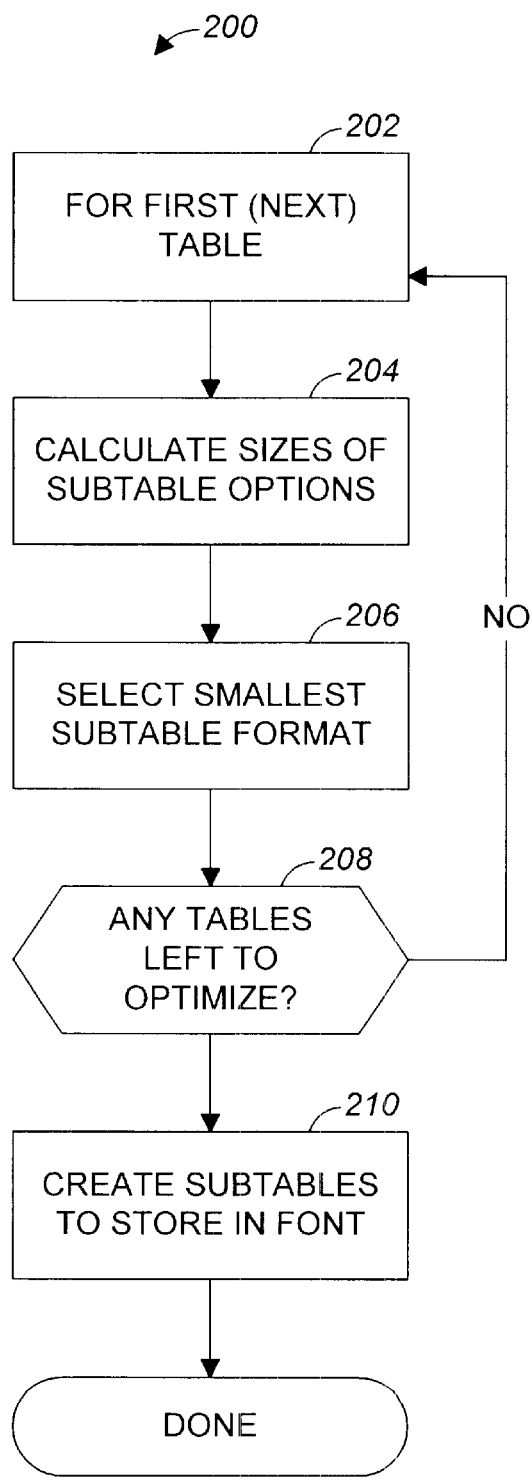
FIG. 1
FIG. 2

FONT FEATURE FILE PROCESSING

BACKGROUND OF THE INVENTION

The present invention relates to the conversion and modification of digital fonts.

A set of characters with a particular design is called a "typeface". A digital font (referred to here simply as a "font"), such as a PostScript® font available from Adobe Systems Incorporated of San Jose, Calif. ("Adobe"), generally includes instructions (normally read and interpreted by rendering programs executing on programmable processors) for rendering characters in a particular typeface.

The OpenType™ font format was jointly developed by Adobe and Microsoft Corporation of Redmond, Wash. ("Microsoft").

OpenType fonts include a variety of tables, and optionally include OpenType Layout tables, which allow font creators to design better international and high-end typographic fonts. The OpenType Layout tables contain information on glyph substitution, glyph positioning, justification, and baseline positioning, enabling text-processing applications to improve text layout. The tables contain binary data representing typographic features, which can in that form be added to OpenType fonts. For example, the glyph substitution ('GSUB') table in an OpenType font can contain a ligature ('liga') feature that could specify that adjacent f and i glyphs in a body of text set in the font be replaced by the fi ligature glyph in the font. Traditionally, such tables have been created by writing specific programs to generate the binary data or by first preparing a text input file that details the values that go into each font table data structure, and then running a tool that assembles the textual representation into the binary form required by OpenType. The first of these approaches lacks flexibility while the latter, exemplified by the True Type Open Assembler (TTOASM) developed by Microsoft, is very low level and requires complete knowledge of the underlying data structures and is thus unsuitable for font editors who tend to have graphic arts training rather than computer science backgrounds.

SUMMARY OF THE INVENTION

The invention provides methods and apparatus that process a front-end editable text file—which will be referred to as a feature file—that a user (such as a font editor) can use to define changes to an existing font file, such as an OpenType™ font file, or to create a font file. The feature file contains simple logic statements for the specification of various typographical features, such as layout features, that may enhance or supplement a source font. The feature file may contain override values for fields in font tables. The feature file can be processed in combination with an existing font file to establish an enhanced font file.

In general, in one aspect, the invention features a method of adding typographic features to a font. The method includes providing a feature file containing feature definitions expressed in a high-level feature definition language; reading and parsing the feature file in a computer program to generate internal representations of the feature definitions and storing the internal representation in computer memory; converting the feature definitions into font table or subtable definitions; and writing out the table or subtable definitions into a font file.

In general, in another aspect, the invention features a system operable to add typographic features to a font. The system includes a programmable computer having an instruction processor, random access memory, and data file memory; means for reading a feature file containing feature definitions expressed in a high-level feature definition language; means for parsing the feature file to generate internal representations of the feature definitions; means for storing the internal representation in the random access memory; means for converting the feature definitions into font table or subtable definitions; and means for writing out the table or subtable definitions into a font file stored in the data file memory.

In general, in another aspect, the invention features a computer program product, tangibly stored on a computer-readable medium, for adding typographic features to a font. The product includes instructions operable to cause a computer to read a feature file containing feature definitions expressed in a high-level feature definition language; to parse the feature file to generate internal representations of the feature definitions; to store the internal representation in a memory; to convert the feature definitions into font table or subtable definitions; and to write out the table or subtable definitions into a font file.

In its various implementations, the invention can include one or more of the following advantageous features. The invention reads the feature file, including any other files included by an include mechanism, and extracts the rules, reporting any errors found in the feature file. It groups the rules appropriately by type and decides what table and subtable format to use for each group of rules. A specific font table or subtable can be identified inferentially from a substitution rule statement. Shared data structures can be created without user intervention from the feature definitions and redundancies can be removed before writing out the feature definitions into a font file. The feature definition language can be defined without constructs to express a subtable format selection.

Advantages that can be seen in implementations of the invention include one or more of the following. The flexible form in which user-defined features can be specified in the feature file accommodates a wide variety of font characteristics. Font features are specified using an English-like grammar in a data file which may be created and modified using any text editor. This provides great flexibility and considerably facilitates the task of the font editor who is producing or modifying a font. The font editor does not have to know details of the underlying data structures. The user can use language constructs that are not limited to a one-to-one correspondence with font data structures. The appropriate format of subtables is automatically selected. Modification to the font is made in a manner that facilitates efficient file storage. Optimizations are performed on shared data, which reduces the size of the font. A mechanism to include other files can be used to share data that is standard across fonts. A parser provides error feedback to the editor when errors are encountered in the feature file. A glyph name-aliasing mechanism can be used. Algorithmic creation of an all alternates (aalt) feature is provided.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a flowchart of a method of the invention.

FIG. 2 is a flowchart of a method of the invention.

Like reference numbers and designations in the various drawings indicate like elements.

DETAILED DESCRIPTION

As shown in FIG. 1, a feature file processing method 100 in accordance with the invention processes a front-end editable text file, which will be referred to as a feature file. A user of a computer system implementing the method can use a feature file to define changes to an existing font file, and in particular to an OpenType™ font file, or to create a font file. The feature file contains simple logic statements for the specification of various typographical features-, such as layout features, that may enhance or supplement a source font. The feature file may contain override values for fields in the font tables. The feature file contains feature definitions expressed in a high-level feature definition language, a specification for which is found in Appendix A, below. As can be seen from that specification, the language is based on declarative logic statements expressed in an English-like grammar. In alternative embodiments, the statements of the feature definition language can be expressed a natural-language-like grammar for a natural language other than English.

Returning to FIG. 1, the feature file is read (step 102) and parsed (step 104).

During the parsing of the feature file, the glyph patterns of each rule are first converted into an internal representation—illustrated in FIG. 3 and described below—that allows for glyph patterns of unlimited complexity and length (step 106). The glyph name or CID number is first converted to a glyph ID. Conversion to glyph IDs is important because all OpenType layout tables refer to glyphs in terms of their glyph IDs, and not in terms of glyph names or CID numbers. If a glyph aliasing database (e.g., optional database 450, FIG. 4) is being used, then it is referenced to derive the final glyph name. A glyph aliasing database can be implemented quite simply as a text file with two fields per line—separated by white space, for example—one field a user-friendly glyph name, the other field a final glyph name that would be used in a font. For example, final glyph name "uni0394" may be aliased to a more recognizable name "Delta.greek" in the glyph alias database; if this is done and the database is used, the glyph can then be referred to as "Delta.greek" in the feature file.

A "glyph node" (data type: GNode) is then created for each glyph in every rule. The GNode contains the glyph ID, a flags field, and a next sequence and next class pointer to other GNodes, as follows:

```
typedef struct GNode_GNode;
struct GNode_
{
short flags;         /* Glyph node attributes */
GID gid;             /* Glyph ID */
GNode *nextSeq;      /* next element in sequence */
GNode *nextCl;       /* next element of class */
}
```

Figure 3:
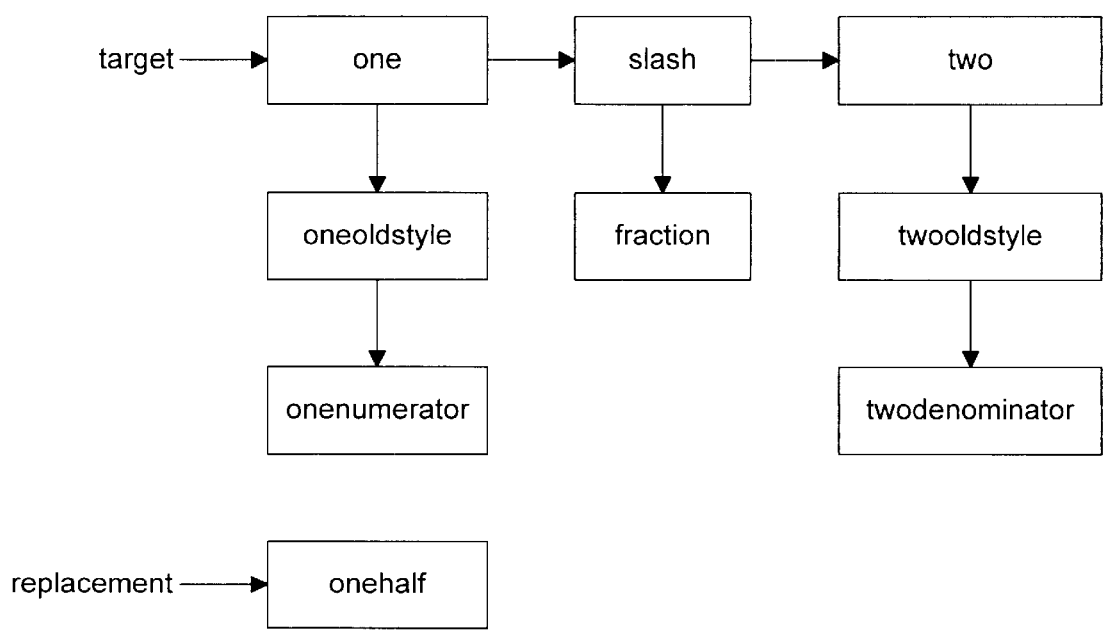
FIG. 3 is a graph of a data structure used in an implementation of the invention.

For example, and referring to FIG. 3, where the glyph classes @ONE and @TWO are defined as @ONE=[one oneoldstyle onenumerator];
@TWO=[two twooldstyle twodenominator];
the feature file rule:
sub @ONE [slash fraction] @TWO by onehalf;
will be internally represented by a target and replacement, both of which are pointers to GNodes. This example is illustrated in FIG. 3, where glyph names, rather than glyph IDs, are shown for the sake of clarity. Arrows pointing to the right in FIG. 3 represent the nextSeq field; arrows pointing downward represent the nextCl field.

Every type of substitution rule can be reduced to a target pattern and one or more replacement patterns, and every type of positioning rule can be reduced to a target pattern with associated positioning information.

Returning to what is shown in FIG. 1, rules are recognized (step 108), grouped by type (step 110), and read into (i.e., stored in) dynamically-allocated arrays of memory (step 112). For example, runs of specific kern pairs are grouped separately from runs of class kern pairs, because this is the way they need to be stored in the font.

Various pieces of data are shared when possible by accumulating them in appropriate bins and weeding out duplicates (step 114). Each set of rules is internally given a label; when sets of rules need to be shared or can be shared, they are assigned the same internal label so that at data-writing time they are stored only once in the font. For example, if two separate GSUB features operate on the same set of target glyphs, then this range of glyphs will be stored only once and pointed to by each of the two features. Glyph classes, i.e., sets of glyphs, are represented as linked lists of glyphs, with reuse of memory once the class data is not needed any more. In alternative embodiments, other data structures can be used.

As shown in FIG. 2, a method 200 in accordance with the invention translates the internal representations derived from the feature file and creates the actual subtables and other data to be stored in the font. For each table (steps 202 and 208), subtable optimizations are performed by first calculating the sizes of the various subtables format options (step 204) and then selecting the smallest one (step 206). This means that the font editor does not need to (and, in fact, cannot) specify which subtable format to use when several are available.

Then, the subtables and other output data are created (step 210). The internal representations of the rules expressed in the feature file are transformed into the corresponding font data format. The formats and semantics of pertinent OpenType font tables and subtables are set forth in OpenType reference material available from Adobe and Microsoft, some of which information is reproduced in Appendix C, below.

Figure 4:
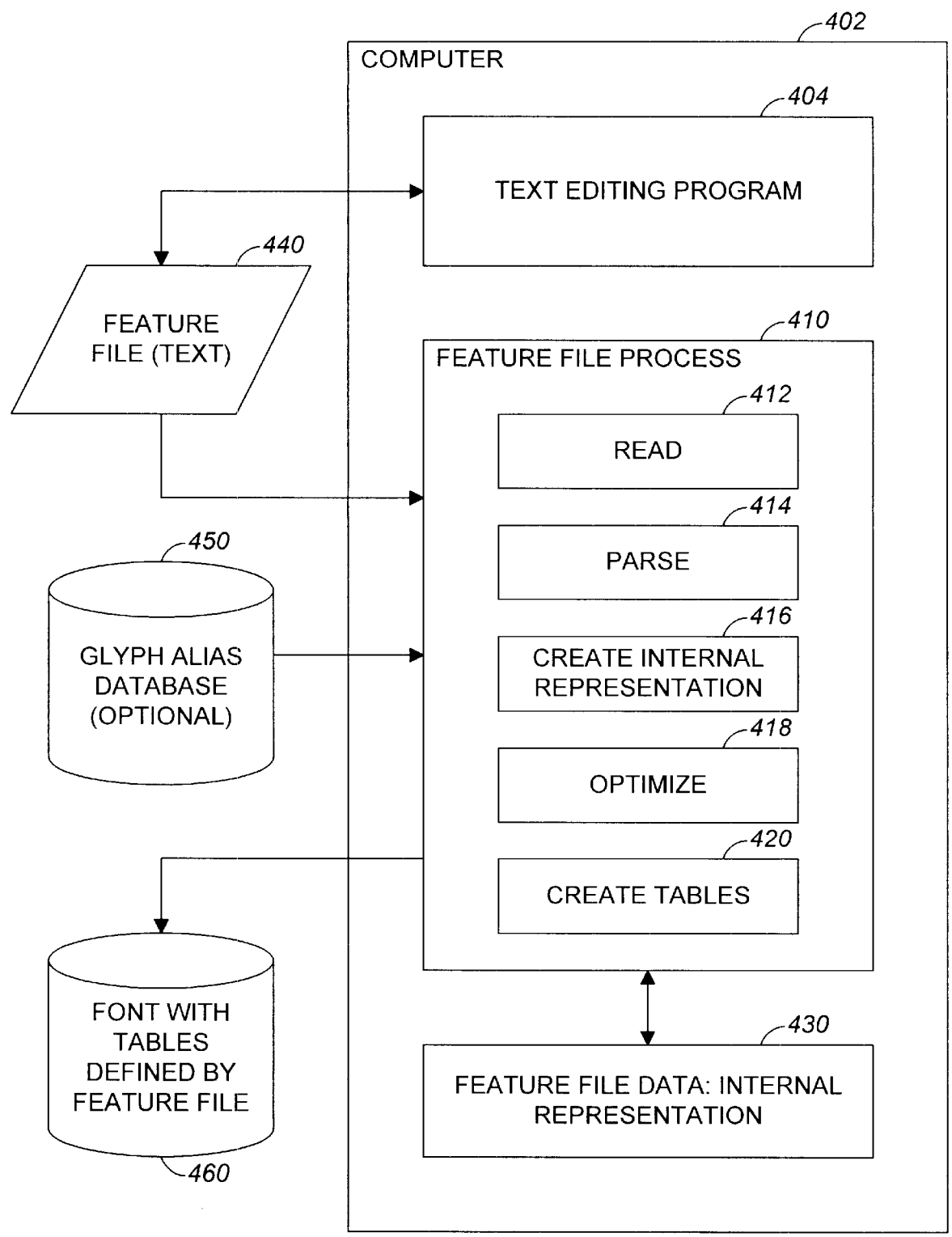
FIG. 4 is a schematic diagram of a computer implementation of the invention.

As shown in FIG. 4, a computer system 402 can be used to define changes to a font, such a font stored in a font file 460, which may also be an input font file providing information such as a glyphName to glyphID mapping. A feature file 440 can be created by a user executing any text editing program 404 on system 402 or on any other system that can create and edit text files. A feature file processing process 410, the feature processor, operates read the feature file and perform the operations described above in reference to FIG. 1 and FIG. 2. The process 410 can be programmed in any convenient manner using any convenient programming language; for example, it can be organized into modules that read (module 412) and parse (module 414) the feature file 440, that create internal representations 430 of the feature file statements (module 416), that optimize the internal representations (module (418), and that create tables and other output (module 420). The process 410 can use an optional glyph alias database 450, as was described earlier. In one implementation, a feature file is compiled and the rules extracted from the feature file are fed into table creation modules 416. In this implementation, the interface to the table creation modules 416 is extremely simple as a result of the GNode representation—the creation process being defined by the target and the replacement GNodes.

Figure 5:
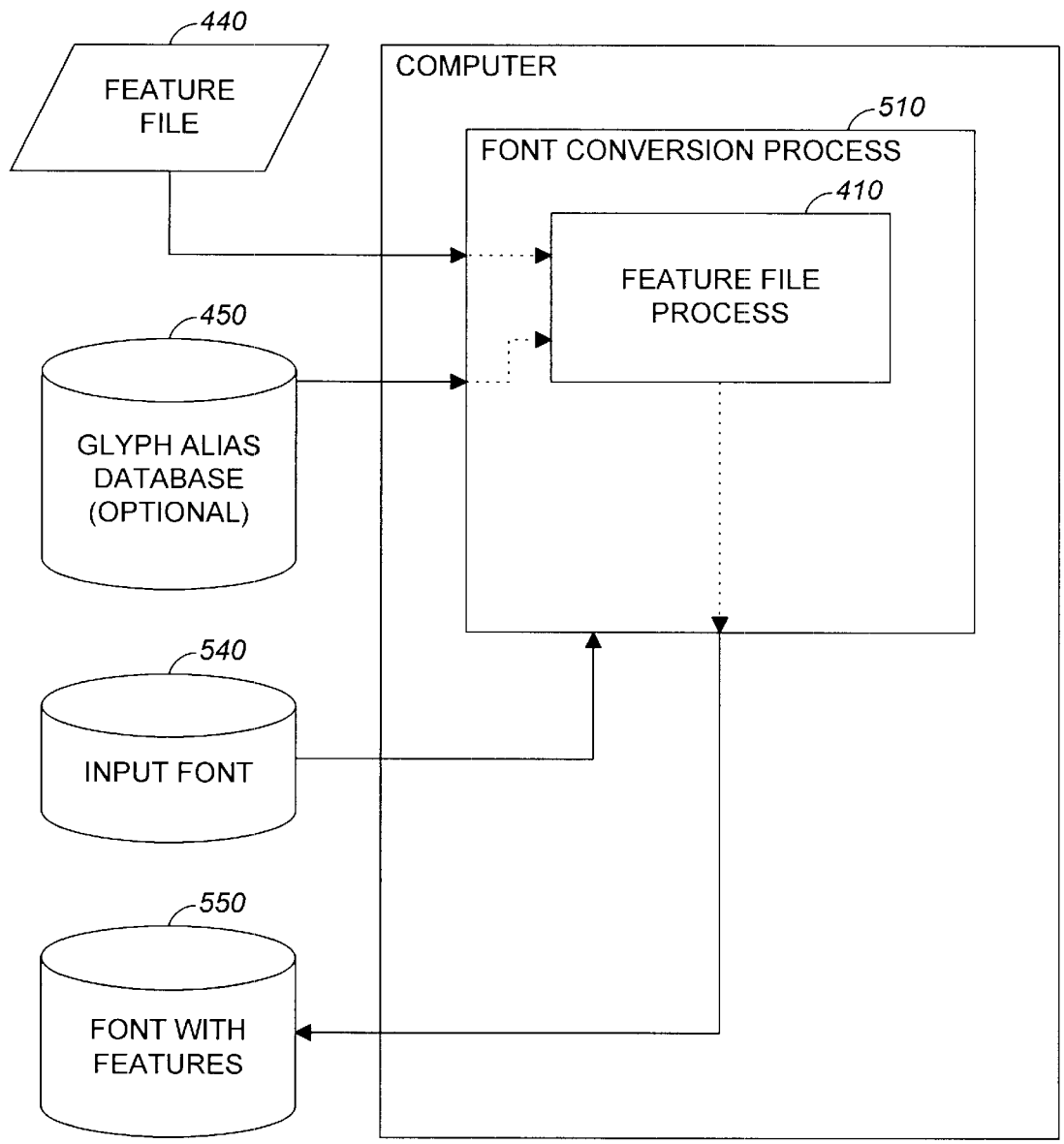
FIG. 5 is a schematic diagram of a computer implementation of the invention.

As shown in FIG. 5, the feature processor 410 described above can be made part of a font conversion process 510, the font converter, operable to run on a computer system. Like the feature file process, the font converter can be programmed in any convenient manner using any convenient programming language. In one implementation, the feature processor 410 operates as a server to a font converter 510. The feature processor reads a feature file 440 and an optional glyph database 450, and generates font table data, as has been described. The font converter 510 also reads in an input font 540 and generates on output font 550, adding or changing features and definitions in accordance with the feature file 440. In an advantageous implementation, the input and output fonts are of a different format—for example, Type 1 and OpenType, respectively.

The feature definition language was designed specifically for ease of use in a font production environment. It has a number of interesting characteristics.

First, name space separation occurs only when needed, and not otherwise. For example, glyph names, which would normally be the most common entities used in the language, are bare words that are distinguished from keywords by context. In the unusual case of a glyph name also being a keyword (for example, 'feature'), it may be indicated as a glyph name by an initial backslash (for example, '\feature'). Named glyph classes, which occur often in glyph sequences, usually have names similar to glyph names, and therefore occupy a different name space: they are preceded by the '@' character. Feature, language and script tag names, for example, 'liga', only occur where glyph names cannot occur, and so they are also bare words. These features of the language minimize the number of special characters that a font editor needs to use.

Second, the language allows common operations to be performed on multiple glyphs at a time, even when this is not supported by the OpenType font specification itself. For example, a ligature substitution for the fraction 'one half' can be denoted simply as:

substitute
@ONE slash @TWO by onehalf;
where:
@ONE=[one one.fitted one.numerator oneoldstyle];
@TWO=[two two.fitted two.numerator twooldstyle];
even though the OpenType font itself can only store specific rules. In this example, the software will take the cross product of the sequence '@ONE slash @TWO' and store the rules separately in the font. This saves the editor from the error-prone alternative of having to type out 16 (in this example) separate rules.

Single substitutions are supported on multiple glyphs both in the feature definition language and in the OpenType format itself. For example:

substitute [a–z] by [Asmall–Zsmall];
Thus, the editor does not need to know whether a rule needs to be expanded or not when actually stored in the font.

Third, the language can be processed to provide auto-detection of rule types. Thus, a font editor only needs to know about two kinds of rules: substitutions and positionings. A rule is introduced by the keyword 'substitute' or 'position' (which can be abbreviated as 'sub' or 'pos' respectively). The type of the rest of the rule is auto-detected in all common cases; only one additional keyword is needed to disambiguate less frequently used positioning rules such as GPOS LookupTypes 3–6. For example:

```
position A 0 0 3 0;              # single pos
position A y -40;                # pair pos format 1 (pair kerning)
position [A Agrave] y -40;       # pair pos format 2 (class kerning)
substitute a by b;               # single (one-to-one) sub
substitute f i by fi;            # ligature (many-to-one) sub
substitute fi by f i;            # multiple (one-to-many) sub
substitute a from [a.alt1 a.alt2]; # alternate (one-from-many) sub
substitute A' d o b e by A.logo; # contextual sub except A d o b e
substitute o b' e by b.fancy;    # contextual sub with exception
```

Fourth, the language provides seamless integration of multiple master and Character Identifiers (CID) fonts. A multiple master metric, if the same across all masters, can be denoted simply by a bare number, as for a single master font. For example:

position A Y-100;
is the same as:
position A Y<-100-100-100-100-100-100>;
for a 6-master font. This is convenient and reduces the potential for error. Of course, if the values are different across masters, they must be specified:

position A Y<-90-95-102-105-103-103>;
The difference in treatment of a CID font is also small. For a CID font, instead of a glyph name, a glyph's CID number (preceded by a backslash, to distinguish it from a number) needs to be specified.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The invention can apply to PostScript Type 1 fonts, CID-keyed fonts when being converted to OpenType format, and to OpenType fonts (which include TrueType fonts). The invention can apply to, and be used to generate tables for, Apple Advanced Typography (AAT) fonts. A graphical user interface (GUI) application can provide a GUI interface to a font editor (i.e., a user) for defining features. For example, through a GUI interface, a user can drag-and-drop glyphs from a palette showing all glyphs in the font into a "Define Ligature" button. The GUI application can save the data in feature file format, as an intermediary format, which the user can then fine-tune in a text editor if the user so desires. With or without tuning, the feature file can then be used as has been described. Such an application has the advantage of pleasing more GUI-minded font editors and freeing the application programmer from knowing the data structures of OpenType tables.

Appendix A—Feature File Specification

1. Introduction

An OpenType feature file is a text file that contains the feature specifications for an OpenType font in an easy-to-read format. It may also contain override values for certain fields in the font tables.

The following is an example of a complete feature file:
Ligature formation
feature liga {
substitute f i by fi;
substitute f l by fl;
}liga;

This example file specifies the formation of the fi and fl ligatures.

2. Syntax

2.a. Comments

The "#" character indicates the start of a comment; the comment extends until the end of the line.

2.b. White Space

White space is not significant except for delimiting tokens.

2.c. Keywords

The following are keywords of the feature file's feature definition language.

anonymous (or anon)
by
cursive
device
enumerate (or enum)
except
excludeDFLT
feature
include
includeDFLT
language
lookup
lookupflag
mark
nameid
position (or pos)
required
script
substitute (or sub)
subtable
table Supported table field names include the following.

| | |
|---|---|
| HorizAxis.BaseTagList | # BASE table |
| HorizAxis.BaseScriptList | |
| HorizAxis.MinMax | |
| VertAxis.BaseTagList | |
| VertAxis.BaseScriptList | |
| VertAxis.MinMax | |
| GlyphClassDef | # GDEF table |
| Attach | |
| LigatureCaret | |
| ContourPoint | |
| FontRevision | # head table |
| CaretOffset | # hhea table |
| Panose | # OS/2 table |
| TypoAscender | |
| TypoDescender | |
| TypoLineGap | |
| XHeight | |
| CapHeight | |
| VertTypoAscender | # vhea table |
| VertTypoDescender | |
| VertTypoLineGap | |

The following is a keyword only where a tag is expected.
DFLT

2.d. Special Characters

Special characters are listed in the following table.

| | | |
|---|---|---|
| # | pound sign | Denotes start of comment |
| ; | semicolon | Terminates a statement |
| , | comma | Separates glyph sequences in the except clause |
| ' | single quote | Marks a glyph or glyph class for contextual substitution |
| @ | at sign | Identifies glyph class names |
| \ | backslash | Identifies CIDs; distinguishes glyph names from an identical keyword |
| - | hyphen | Denotes glyph ranges in a glyph class |
| = | equal sign | Denotes glyph class assignments |
| {} | braces | Enclose a feature, lookup, table, or anonymous block |
| <> | angle brackets | Enclose master values for a multiple master metric |
| [] | square brackets | Enclose components of a glyph class |
| () | parentheses | Enclose the file name to be included |

2.e. Numbers

A <number> is a signed decimal integer (without leading zeroes). For example:

−150

1000

It is used to express glyph positioning as well as the values of various table fields.

A <fixed point number> is needed for the FontRevision value in the head table. The major and minor portions should be specified in decimal notation. For example:

FontRevision 1.10 # Stored in the font as 0x0001a000

2.f. Glyphs

Glyphs are represented by one of a glyph name or a CID number.

A glyph name is comprised of characters from the following set:

|  |
| --- |
| A–Z |
| a–z |
| 0–9 |
| . (period) |
| _ (underscore) | and does not start with a digit or period. The only exception is the special character ".notdef". For example, "twocents", "a1", and "_" are valid glyph names; and "2 cents" and ".twocents" are not.

An initial backslash serves to differentiate a glyph name from an identical keyword. For example:

\substitute # a glyph name

If a glyph name alias database is used, then the aliases may be used in the feature file.

CIDs are represented by a decimal number preceded by a backslash. For example:

\101

\0

2.g. Glyph Classes

A glyph class represents a single glyph position in a sequence and is denoted by a list of glyphs enclosed in square brackets. For example:

[endash emdash figuredash]

An example of a sequence which contains a glyph class is:

space [endash emdash figuredash] space

A range of glyphs is denoted by a hyphen:

[<firstGlyph>–<lastGlyph>]

For Example

[\1–31]

[A–Z]

For CID fonts, the ordering is the CID ordering. For non-CID fonts, the ordering is independent of the ordering of glyphs in the font. <firstGlyph> and <lastGlyph> must be the same length and can differ:

1. By a single letter from A–Z, either uppercase or lowercase. For example:

[Aswash–Zswash]

[a–z]

The range is expanded by incrementing the letter that differs, while keeping the rest of the glyph name the same.

2. By up to 3 decimal digits in a contiguous run. For example:

[ampersand.01–ampersand.58]

The range is expanded by incrementing the number values, while keeping the rest of the glyph name the same.

The following is not a valid glyph class because the length of the glyph names differ.

[ampersand.1–ampersand.58] # invalid

Note that

[zero–nine]

is not a valid glyph range. It must be enumerated explicitly:

@digits=[zero one two three four five six seven eight nine];

A glyph class can be named by assigning it to a glyph class name, which begins with the "@" character, and then referred to later on by the glyph class name. For example:

| @dash = [endash emdash figuredash]; | # Assignment |
| --- | --- |
| space @dash space | # Usage |

The part of the glyph class name after the "@" is subject to the same name restrictions that apply to a glyph name. Glyph class assignments can appear anywhere in the feature file. A glyph class name may be used in the feature file only after its definition. When a glyph class name occurs within square brackets, its elements are simply added to the other elements in the glyph class being defined. For example:

@Vowels.lc=[a e i o u];

@Vowels.uc =[A E I O U];

@Vowels=[@Vowels.lc @Vowels.uc y Y];

Here the last statement is equivalent to:

@Vowels=[a e i o u A E I O U y Y];

No square brackets are needed if a glyph class name is assigned to another single glyph class name. For example:

@Figures_lining_tabular=@FIGSDEFAULT;

Ranges, glyphs, and glyph class names can be combined in a glyph class. For example:

[zerooldstyle–nineoldstyle ampersandoldstyle @smallCaps]

Note: The glyph classes of the feature file are not to be confused with glyph classes of OpenType Layout, which are described in Appendix C.

2.h. Tags

Tags are denoted simply by tag name, without any final spaces, and are distinguished from glyph names by context. For example:

DEU

The final space in the example is implicit. The special tag 'DFLT' denotes the default language.

2.i. Lookup Block Labels

The restrictions that apply to a glyph name also apply to a lookup block label.

3. Including Files

Including files is indicated by:

include(<filename>)

To ensure against infinite include loops (files that include each other), a maximum include depth, such as 5, can be implemented.

4. Specifying Features 4.a. Feature

Each feature is specified in a feature block, which has the following form.

feature <feature tag>{ specifications go here

}<feature tag>;

For Example feature liga {

. . .

}liga;

The language and script at the start of a feature default to 'latn' and 'DFLT', respectively. The lookupflag attribute defaults to 0.

4.b. Language

The language attribute stays the same until explicitly changed, until the script is changed, or until the end of the feature. A statement of the following form can be used to set the language attribute:

language <language tag>;

For Example
    language DEU;
The script and lookupflag attribute stay the same as before.
    The language-specific lookups for a particular feature will inherit the DFLT lookups by default. If this is not desired, then the keyword "excludeDFLT" must follow the language tag. For example:
    language DEU excludeDFLT;
The keyword "includeDFLT" may be used to indicate explicitly the default DFLT lookup-inheriting behavior. For example:
    DEU includeDFLT; # Same as: language DEU;
The keyword "required", when present, specifies the current feature as the required feature for the specified language system (script/language combination).

4.c. Script

The script attribute stays the same until explicitly changed or until the end of the feature. A statement of the following form can be used to change the script:
    script <script tag>;
For Example
    script kana;
The language is implicitly set to DFLT, and the lookupflag attribute is implicitly set to 0.

4.d. Lookupflag

The OpenType font file specification, see Appendix C, describes the LookupFlag field in the Lookup table. The lookupflag attribute stays the same until explicitly changed, until the script is changed, or until the end of the feature. A statement of the following form can be used to change the lookupflag attribute:
    lookupflag <number>;
For Example
    lookupflag 2; # "10" in binary: set the IgnoreBaseGlyphs
        flag 4.e. Lookup A run of rules can be labeled and referred to explicitly later, in order to have different parts of the font tables refer to the same lookup. Use of labels decreases the size of the font in addition to freeing the user from maintaining duplicate sets of rules. A statement of the following form can be used to define and label a lookup:
    lookup <label>{
        # rules to be grouped
    }<label>;
To refer to it later on, state:
    lookup <label>;
For Example

| | |
|---|---|
| lookup shared { | # lookup definition |
| #∴ | |
| }shared; | |
| # . . . | |
| lookup shared; | # lookup reference |

Because the labeled block literally defines a single lookup in the font, the rules within the lookup block must be of the same lookup type and have the same lookupflag attribute. A lookup block may not contain any other kind of block.

4.f. Subtable

Subtable breaks will be inserted among the rules for a particular lookup if needed.

The "subtable" keyword may be used as follows:
    subtable;
to force a subtable break after the previous rule.

4.g. Examples

The following example shows a feature block that has language-specific rules Default attributes are indicated in comments.
    feature liga {
        # script latn; (implicit)
        # language DFLT; (implicit)
        # lookupflags 0; (implicit)
        sub f f by ff;
        sub f i by fi;
        sub f l by fl;
        language DEU;
        # script latn; (stays the same)
        # lookupflags 0; (stays the same)
        sub c h by c_h;
        sub c k by c_k;
    } liga;
In the above example, the ch and ck ligature substitutions will apply only when the language is German. The ff, fi and fl ligature substitutions will apply for all languages (including German) in the Latin script.

The following example illustrates labelled lookup blocks and the use of the excludeDFLT keyword.
    feature liga {
        sub f f i by ffi; # Lookup index [x]
        sub f i by fi;
        lookup ALL {# Lookup index [y]
            sub f f l by ffl;
            sub f f by ff;
            sub f l by fl;
        }ALL;
        language DEU;
        sub s s by germandbls; # Lookup index [z]
        language TUR excludeDFLT;
        lookup ALL; # reference to lookup index [y]
    }liga;
The ffi and fi ligature substitutions will not apply when the language is Turkish. Note that lookup [x] must be placed before lookup [y] because the ffi substitution must precede the ff substitution. (See the discussion of ordering of lookups and rules in the feature file, below.) The ordering of ligature rules within a particular lookup does not matter. For example, in lookup [x], the fi substitution may be placed before the ffi substitution. (See discussion of ligature substitution, below.)

5. Glyph Substitution (GSUB) Rules 5.a. [LookupType 1] Single Substitution

Statements of the following form defines a single substitution:
    substitute <glyph> by <glyph>;
    substitute <glyph class> by <glyph class>;
The keyword "substitute" can be abbreviated as "sub".
    For example:
    sub a by Asmall;
    substitute [a–z] by [Asmall–Zsmall];
    substitute @Capitals by @CapSwashes
Rules containing glyph classes are enumerated when tables are created in the order specified in the classes. Thus, the number of elements in the target and replacement glyph classes must be the same. The second line in the above example produces an identical representation in the font as:

substitute a by Asmall;
substitute b by Bsmall;
substitute c by Csmall;
\# . . .
substitute z by Zsmall;

5.b. [LookupType 2] Multiple Substitution

A statement of the following form can be used to define a multiple substitution:

substitute <glyph> by <glyph sequence>;

A <glyph sequence> may not contain glyph classes; if it did, the rule would be ambiguous as to which target sequence were required. For example:

substitute ffi by f f i; # Ligature decomposition 5.c. [LookupType 3] Alternate Substitution A statement of the following form can be used to make an alternate substitution:

substitute <glyph> from <glyph class>;

For Example substitute ampersand from [ampersand.1 ampersand.2 ampersand.3];

5.d. [LookupType 4] Ligature Substitution

A statement of the following form can be used to define a ligature substitution:

substitute <glyph sequence> by <glyph>;

A <glyph sequence> may contain glyph classes. For example:

substitute [one oneoldstyle] [slash fraction] [two twooldstyle] by onehalf;

Because the OpenType specification does not allow ligature substitutions to be specified on target sequences that contain glyph classes, all specific glyph sequences will automatically be enumerated if glyph classes are detected in <glyph sequence>. Thus, the above example produces an identical representation in the font as if all the sequences were manually enumerated:

substitute one slash two by onehalf;
substitute oneoldstyle slash two by onehalf;
substitute one fraction two by onehalf;
substitute oneoldstyle fraction two by onehalf;
substitute one slash twooldstyle by onehalf;
substitute oneoldstyle slash twooldstyle by onehalf;
substitute one fraction twooldstyle by onehalf;
substitute oneoldstyle fraction twooldstyle by onehalf;

A contiguous set of ligature rules does not need to be ordered in any particular way; the appropriate sorting will be done when the feature file is processed. So:

sub f f by ff;
sub f i by fi;
sub f f i by ffi;
sub o f f i by offi;

will produce an indentical representation in the font as:

sub o f f i by offi;
sub f f i by ffi;
sub f f by ff;
sub f i by fi;

5.e. [LookupType 5] Contextual Substitution

This LookupType is a functional subset of GSUB LookupType 6, chaining contextual substitution. Thus, all desired rules of this LookupType can be expressed in terms of chaining contextual substitution rules.

5.f. [LookupType 6] Chaining Contextual Substitution

Chaining contextual substitution for one single or one ligature substitution within a glyph context, with optional exceptions, is expressed as follows:

| | |
|---|---|
| [except <glyph sequence list>] | # Exceptions to this rule (optional) |
| substitute <marked glyph sequence> | # Target context with marked sub-runs |
| by <replacement glyph or glyph class>; | # Sub-run replacement sequences |

A <glyph sequence> comprises one or more glyphs or glyph classes. A <glyph sequence list> is a comma-separated list of <glyph sequence>s.

A <marked glyph sequence> is a <glyph sequence> in which one or more sub-runs of glyphs or glyph classes are identified or marked. A sub-run is marked by inserting a single quote (') after each of its member elements. However, if two or more sub-runs are contiguous, they may be distinguished by marking the elements of one sub-run with the single quote, and the elements of the adjacent sub-run(s) with the double-quote (").

These sub-runs represent the target contexts of the lookups called by this rule. Each such sub-run of marked glyphs must correspond, in order, to a replacement glyph sequence in the replacement <glyph sequence list>.

If an except clause is present and no glyph in <marked glyph sequence> is marked, then all glyphs in <marked glyph sequence> are taken to be marked.

For example:

substitute [a e n] d' by d.alt;

The preceding rule means: In sequences "a d" or "e d" or "n d", substitute the "d" by "dalt".

The optional "except" clause lists exceptions and precedes the substitute statement, mirroring the way in which this will be stored in the font. For example, consider an except clause added to the example above:

except f [a e] d, a d d
substitute [a e n] d' by d.alt;

The except clause specifies that the substitution should not occur for the sequences "f a d", "f e d", or "a d d".

The following example shows how a ligature may be substituted at a word boundary:

except
 @LETTER f i
substitute
 f i # Same as: f' i'
by f_i.begin;

If a feature only targets glyphs at the beginning or ending of a word, such as the 'init' and 'fina' features, then an application program using a font having the feature could be made responsible for detecting the word boundary; the feature itself would be simply defined as the appropriate substitutions without regard for word boundary. Such application responsibilities should be described in a feature tag registry.

6. Glyph Positioning (GPOS) Rules 6.a. Common Data Types

Glyph positioning is specified in terms of metrics, device tables, value records and anchors.

6.a.i. Metrics

A <metric> value for a single-master font is simply a <number>.

A metric value for a multiple master font is denoted by an array of <number>s enclosed in angle brackets. Each <number> represents the metric value for a master; the ordering is the same as the ordering of the masters in the original font.

The number of <number>s in the array must equal the number of masters in the font. For example:

<-140 -160> means that the metric for the first master (in a font that has two masters) is -140 and the metric for the second master is -160.

If the value is constant across all masters, then a single <number> may be used, without angle bracets. For example:

1000 # equivalent to <1000 1000 1000 1000> for a 4-master font 6.a.ii. Device Tables A <device> represents a single device table, and is of the format:

device (<ppem size> <number>)+
For example:

device 11 -1 12 -1 # Adjust by -1 at 11 ppem and 12 ppem

A null <device>, when needed in a list of <device>s, is represented by:

device 0

6.a.iii. Value Records

A <valuerecord> may take any of several formats:

<valuerecord> format A:

<metric>

<valuerecord> format B:

<metric> <metric> <metric> <metric>

<valuerecord> format C:

<metric> <metric> <metric> <metric> <device> <device> <device> <device>

The <metric> in <valuerecord> format A represents an X advance adjustment, except when defined in the 'vkrn' feature, in which case it represents a Y advance adjustment. This is the simplest <valuerecord> format. It represents the adjustment most commonly used for kerning.

The <metric>s in <valuerecord> format B represent adjustments for X placement, Y placement, X advance, and Y advance, in that order.

The <metric>s in <valuerecord> format C represent the same adjustments as in format B; the <device>s represent device tables for X placement, Y placement, X advance, and Y advance, in that order. This format lets the user express the full functionality of an OpenType value record.

The adjustments indicate values (in design units) to add to (positive values) or subtract from (negative values) the placement and advance values provided in the font.

Some examples of <valuerecord>s:

| | | |
|---|---|---|
| -3 | | # format A |
| -80 0 -160 0 | | # format B |
| -80 0 -160 0 | device 11 -1 12 -1 | # format C |
| | device 0 | |
| | device 11 -2 12 -2 | |
| | device 0 | |

The third example specifies adjustments for X placement and X advance, as well as device adjustments at 11 and 12 ppem sizes for X placement and X advance.

6.a.iv. Anchors

| | |
|---|---|
| An <anchor> specifies an anchor point in any of 4 formats: | |
| # <anchor> format A, the null anchor: | |
| 0 | # X coordinate, Y coordinate |
| # <anchor> format B: | |
| <number> <number> | # X coordinate, Y coordinate |
| # <anchor> format C: | |
| <number> <number> <number> | # X coordinate, Y coordinate, # contour point index |
| # <anchor> format D: | |
| <number> <number> <device> <device> | # X coordinate, Y coordinate, # X coordinate device table, # Y coordinate device table |
| For example: | |
| 0 | # format A |
| 120-20 | # format B |
| 120-20 5 | # format C; contour point index is 5 |
| 120-20 device 11 1 device 0 | # format D |

6.b. [LookupType 1] Single Adjustment Positioning

A statement of the following form can be used to make a single adjustment positioning:

position <glyph | glyphclass> <value record>

The keyword "position" can be abbreviated as "pos".

For example, to reduce the left and right sidebearings of a glyph each by 80 design units:

position one -80 0-160 0;

6.c. [LookupType 2] Pair Adjustment Positioning

Rules for this LookupType are used for kerning, and may be of either of two formats:

PairPos format A:

position <glyph | glyphclass> <glyph | glyphclass> <valuerecord>;

PairPos format B: [Currently not supported.]

position <glyph | glyphclass> <glyph | glyphclass> <valuerecord>, <valuerecord>;

In format B, the first <valuerecord> corresponds to the first <glyph | glyphclass>; the second <valuerecord> corresponds to the second one.

In format A, the <valuerecord> corresponds to the first <glyph | glyphclass>. Thus, it is a shorter way of expressing:

position <glyph | glyphclass> <glyph | glyphclass> <valuerecord>, 0;

So kerning can be most easily expressed with PairPos format A and <value record> format A. This will result in adjusting the first glyph's X advance, except when in the 'vrkn' feature, in which case it will adjust the first glypy's Y advance. Some single master examples:

| | |
|---|---|
| pos Y space -100; | # specific pair |
| pos [1]01 [2]01 -200; | # specific pair |
| pos T [a e U] -100; | # class pair (first glyph converted to class) |
| pos @T @xheight -80; | # class pair |

Some multiple master examples:

pos Y space <-90 -100 -95 -105>; # specific pair; 4-master font pos @T [a e u] <-60 -70>; # class pair; 2-master font The specific glyph pairs should precede the glyph class pairs in the feature file, mirroring the way that they will be stored in the font. (See discussion of ordering of lookups and rules in the feature file, below.)

A statement of the following form can be used to define a kerning:

feature kern {
        # specific pairs for all scripts
        # class pairs for all scripts
    }kern;

In the following example, all kern data for the font is shared under scripts 'latn', 'cyrl', and 'grek':

feature kern {
        lookup ALL_PAIRS {
            # specific pairs for all scripts
            # class pairs for all scripts
        }ALL_PAIRS;
        script cyrl; lookup ALL_PAIRS;
        script grek; lookup ALL_PAIRS;
    }kern;

If some specific pairs are more conveniently represented as a class pair, but the user does not want the pairs to be in class kerning subtable, then the class pair should be preceded by the keyword "enumerate" (which can be abbreviated by "enum"). Such pairs will be enumerated as specific pairs. Thus, these pairs can be thought of as "class exceptions" to class pairs. For example:

```
@Y_LC = [y yacute ydieresis];
@SMALL_PUNC = [comma semicolon period];
enum pos @Y_LC semicolon -80;      #specific pairs
pos f quoteright 30;                #specific pair
pos @Y_LC @SMALL_PUNC -100;        #class pair
```

The enum rule above can be replaced by:

pos y semicolon -80;
    pos yacute semicolon -80;
    pos ydieresis semicolon -80;

without changing the representation in the font.

When a feature file is compiled, a subtable break will be inserted within a run of class pair rules if a single subtable cannot be created due to class overlap. A warning should be emitted. For example:

```
pos [Ygrave][colon semicolon] -55;   # [line 99] In first subtable
pos [Y Yacute] period -50;           # [line 100] In first subtable
pos [Y Yacute Ygrave] period -60;    # [line 101] In second subtable
``` should produce a warning that a new subtable has been started at line 101, and that some kern pairs within this subtable may never be accessed. The pair (Y grave, period) will have a value of 0 if the above example comprised the entire lookup, since Y grave is in the coverage (i.e., union of the first glyphs) of the first subtable.

Sometimes the class kerning subtable may become too large. The user can force subtable breaks at appropriate points by specifying:

subtable;

between two class kerning rules. The new subtable created will still be in the same lookup, so the user must ensure that the coverages of the subtables thus created do not overlap. For example:

```
pos [Y Yacute] period -50;              # In first subtable
subtable;                                # Force a subtable break here
pos [A Aacute Agrave]quoteright -30;    # In second subtable
```

If the subtable statement were not present, both rules would be represented within the same subtable.

6.d. [LookupType 3] Cursive Attachment Positioning

This LookupType is expressed as:

position cursive <glyph | glyphclass> <anchor>, <anchor>;

The first <anchor> indicates the entry anchor point for <glyph | glyphclass>; the second, the exit anchor point.

For example, to define the entry point of glyph meem-.medial to be at x=500, y=20, and the exit point to be at x=0, y=−20:

position cursive meem.medial 500 20, 0 −20;

A glyph may have a defined entry point, exit point, or both. The <anchor> format A is used to indicate that an <anchor> is not defined.

6.e. [LookupType 4] Mark-to-base Attachment Positioning

This positioning rule is of the format:

position <base glyph | glyphclass> mark <mark glyph | glyphclass> <base anchor>;

where <base anchor> is of the form <anchor>. The anchor points of all the mark glyphs must have been previously defined in the feature file by a "mark" statement.

For example, to position the previously-defined anchor point of acute and grave at anchor point x=250, y=450 of glyphs a, e, i, o and u:

position [a e i o u] mark [acute grave] 250 450;

The keyword "mark" always precedes a <glyph | glyphclass> that is a mark in LookupTypes 4–6.

The anchor points for the mark glyphs must first be defined by a mark statement:

mark <mark glyph | glyphclass> <anchor>;

For example, to specify that the anchor of mark glyphs acute and grave are at x=30, y=600:

mark [acute grave] 30 600;

6.f. [LookupType 5] Mark-to-ligature Attachment Positioning

This LookupType is expressed as:

position <ligature glyph | glyphclass> mark <mark glyph | glyphclass> <ligature anchors>;

where <ligature anchors> is a comma-separated list of at least two <anchor>s. There must be at least two since this is the only way this rule is distinguished from a mark-to-base attachment positioning rule. There must be as many <anchor>s as there are components in the ligature glyph; each <anchor> corresponds, in order, to a component. If a particular component does not define an anchor point, then its corresponding <anchor> must be set to "0" (<anchor> format A).

As in LookupType 4, the anchor points of all the mark glyphs must have been previously defined in the feature file by a "mark" statement. The example in the OpenType specification for this LookupType could be expressed as:

1. Define mark anchors:
        mark sukun 261 488;
        mark kasratan 346 −98;
    # 2. Define mark-to-ligature rules:
        position lam_meem_jeem mark sukun 625 1800, 0, 0;
            # mark above lam
        position lam_meem_jeem mark kasratan 0, 376 −368, 0; # mark below meem 6.g. [LookupType 6] Mark-to-mark Attachment Positioning
This LookupType is expressed as:
   position mark <base mark glyph | glyphclass> mark <mark glyph | glyphclass> <base mark anchor>;
This rule is distinguished from a mark-to-base attachment positioning rule by the first "mark" keyword.

As in LookupType 4, the anchor points of all the mark glyphs must have been previously defined in the feature file by a "mark" statement. The example in the OpenType specification for this LookupType could be expressed as:
   # 1. Define mark anchors:
      mark damma 189 −103;
   # 2. Define mark-to-mark rule:
      position mark hanza mark damma 221 301;

6.h. [LookupType 7] Contextual Positioning
This LookupType is a functional subset of GPOS LookupType 8, chaining contextual positioning. Thus, all desired rules of this LookupType can be expressed in terms of chaining contextual positioning rules.

6.i. [LookupType 8] Chaining Contextual Positioning
This LookupType is expressed as:

| | | |
|---|---|---|
| [except | <glyph sequence list>] | # Exceptions to this rule (optional) |
| position | <marked glyph sequence> | # Target context with marked sub-runs |
| by | <valuerecord | anchor list>; | # Sub-run positionings |

A <valuerecord | anchor list> is a comma-separated list of <valuerecord>s and <anchor>s.

A <glyph sequence list> and <marked glyph sequence> are the same as in the section on chaining contextual substitutions, except that the sub-runs in <marked glyph sequence> can contain the keywords "cursive" and "mark" as used in the target contexts of GPOS LookupTypes 3–6. In addition, the number of <valuerecord>s or <anchors>s in <valuerecord | anchor list> that is associated with each sub-run is indicated by the number of single or double quotes that is used to mark the sub run.
   For example:
      position [Y T]' [quoteright quotedblright] period'space 20, −10;
will increase the X advance of Y or T by 20 and decrease the X advance of period by 10 when the target context is matched.
   In the following example:
      position lam_meem_jeem'" mark sukun'" space alef 625 1800, 0, 0, −5; the first sub-run is:
      lam_meem_jeem mark sukun # First sub-run
This is identified as the target context for a mark-to-ligature attachment LookupType (due to the mark keyword) which consumes 3 elements from the <valuerecord | anchor list> (indicated by the 3 single quotes used to mark this run). These elements will be interpreted as <anchor>s. Note that the "mark" keyword is not marked since it is not a glyph.
   The second sub-run in the above example is:
      alef
This is identified as the target context for a single positioning LookupType, and consumes a single element from the <valuerecord | anchor list>. This element will be interpreted as a <valuerecord>.

7. Ordering of Lookups and Rules in the Feature File
7.a. An OpenType Layout (OTL) Engine's Layout Algorithm
A user creating or editing a feature file should understand how an OpenType layout engine performs substitutions and positionings in order to order rules properly in the feature file. The following is a summary of the algorithm:
   Do the following first for GSUBs and then for GPOSs:
      Assemble all features (including any required feature) for the script and language of the client's glyph run.
      Assemble all relevant lookups, in LookupList order.
      For each Lookup:
         For each glyph in the glyph run:
            For each subtable in the Lookup:
               If the target glyph or glyph context is found:
                  Do the glyph substitution or positioning.
                  Goto the next glyph in the run (i.e., skip remaining subtables).

7.b. Ordering of Lookups
A lookup in an OpenType font will be created from each lookup block or each run of rules with the same feature, script, language, lookupflag and lookup type attribute.

A lookup may contain one or more subtables. Subtable breaks may have been inserted due to format restrictions, or they may have been explicitly requested in the feature file by the user. In either case, subtables will be created in the same order as the corresponding subtables in the feature file.

Lookups will be created in the same order as the corresponding lookup blocks or runs of rules in the feature file. Note that a reference to a lookup block corresponds to the LookupList index of the lookup created from that block.

7.c. Ordering of Rules within a Lookup
The ordering of rules within a lookup is important only for chaining contextual substitution and positioning rules. In all other cases of LookupTypes (including ligature substitutions), the appropriate ordering can be automatically deduced.

8. The all Alternates (aalt) Feature
The aalt feature, if present, should be specified before any other feature. The semantically equivalent groups of glyphs in the aalt will be created algorithmically as follows:
   a. Considering only features indicated by:
      feature <feature tag>;
      in the aalt specification (see example below), combine all single and alternate substitutions in those features (including single substitutions that appear within a chaining contextual rule) into groups with the first glyph in the group being the target glyph of the substitution. Subsequent elements of the group will be ordered by the order of the relevant rule in the feature file. Duplicate glyphs are removed.
   b. Add any additional single and alternate substitutions in the aalt specification to the groups that were created algorithmically. This facility is provided to fine-tune the semantic groups, for instance, if certain glyphs were not referenced in any of the features indicated in (a) above.
   c. If there are only two glyphs in a group, create a single substitution in the aalt feature. If there are more than two glyphs in a group, create an alternate substitution in the aalt feature, with the first glyph being the target glyph and the remaining glyphs being the alternate set.
For Example
   feature aalt {
      feature smcp;
      feature SALT;
      substitute d by d.alt;
   }aalt;
   feature smcp {
      sub [a–c] by [Asmall–Csmall];
      sub f i by fi; # not considered for aalt }smcp;
feature SALT {
    sub a by [a.alt1 a.alt 2 a.alt2];
    sub e [c d e] f by [c.mid d.mid e.mid];
    sub b by b.alt;
}SALT;

The aalt created from the above example would be the same as if the following had been specified:

feature aalt {
    sub a by [Asmall a.alt1 a.alt 2 a.alt 3];
    sub b by [Bsmall b.alt];
    sub c by [Csmall c.mid];
    sub d by [d.alt d.mid];
    sub e by e.mid;
}aalt;

9. Specifying or Overriding Table Values

Table values are specified within a corresponding table block:

table {
    # . . .
};

Values supported are BASE, GDEF, head, hhea, name, OS/2 and vhea.

9.a. BASE Table Values

A BASE table entry can be specified as follows.

table BASE {
    HorizAxis.BaseTagList <baseline tag>+;
    HorizAxis.BaseScriptList <script record> (, <script record>)*;
    HorizAxis.MinMax <minmax>;
    VertAxis.BaseTagList <baseline tag>+;
    VertAxis.BaseScriptList <script record> (, <script record>)*;
    VertAxis.MinMax <minmax>;
}BASE;

A <script record> is of the form:

<script tag> <default baseline tag> <base coord>+<base coord> can take several formats: [Currently only Format A is supported]

| | |
|---|---|
| <number> | # Format A |
| <number> <glyph> <number> | # Format B |
| <number> <device> | # Format C |

<number> is a single number, even for multiple master fonts, since the baseline should not vary depending on the master. For example, the <base coord> for the 'romn' baseline for a multiple master font is 0.

The baseline tags for each BaseTagList must be sorted in increasing ASCII order. The number of baseline values for a particular script should be the same as the same as the number of baseline tags in the corresponding BaseTagList.

A <minmax> is of the form:

| | |
|---|---|
| <script tag> <language tag> | # Defines the language system |
| <base coord>, | # Min value for this language system |
| <base coord> | # Max value for this language system |
| [, <feature tag> | # (Optional) feature tag |

| | |
|---|---|
| <base coord>, | # Min value for this feature tag |
| <base coord>] | # Max value for this feature tag |

For example:
table BASE {
    HorizAxis.BaseTagList ideo romn;
    HorizAxis.BaseScriptList latn romn −120 0
        cyrl romn −120 0
        grek romn −120 0
        han ideo −120 0
        kana ideo −120 0
        hang ideo −120 0;
}BASE;

9.b. GDEF table

A GDEF table entry can be specified as follows.

| | |
|---|---|
| table GDEF { | |
| GlyphClassDef <glyphclass> | # simple glyphs |
| <glyphclass> | # ligature glyphs |
| <glyphclass> | # mark glyphs |
| <glyphclass>; | # component glyphs |

Attach <glyph | glyphclass> <number>+;
    # <number> is a contour point index
LigatureCaret <glyph | glyphclass> <caret value> (, <caret value>)*;
} GDEF:

The number of <caret value>s specified for a LigatureCaret must be: (number of ligature components) −1.

<caret value> can take 3 formats:

| | |
|---|---|
| <metric> | # Format A |
| <metric> ContourPoint <number> | # Format B |
| <metric> <device> | # Format C |

For example:
table GDEF {
    GlyphClassDef @SIMPLE @LIGATURES @MARKS @COMPONENT;
    Attach noon.final 5;
    Attach noon.initial 4;
    LigatureCaret ffi 380, 760;
}GDEF;

9.b. Head Table

A head table entry can be specified as follows.

table head {
    FontRevision <fixed point number>;
} head;

For Example
table head {
    FontRevision 1.1; # stored in the font as 0x00011000
} head;

9.c. hhea Table

A hhea table entry can be specified as follows.

table hhea {
    CaretOffset <number>;
} hhea;

For Example
```
table hhea {
    CaretOffset -50;
} hhea;
```
9.d. Name Table

A name table entry can be specified as follows.
```
table name {
    # name records
} name;
```
A name record is of the form:
nameid <id> [<string attribute>] <string>;

An <id> is a number specifying the ID of the name string to be added to the name table. This number must be in the registered ID range 0, 7–255. Note that IDs 1–6 (Family, Subfamily, Unique, Full, Version, and FontName) are reserved and cannot be overridden; doing so will elicit a warning message and the record will be ignored.

An optional <string attribute> is one or three space-delimited numbers that specify the platform, platform-specific, and language IDs to be stored in the name record of the name table. If only one number is specified it represents the platform ID. The platform ID may be either 1 or 3, corresponding to a Macintosh or a Microsoft Windows platform, respectively. The other ID numbers must be in the range 0–65535 but are not otherwise validated.

Decimal numbers must begin with a non-0 digit, octal numbers with a 0 digit, and hexadecimal numbers with a 0x prefix to numbers and hexadecimal letters a–f or A–F.

If some or all of the string attribute ID numbers are not specified, their values are defaulted as follows:

| | |
|---|---|
| platform ID | 3 (Windows) |
| Windows platform selected: | |
| platspec ID | 1 (Unicode) |
| language ID | 0x0409 (Windows default English) |
| Macintosh platform selected: | |
| platspec ID | 0 (Roman) |
| language ID | 0 (English) |

Putting this all together gives the following valid nameid formats and the IDs that are assigned.

| representation | ID | platform ID | platspec ID | language ID |
|---|---|---|---|---|
| nameid I <string>; | I | 3 | 1 | 0x0409 |
| nameid I 3 <string>; | I | 3 | 1 | 0x0409 |
| nameid I 3 S L <string>; | I | 3 | S | L |
| nameid I 1 <string>; | I | 1 | 0 | 0 |
| nameid I 1 S L <string>; | I | 1 | S | L |

A string is composed of 1-byte ASCII characters enclosed by ASCII double quote characters ("). Newlines embedded within the string are removed from the character sequence to be stored.

Strings are converted to Unicode for the Windows platform by adding a high byte of 0. Two-byte Unicode values for the Windows platform may be specified using a special character sequence of a backslash character (\) followed by exactly four hexadecimal numbers (of either case) which may not all be zero, e.g., \4e2d. The ASCII backslash character must be represented as the sequence \005c or \005C and the ASCII double quote character must be represented as the sequence \0022.

There is no corresponding conversion to Unicode for the Macintosh platform but character codes in the range 128–255 may be specified using a special character sequence of a backslash character (\) followed by exactly two hexadecimal numbers (of either case) which may not both be zero, e.g., \83 . The ASCII blackslash character must be represented as the sequence \5c or \5C and the ASCII double quote character must be represented as the sequence \22.

For example, to add a designer's name that includes non-ASCII characters for Macintosh and Windows platforms:

| | |
|---|---|
| table name { | |
| nameid 9 "Joachim M\00fcller-Lanc\00e9"; | # Windows (Unicode) |
| nameid 9 1 "Joachim Mu\9fller-Lanc\8e"; | # Macintosh (Mac Roman) |
| } name; | |

9.e. OS/2 Table

An OS/2 table entry can be specified as follows.
```
table OS/2{
    Panose <panose number>;
    TypoAscender <number>;
    TypoDescender <number>;
    TypoLineGap <number>;
    XHeight <metric>;
    CapHeight <metric>;
} OS/2;
```
Where <panose number> is ten (decimal) numbers separated by white space. For example:
```
table OS/2 {
    Panose 2 15 0 0 2 2 8 2 9 4;
    TypoAscender 800;
    TypoDescender -200;
    TypoLineGap 200;
    XHeight 400;
    CapHeight 600;
} OS/2;
```
For a multiple master font, the XHeight and CapHeight metrics specified here will also be stored at their named IDs in the MMFX table, overriding the values there.

9.f. vhea Table Values

A vhea table entry can be specified as follows.
```
table vhea {
    VertTypoAscender <number>;
    VertTypoDescender <number>;
    VertTypoLineGap <number>;
} vhea;
```
For Example
```
table vhea {
    VertTypoAscender 500;
    VertTypoDescender -500;
    VertTypoLineGap 1000;
} vhea;
```
10. Specifying Anonymous Data Blocks A feature file can contain "anonymous" tagged blocks of data that will be passed back to the client of a feature file processing process. Such blocks of data will typically contain information needed to specify OpenType font tables that the feature file processing process does not directly support. The feature file parser will not attempt to parse the data. Each such block is specified as follows:
```
anonymous <tag> {
    # ...
}<tag>;
```

For Example

```
anon sbit {
   /* sbit table specifications */
   72% dpi
   sizes {
      10, 12, 14 source {
         all "Generic/JGeneric"
      }
   }
}sbit;
```

The closing brace, tag, and semicolon must all be on the same line to indicate the end of the anonymous block to the parser. White space may be used between tokens on this line, and a comment may follow the semicolon. The "include" directive will not be recognized within the block, starting from "anonymous" and ending at the end of the closing line, so the entire block must exist within the same file.

The data that is passed back to the client starts at the beginning of the line after the opening brace and ends at (and includes) the newline before the closing brace. In the example above, the following data is passed back to the client:

```
/* sbit table specifications */
72% dpi
sizes {
   10, 12, 14 source {
      all "Generic/JGeneric"
   }
}
``` along with the tag 'sbit'.

Appendix B—Sample Feature File and Comparison to TTOASM Input

A sample feature file is shown in the table below. It specifies ligature and swash substitution features. The swash feature indicates that when a word starts with an uppercase letter followed by a lowercase letter, the uppercase letter is to be substituted by its swash version.

```
# - - - Feature file for glyph substitution table - - -
# Ligature Substitution
feature liga {
   substitute f f i by ffi;
   substitute f f l by ffl;
   substitute f f by ff;
   substitute f i by fi;
   substitute f l by fl;
}liga;
# Swash Substitution
feature swsh {
   substitute space [A–N P–Z]' [a–z] by [Aswash–Nswash Pswash–Zswash];
}swsh;
```

The equivalent TTOASM specification file is shown in the following table. (Comments are introduced by the ';' character.)

```
; --- TTOASM specification file for glyph substitution table ---
; Glyph ids
;
DEFINE spaceGID = 1
DEFINE CapAGID = 34
DEFINE CapNGID = 47
DEFINE CapPGID = 49
DEFINE CapZGID = 59
DEFINE aGID = 66
DEFINE fGID = 71
DEFINE iGID = 74
DEFINE lGID = 77
DEFINE zGID = 91
DEFINE ffGID = 239
DEFINE fflGID = 240
DEFINE fflGID = 241
DEFINE fiGID = 109
DEFINE flGID = 110
DEFINE AswashGID = 296
DEFINE BswashGID = 365
DEFINE CswashGID = 376
DEFINE DswashGID = 301
DEFINE EswashGID = 347
DEFINE FswashGID = 338
DEFINE GswashGID = 287
DEFJNE HswashGID = 304
DEFINE IswashGID = 322
DEFINE JswashGID = 285
DEFINE KswashGID = 351
DEFINE LswashGID = 414
DEFINE MswashGID = 363
DEFINE NswashGID = 316
DEFINE PswashGID = 314
DEFINE QswashGID = 289
DEFINE RswashGID = 326
DEFINE SswashGID = 370
DEFINE TswashGID = 346
DEFINE UswashGID = 339
DEFINE VswashGID = 332
DEFINE WswashGID = 354
DEFINE XswashGID = 367
DEFINE YswashGID = 257
DEFINE ZswashGID = 260
; --- GSUB Header ---
;
GSUBHeader theGSuBHeader
0X00010000     ; Version
theScriptList
theFeatureList
theLookupList
; --- Script List ---
;
ScriptList theScriptList
1              ; ScriptCount
ScriptRecord[0]
'latn'         ; Tag
Script0        ; Script table offset
Script Script0
DefaultLangSys
0              ; LangSysCount
LangSys DefaultLangSys
NULL
0XFFFF         ; ReqFeatureIndex
2              ; Feature Index Count
0              ; Feature Indices
1
; --- Feature List ---
;
FeatureList theFeatureList
2              ; FeatureCount
'swsh'         ; FeatureRecord[0]
FeatureSwsh
'lig'          ; FeatureRecord[1]
FeatureLiga
Feature FeatureSwsh
NULL
1              ; LookupCount
0              ; LookupListIndex
Feature FeatureLiga
NULL
1              ; LookupCount
1              ; LookupListIndex
; --- Lookup List ---
LookupList theLookupList
```

```
                                -continued

3                  ; LookupCount
LookupSwsh
LookupLiga
LookupSwshSubst
; --- Ligature Substitution ---
;
Lookup LookupLiga
4                  ; LookupType
0                  ; LookupFlag
1                  ; SubTableCount
SubstTableLiga
LigatureSubstFormat1 SubstTableLiga
1                  ; Format
CoverageLiga
1                  ; LigSetCount
LigatureSetLiga0
LigatureSet LigatureSetLiga0
5                  ; LigatureCount
LigatureLiga0
LigatureLiga1
LigatureLiga2
LigatureLiga3
LigatureLiga4
Ligature LigatureLiga0
ffiGID             ; Ligature glyph
3                  ; ComponentCount
fGID               ; ComponentList
iGID
Ligature LigatureLiga1
fflGID             ; Ligature glyph
3                  ; ComponentCount
fGID               ; ComponentList
lGID
Ligature LigatureLiga2
ffGID              ; Ligature glyph
2                  ; ComponentCount
fGID               , ComponentList
Ligature LigatureLiga3
fiGID              ; Ligature glyph
2                  ; ComponentCount
iGID               ; ComponentList
Ligature LigatureLiga4
flGID              ; Ligature glyph
2                  ; ComponentCount
lGID               ; ComponentList
CoverageFormat1 CoverageLiga
1                  ; Format 1
1                  ; GlyphCount
fGID               ; GlyphList
; --- Smart Swash Substitution ---
;
Lookup LookupSwsh
5                  ; LookupType
0                  ; LookupFlag
1                  ; SubTableCount
SubstTableSwsh0
ContextSubstFormat2 SubstTableSwsh0
2                  ; Format 2
CoverageBEG
ClassSwsh
4                  ; SubClassSetCount
NULL               ; Class 0
SubClassSetSwsh0   ; Class 1
NULL               ; Class 2
NULL               ; Class 3
SubClassSet SubClassSetSwsh0
1                  ; SubClassRuleCount
SubclassRuleSwsh0
SubClassRule SubClassRuleSwsh0
3                  ; GlyphCount
1                  ; SubstCount
2                  ; Class[2]
3                  ; Class[3]
; SubstLookupRecord[0]
1                  ; SequenceIndex
4                  ; LookupListIndex Lookup LookupSwshSubst
1                  ; LookupType
0                  ; LookupFlag
1                  ; SubTableCount
SubstTableSwsh1
SingleSubstFormat2 SubstTableSwsh1
2                  ; Format 2
CoverageSwshSubst
25                 ; GlyphCount
AswashGID          ; GlyphList
BswashGID
CswashGID
DswashGID
FswashGID
FswashGID
GswashGID
HswashGID
IswashGID
JswashGID
KswashGID
LswashGID
MswashGID
NswashGID
PswashGID
QswashGID
RswashGID
SswashGID
TswashGID
UswashGID
VswashGID
WswashGID
XswashGID
YswashGID
ZswashGID
CoverageFormat2 CoverageSwshSubst
2                  ; Format 2
2                  ; CoverageRangeCount
; RangeRecord[0]
CapAGID            ; RangeStart
CapNGID            ; RangeEnd
0                  ; StartCoverageIndex
; RangeRecord[1]
CapPGID            ; RangeStart
CapZGID            ; RangeEnd
14                 ; StartCoverageIndex
CoverageFormat1 CoverageBEG
1                  ; Format 1
1                  ; GlyphCount
spaceGID           ; GlyphList
ClassDefFormat2 ClassSwsh
2                  ; Format 2
4                  ; ClassRangeCount
; ClassRangeRecord[0]
spaceGID           ; Start
spaceGID           ; End
1                  ; Class
; ClassRangeRecord[1]
CapAGID            ; Start
CapNGID            ; End
2                  ; Class
; ClassRangeRecord[2]
CapPGID            ; Start
CapZGID            ; End
2                  ; Class
; ClassRangeRecord[3]
aGID               ; Start
zGID               ; End
3                  ; Class
```

Appendix C—OpenType™ Font Specification
(Partial)

An OpenType font file contains data, in table format, that defines either a TrueType or a PostScript outline font. Rasterizers use combinations of data from the tables contained in the font to render the TrueType or PostScript glyph outlines.

The following data types can be used in an OpenType font file.

| Data Type | Description |
| --- | --- |
| BYTE | 8-bit unsigned integer. |
| CHAR | 8-bit signed integer. |
| USHORT | 16-bit unsigned integer. |
| SHORT | 16-bit signed integer. |
| ULONG | 32-bit unsigned integer. |
| LONG | 32-bit signed integer. |
| Fixed | 32-bit signed fixed-point number (16.16). |
| FUNIT | Smallest measurable distance in the em space. |
| F2DOT14 | 16-bit signed fixed number with the low 14 bits of fraction (2.14). |
| LONGDATETIME | Date represented in number of seconds since 12:00 midnight, January 1, 1904. The value is represented as a signed 64-bit integer. |
| Tag | Array of four uint8s (length = 32 bits) used to identify a script, language system, feature, or baseline. |
| GlyphID | Glyph index number, same as uint16 (length = 16 bits) |
| Offset | Offset to a table, same as uint16 (length = 16 bits), NULL offset = 0x0000 |

Most font tables have version numbers, and the version number for the entire font is contained in the Table Directory. Programs reading tables can check version numbers so that if and when the format and therefore the version number changes, older implementations will reject newer versions gracefully, if the changes are incompatible.

A key characteristic of the OpenType format is the TrueType sfnt "wrapper", which provides organization for a collection of tables in a general and extensible manner.

The OpenType font file begins at byte 0 with the Offset Table, shown below.

| Type | Name | Description |
| --- | --- | --- |
| Fixed | sfnt version | 0x00010000 for version 1.0. |
| USHORT | numTables | Number of tables. |
| USHORT | searchRange | (Maximum power of 2 ≤ numTables) x 16. |
| USHORT | entrySelector | Log2(maximum power of 2 ≤ numTables). |
| USHORT | rangeShift | NumTables x 16 − searchRange. |

The Offset Table is followed at byte 12 by the Table Directory entries. Entries in the Table Directory must be sorted in ascending order by tag. Offset values in the Table Directory are measured from the start of the font file.

Table Directory Entries

| Type | Name | Description |
| --- | --- | --- |
| ULONG | tag | 4-byte identifier. |
| ULONG | checkSum | CheckSum for this table. |
| ULONG | offset | Offset from beginning of TrueType font file. |
| ULONG | length | Length of this table. |

The Table Directory makes it possible for a given font to contain only those tables it actually needs. As a result there is no standard value for numTables.

Tags are the names given to tables in the OpenType font file. All tag names consist of four characters, including any necessary trailing spaces. All tag names defined within a font (e.g., table names, feature tags, language tags) must be built from printing characters represented by ASCII values 32–126 (decimal).

A TrueType Collection (TTC) is a means of delivering multiple OpenType fonts in a single file structure. TrueType Collections are most useful when the fonts to be delivered together share many glyphs in common. By allowing multiple fonts to share glyph sets, TTCs can result in a significant saving of file space.

A TrueType Collection file consists of a single TTC Header table, two or more Table Directories, and a number of OpenType tables. The TTC Header is located at the beginning of the TTC file. The TTC file contains a complete Table Directory for each different font design. A TTC file Table Directory has exactly the same format as a TTF file Table Directory. Each OpenType table in a TTC file is referenced through the Table Directories of all fonts which use that table. Some of the OpenType tables must appear multiple times, once for each font included in the TTC; while other tables can be shared by all fonts in the TTC. The tables that should have a unique copy for each font are those that are used by the system in identifying the font and its character mapping. The tables that should be shared by all fonts in the TTC are those that define glyph and instruction data or use glyph indices to access data. In practice, any tables which have identical data for two or more fonts may be shared.

The purpose of the TTC Header table is to locate the different Table Directories within a TTC file. The TTC Header is located at the beginning of the TTC file (offset=0). It consists of an identification tag, a version number, a count of the number of OpenType fonts (Table Directories) in the file, and an array of offsets to each Table Directory.

OpenType Layout Tables

OpenType Layout consists of five optional layout tables that support advanced typographic functions: the Glyph Substitution table (GSUB), the Glyph Positioning table (GPOS), the Baseline table (BASE), the Justification table (JSTF), and the Glyph Definition table (GDEF).

The OpenType Layout tables provide typographic information for properly positioning and substituting glyphs, operations that are required for accurate typography in many language environments. OpenType Layout data is organized by script, language system, typographic feature, and lookup.

Scripts are defined at the top level. A script is a collection of glyphs used to represent one or more languages in written form. For instance, a single script—Latin—is used to write English, French, German, and many other languages. In contrast, three scripts—Hiragana, Katakana, and Kanji—are used to write Japanese. With OpenType Layout, multiple scripts may be supported by a single font.

A language system may modify the functions or appearance of glyphs in a script to represent a particular language. For example, the eszet ligature is used in the German language system, but not in French or English. In OpenType Layout, language systems are defined within scripts.

A language system defines features, which are typographic rules for using glyphs to represent a language. Sample features are a "vert" feature that substitutes vertical glyphs in Japanese, a "liga" feature for using ligatures in place of separate glyphs, and a "mark" feature that positions diacritical marks with respect to base glyphs in Arabic. In the absence of language-specific rules, default language system features apply to the entire script.

Features are implemented with lookup data that the text-processing client uses to substitute and position glyphs. Lookups describe the glyphs affected by an operation, the type of operation to be applied to these glyphs, and the resulting glyph output.

OpenType Layout Table Organization

Two OpenType Layout tables, GSUB and GPOS, use the same data formats to describe the typographic functions of glyphs and the languages and scripts that they support: a ScriptList table, a FeatureList table, and a LookupList table. In GSUB, the tables define glyph substitution data. In GPOS, they define glyph positioning data. The following paragraphs describes these common table formats.

The ScriptList identifies the scripts in a font, each of which is represented by a Script table that contains script and language-system data. Language system tables reference features, which are defined in the FeatureList. Each feature table references the lookup data defined in the LookupList that describes how, when, and where to implement the feature.

The information used to substitute and position glyphs is defined in Lookup subtables. Each subtable supplies one type of information, depending upon whether the lookup is part of a GSUB or GPOS table. For instance, a GSUB lookup might specify the glyphs to be substituted and the context in which a substitution occurs, and a GPOS lookup might specify glyph position adjustments for kerning. OpenType Layout has six types of GSUB lookups and eight types of GPOS lookups.

Each subtable includes a Coverage table that lists the "covered" glyphs that will result in a glyph substitution or positioning operation. Some substitution or positioning operations may apply to groups, or classes, of glyphs. GSUB and GPOS Lookup subtables use the Class Definition table to assign glyphs to classes. Lookup subtables also may contain device tables to adjust scaled contour glyph coordinates for particular output sizes and resolutions.

Three tables and their associated records apply to scripts and languages: the Script List table (ScriptList) and its script record (ScriptRecord), the Script table and its language system record (LangSysRecord), and the Language System table (LangSys).

OpenType Layout fonts may contain one or more groups of glyphs used to render various scripts, which are enumerated in a ScriptList table. Both the GSUB and GPOS tables define Script List tables (ScriptList):

The GSUB table uses the ScriptList table to access the glyph substitution features that apply to a script. The GPOS table uses the ScriptList table to access the glyph positioning features that apply to a script.

A ScriptList table, shown below, consists of a count of the scripts represented by the glyphs in the font (ScriptCount) and an array of records (ScriptRecord), one for each script for which the font defines script-specific features (a script without script-specific features does not need a ScriptRecord). The ScriptRecord array stores the records alphabetically by a ScriptTag that identifies the script. Each ScriptRecord consists of a ScriptTag and an offset to a Script table.

ScriptList Table

| Type | Name | Description |
|---|---|---|
| uint16 | ScriptCount | Number of ScriptRecords |
| struct | ScriptRecord[ScriptCount] | Array of ScriptRecords-listed alphabetically by ScriptTag |

ScriptRecord

| Type | Name | Description |
|---|---|---|
| Tag | ScriptTag | 4-byte ScriptTag identifier |
| Offset | Script | Offset to Script table-from beginning of ScriptList |

A Script table identifies each language system that defines how to use the glyphs in a script for a particular language. It also references a default language system that defines how to use the script's glyphs in the absence of language-specific knowledge.

A Script table, shown below, begins with an offset to the Default Language System table (DefaultLangSys), which defines the set of features that regulate the default behavior of the script. Next, Language System Count (LangSysCount) defines the number of language systems (excluding the DefaultLangSys) that use the script. In addition, an array of Language System Records (LangSysRecord) defines each language system (excluding the default) with an identification tag (LangSysTag) and an offset to a Language System table (LangSys). The LangSysRecord array stores the records alphabetically by LangSysTag.

If no language-specific script behavior is defined, the LangSysCount is set to zero (0), and no LangSysRecords are allocated.

Script Table

| Type | Name | Description |
|---|---|---|
| Offset | DefaultLangSys | Offset to DefaultLangSys table, from beginning of Script table-may be NULL |
| uint16 | LangSysCount | Number of LangSysRecords for this script-excluding the DefaultLangSys |
| struct | LangSysRecord[LangSysCount] | Array of LangSysRecords-listed alphabetically by LangSysTag |

LangSysRecord

| Type | Name | Description |
|---|---|---|
| Tag | LangSysTag | 4-byte LangSysTag identifier |
| Offset | LangSys | Offset to LangSys table-from beginning of Script table |

The Language System table (LangSys) identifies language-system features used to render the glyphs in a script. Optionally, a LangSys table may define a Required Feature Index (ReqFeatureIndex) to specify one feature as required within the context of a particular language system. Only one feature index value can be tagged as the ReqFeatureIndex. This is not a functional limitation, however, because the feature and lookup definitions in OpenType Layout are structured so that one feature table can reference many glyph substitution and positioning lookups.

All other features are optional. For each optional feature, a zero-based index value references a record (FeatureRecord) in the FeatureRecord array, which is stored in a Feature List table (FeatureList). The feature indices themselves (excluding the ReqFeatureIndex) are stored in arbitrary order in the FeatureIndex array. The FeatureCount specifies the total number of features listed in the FeatureIndex array.

Features are specified in full in the FeatureList table, FeatureRecord, and Feature table.

| LangSys Table | | |
|---|---|---|
| Type | Name | Description |
| Offset | LookupOrder | (reserved for an offset to a reordering table) |
| uint16 | ReqFeatureIndex | Index of a feature required for this language system-if no required features = 0xFFFF |
| uint16 | FeatureCount | Number of FeatureIndex values for this language system-excludes the required feature |
| uint16 | FeatureIndex[FeatureCount] | Array of indices into the FeatureList-in arbitrary order |

Features define the functionality of an OpenType Layout font and they are named to convey meaning to the text-processing client. Consider a feature named "liga" to create ligatures. Because of its name, the client knows what the feature does and can decide whether to apply it. Font developers can use these features, as well as create their own.

After choosing which features to use, the client assembles all lookups from the selected features. Multiple lookups may be needed to define the data required for different substitution and positioning actions, as well as to control the sequencing and effects of those actions.

To implement features, a client applies the lookups in the order the lookup definitions occur in the LookupList. As a result, within the GSUB or GPOS table, lockups from several different features may be interleaved during text processing. A lookup is finished when the client locates a target glyph or glyph context and performs a substitution (if specified) or a positioning (if specified).

The substitution (GSUB) lookups always occur before the positioning (GPOS) lookups. The lookup sequencing mechanism in TrueType relies on the font to determine the proper order of text-processing operations.

Lookup data is defined in one or more subtables that contain information about specific glyphs and the operations to be performed on them. Each type of lookup has one or more corresponding subtable definitions. The choice of a subtable format depends upon two factors: the precise content of the information being applied to an operation, and the required storage efficiency.

OpenType Layout features define information that is specific to the layout of the glyphs in a font. They do not encode information that is constant within the conventions of a particular language or the typography of a particular script.

The headers of the GSUB and GPOS tables contain offsets to Feature List tables (FeatureList) that enumerate all the features in a font. Features in a particular FeatureList are not limited to any single script. A FeatureList contains the entire list of either the GSUB or GPOS features that are used to render the glyphs in all the scripts in the font.

The FeatureList table enumerates features in an array of records (FeatureRecord) and specifies the total number of features (FeatureCount). Every feature must have a FeatureRecord, which consists of a FeatureTag that identifies the feature and an offset to a Feature table. The FeatureRecord array is arranged alphabetically by FeatureTag names. The values stored in the FeatureIndex array of a LangSys table are used to locate records in the FeatureRecord array of a FeatureList table.

| FeatureList Table | | |
|---|---|---|
| Type | Name | Description |
| uint16 | FeatureCount | Number of FeatureRecords in this table |
| struct | FeatureRecord[FeatureCount] | Array of FeatureRecords-zero-based (first feature has FeatureIndex = 0)-listed alphabetically by FeatureTag FeatureRecord |
| Tag | FeatureTag | 4-byte feature identification tag |
| Offset | Feature | Offset to Feature table-from beginning of FeatureList |

A Feature table defines a feature with one or more lookups. The client uses the lookups to substitute or position glyphs.

Feature tables defined within the GSUB table contain references to glyph substitution lookups, and feature tables defined within the GPOS table contain references to glyph positioning lookups. If a text-processing operation requires both glyph substitution and positioning, then both the GSUB and GPOS tables must each define a Feature table, and the tables must use the same FeatureTags.

A Feature table consists of an offset to a Feature Parameters (FeatureParams) table (currently reserved for future use and set to NULL), a count of the lookups listed for the feature (LookupCount), and an arbitrarily ordered array of indices into a LookupList (LookupListIndex). The LookupList indices are references into an array of offsets to Lookup tables.

To identify the features in a GSUB or GPOS table, a text-processing client reads the FeatureTag of each FeatureRecord referenced in a given LangSys table. Then the client selects the features it wants to implement and uses the LookupList to retrieve the Lookup indices of the chosen features. Next, the client arranges the indices in the LookupList order. Finally, the client applies the lookup data to substitute or position glyphs.

| Feature Table | | |
|---|---|---|
| Type | Name | Description |
| Offset | FeatureParams | = NULL (reserved for offset to FeatureParams) |
| uint16 | LookupCount | Number of LookupList indices for this feature |
| uint16 | LookupListIndex[LookupCount] | Array of LookupList indices for this feature-zero-based (first lookup is LookupListIndex = 0) |

The headers of the GSUB and GPOS tables contain offsets to Lookup List tables (LookupList) for glyph substitution (GSUB table) and glyph positioning (GPOS table). The LookupList table contains an array of offsets to Lookup tables (Lookup). The font developer defines the Lookup sequence in the Lookup array to control the order in which a text-processing client applies lookup data to glyph substitution and positioning operations. LookupCount specifies the total number of Lookup table offsets in the array.

| LookupList Table | | |
|---|---|---|
| Type | Name | Description |
| uint16 | LookupCount | Number of lookups in this table |
| Offset | Lookup[LookupCount] | Array of offsets to Lookup tables-from beginning of LookupList-zero based (first lookup is Lookup index = 0) |

A Lookup table (Lookup) defines the specific conditions, type, and results of a substitution or positioning action that is used to implement a feature. For example, a substitution operation requires a list of target glyph indices to be replaced, a list of replacement glyph indices, and a description of the type of substitution action.

Each Lookup table may contain only one type of information (LookupType), determined by whether the lookup is part of a GSUB or GPOS table.

Each LookupType is defined with one or more subtables, and each subtable definition provides a different representation format. The format is determined by the content of the information required for an operation and by required storage efficiency. When glyph information is best presented in more than one format, a single lookup may contain more than one subtable, as long as all the subtables are the same LookupType. For example, within a given lookup, a glyph index array format may best represent one set of target glyphs, whereas a glyph index range format may be better for another set of target glyphs.

During text processing, a client applies a lookup to each glyph in the string before moving to the next lookup. A lookup is finished for a glyph after the client makes the substitution or positioning operation. To move to the "next" glyph, the client will typically skip all the glyphs that participated in the lookup operation: glyphs that were substituted or positioned as well as any other glyphs that formed a context for the operation. However, in the case of pair positioning operations (i.e., kerning), the "next" glyph in a sequence may be the second glyph of the positioned pair.

A Lookup table contains a LookupType, specified as an integer, that defines the type of information stored in the lookup. The LookupFlag specifies lookup qualifiers that assist a text-processing client in substituting or positioning glyphs. The SubTableCount specifies the total number of SubTables. The SubTable array specifies offsets, measured from the beginning of the Lookup table, to each SubTable enumerated in the SubTable array.

| Lookup Table | | |
|---|---|---|
| Type | Name | Description |
| uint16 | LookupType | Different enumerations for GSUB and GPOS |
| uint16 | LookupFlag | Lookup qualifiers |
| uint16 | SubTableCount | Number of SubTables for this lookup |
| Offset | SubTable[SubTableCount] | Array of offsets to SubTable-from beginning of Lookup table |

The LookupFlag uses three bits and one byte: The first bit is reserved. The next three bits—IgnoreBaseGlyphs, IgnoreLigatures, and Ignoremarks—are set to specify additional instructions for applying a lookup to a glyph string. The high byte is set to specify the type of mark attachment.

| LookupFlag bit enumeration | | |
|---|---|---|
| Type | Name | Description |
| 0x0001 | Reserved | For future use |
| 0x0002 | IgnoreBaseGlyphs | If set, skips over base glyphs |
| 0x0004 | IgnoreLigatures | If set, skips over ligatures |
| 0x0008 | IgnoreMarks | If set, skips over combining marks |
| 0x00F0 | Reserved | For future use |
| 0xFF00 | MarkAttachmentType | If not zero, skips over all marks of attachment type different from specified. |

For example, in Arabic text, a character string might have the pattern <base character—mark character—base character>. That string could be converted into a ligature composed of two components, one for each base character, with the combining mark glyph over the first component. To produce this ligature, the font developer would set the IgnoreMarks bit to tell the client to ignore the mark, substitute the ligature glyph first, and then position the mark glyph over the ligature. Alternatively, a lookup which did not set the IgnoreMarks bit could be used to describe a three-component ligature glyph, composed of the first base glyph, the mark glyph, and the second base glyph. For another example, a lookup that creates a ligature of a base glyph with a top mark may skip over all bottom marks by specifying the mark attachment type as top marks. One can define attachment types of marks in the MarkAttachClassDef subtable in the GDEF table.

Each subtable in a lookup references a Coverage table (Coverage), which specifies all the glyphs affected by a substitution or positioning operation described in the subtable. The GSUB, GPOS, and GDEF tables rely on this notion of coverage. If a glyph does not appear in a Coverage table, the client can skip that subtable and move immediately to the next subtable.

A Coverage table identifies glyphs by glyph indices (GlyphIDs) either of two ways: (i) as a list of individual glyph indices in the glyph set, or (ii) as ranges of consecutive indices. The range format gives a number of start-glyph and end-glyph index pairs to denote the consecutive glyphs covered by the table. A format code (CoverageFormat) specifies the format as an integer: 1=lists, and 2=ranges.

A Coverage table defines a unique index value (Coverage Index) for each covered glyph. This unique value specifies the position of the covered glyph in the Coverage table. The client uses the Coverage Index to look up values in the subtable for each glyph.

Coverage Format 1 for a Coverage table consists of a format code (CoverageFormat) and a count of covered glyphs (GlyphCount), followed by an array of glyph indices (GlyphArray). The glyph indices must be in numerical order for binary searching of the list. When a glyph is found in the Coverage table, its position in the GlyphArray determines the Coverage Index that is returned—the first glyph has a Coverage Index=0, and the last glyph has a Coverage Index=GlyphCount−1.

CoverageFormat1 Table: Individual Glyph Indices

| Type | Name | Description |
| --- | --- | --- |
| uint16 | CoverageFormat | Format identifier-format = 1 |
| uint16 | GlyphCount | Number of glyphs in the GlyphArray |
| GlyphID | GlyphArray[GlyphCount] | Array of GlyphIDs-in numerical order |

Coverage Format 2 for a Coverage table consists of a format code (CoverageFormat) and a count of glyph index ranges (RangeCount), followed by an array of records (RangeRecords). Each RangeRecord consists of a start glyph index (Start), an end glyph index (End), and the Coverage Index associated with the range's Start glyph. Ranges must be in GlyphID order, and they must be distinct with no overlapping. The Coverage Indexes for the first range begin with zero (0), and the Start Coverage Indexes for each succeeding range are determined by adding the length of the preceding range (End GlyphID—Start GlyphID+1) to the array Index. This allows for a quick calculation of the Coverage Index for any glyph in any range using the formula: Coverage Index (GlyphID)= StatrCoverageIndex+GlyphID–Start GlyphID.

CoverageFormat2 Table: Range of Glyphs

| Type | Name | Description |
| --- | --- | --- |
| uint16 | CoverageFormat | Format identifier-format = 2 |
| uint16 | RangeCount | Number of RangeRecords |
| struct | RangeRecord[RangeCount] | Array of glyph ranges- ordered by Start GlyphID |

RangeRecord

| Type | Name | Description |
| --- | --- | --- |
| GlyphID | Start | First GlyphID in the range |
| GlyphID | End | Last GlyphID in the range |
| uint16 | StartCoverageIndex | Coverage Index of first GlyphID in range |

In OpenType Layout, index values identify glyphs. For efficiency and ease of representation, a font developer can group glyph indices to form glyph classes. Class assignments vary in meaning from one lookup subtable to another. For example, in the GSUB and GPOS tables, classes are used to describe glyph contexts.

Consider a substitution action that replaces only the lowercase ascender glyphs in a glyph string. To describe more easily the appropriate context for the substitution, the font developer might divide the font's lowercase glyphs into two classes, one that contains the ascenders and one that contains the glyphs without ascenders.

A font developer can assign any glyph to any class, each identified with an integer called a class value. A Class Definition table (ClassDef) groups glyph indices by class, beginning with Class 1, then Class 2, and so on. All glyphs not assigned to a class fall into Class 0. Within a given class definition table, each glyph in the font belongs to exactly one class.

The ClassDef table can have either of two formats: one that assigns a range of consecutive glyph indices to different classes, or one that puts groups of consecutive glyph indices into the same class.

The first class definition format (ClassDefFormat1) specifies a range of consecutive glyph indices and a list of corresponding glyph class values. This table is useful for assigning each glyph to a different class because the glyph indices in each class are not grouped together.

A ClassDef Format 1 table begins with a format identifier (ClassFormat). The range of glyph indices (GlyphIDs) covered by the table is identified by two values: the GlyphID of the first glyph (StartGlyph), and the number of consecutive GlyphIDs (including the first one) that will be assigned class values (GlyphCount). The ClassValueArray lists the class value assigned to each GlyphID, starting with the class value for StartGlyph and following the same order as the GlyphIDs. Any glyph not included in the range of covered GlyphIDs automatically belongs to Class 0.

ClassDefFormat1 Table: Class Array

| Type | Name | Description |
| --- | --- | --- |
| uint16 | ClassFormat | Format identifier-format = 1 |
| GlyphID | StartGlyph | First GlyphID of the ClassValueArray |
| uint16 | GlyphCount | Size of the ClassValueArray |
| uint16 | ClassValueArray[GlyphCount] | Array of Class Values-one per GlyphID |

The second class definition format (ClassDefFormat 2) defines multiple groups of glyph indices that belong to the same class. Each group consists of a discrete range of glyph indices in consecutive order (ranges cannot overlap). The ClassDef Format 2 table contains a format identifier (ClassFormat), a count of ClassRangeRecords that define the groups and assign class values (ClassRangeCount), and an array of ClassRangeRecords ordered by the GlyphID of the first glyph in each record (ClassRangeRecord).

Each ClassRangeRecord consists of a Start glyph index, an End glyph index, and a Class value. All GlyphIDs in a range, from Start to End inclusive, constitute the class identified by the Class value. Any glyph not covered by a ClassRangeRecord is assumed to belong to Class 0.

ClassDefFormat2 Table: Class Ranges

| Type | Name | Description |
| --- | --- | --- |
| uint16 | ClassFormat | Format identifier-format = 2 |
| uint16 | ClassRangeCount | Number of ClassRangeRecords |
| struct | ClassRangeRecord [ClassRangeCount] | Array of ClassRangeRecords - ordered by Start GlyphID |

ClassRangeRecord

| Type | Name | Description |
| --- | --- | --- |
| GlyphID | Start | First GlyphID in the range |
| GlyphID | End | Last GlyphID in the range |
| uint16 | Class | Applied to all glyphs in the range |

Glyphs in a font are defined in design units specified by the font developer. Font scaling increases or decreases a glyph's size and rounds it to the nearest whole pixel. However, precise glyph positioning often requires adjustment of these scaled and rounded values. Hinting, applied to points in the glyph outline, is an effective solution to this problem, but it may require the font developer to redesign or re-hint glyphs.

Another solution—used by the GPOS, BASE, JSTF, and GDEF tables—is to use a Device table to specify correction values to adjust the scaled design units. A Device table applies the correction values to the range of sizes identified by StartSize and EndSize, which specify the smallest and largest pixel-per-em (ppem) sizes needing adjustment.

Because the adjustments often are very small (a pixel or two), the correction can be compressed into a 2-, 4-, or 8-bit representation per size. Two bits can represent a number in the range {-2, -1, 0, or 1}, four bits can represent a number in the range {-8 to 7}, and eight bits can represent a number in the range {-128 to 127}. The Device table identifies one of three data formats—signed 2-, 4, - or 8-bit values—for the adjustment values (DeltaFormat). A single Device table provides delta information for one coordinate at a range of sizes.

| Type | Name | Description |
| --- | --- | --- |
| 1 | 2 | Signed 2-bit value, 8 values per uint16 |
| 2 | 4 | Signed 4-bit value, 4 values per uint16 |
| 3 | 8 | Signed 8-bit value, 2 values per uint16 |

The 2-, 4-, or 8-bit signed values are packed into uint16's most significant bits first. For example, using a DeltaFormat of 2 ( 4-bit values), an array of values equal to {1, 2, 3, -1} would be represented by the DeltaValue 0x123F.

The DeltaValue array lists the number of pixels to adjust specified points on the glyph, or the entire glyph, at each ppem size in the targeted range. In the array, the first index position specifies the number of pixels to add or subtract from the coordinate at the smallest ppem size that needs correction, the second index position specifies the number of pixels to add or subtract from the coordinate at the next ppem size, and so on for each ppem size in the range.

| | | Device Table |
| --- | --- | --- |
| Type | Name | Description |
| uint16 | StartSize | Smallest size to correct-in ppem |
| uint16 | EndSize | Largest size to correct-in ppem |
| uint16 | DeltaFormat | Format of DeltaValue array data: 1, 2, or 3 |
| uint16 | DeltaValue[ ] | Array of compressed data |

GSUB—The Glyph Substitution Table

The Glyph Substitution table (GSUB) contains information for substituting glyphs to render the scripts and language systems supported in a font. Many language systems require glyph substitutes. In other language systems, glyph substitutes are aesthetic options for the user, such as the use of ligature glyphs in the English language.

Many fonts use limited character encoding standards that map glyphs to characters one-to-one, assigning a glyph to each character code value in a font. Multiple character codes cannot be mapped to a single glyph, as needed for ligature glyphs, and multiple glyphs cannot be mapped to a single character code, as needed to decompose a ligature into its component glyphs.

To supply glyph substitutes, font developers must assign different character codes to the glyphs, or they must create additional fonts or character sets. To access these glyphs, users must bear the burden of switching between character codes, character sets, or fonts.

The OpenType GSUB table fully supports glyph substitution. To access glyph substitutes, GSUB maps from the glyph index or indices defined in a cmap table to the glyph index or indices of the glyph substitutes. For example, if a font has three alternative forms of an ampersand glyph, the cmap table associates the ampersand's character code with only one of these glyphs. In GSUB, the indices of the other ampersand glyphs are then referenced by this one index.

The text-processing client uses the GSUB data to manage glyph substitution actions. GSUB identifies the glyphs that are input to and output from each glyph substitution action, specifies how and where the client uses glyph substitutes, and regulates the order of glyph substitution operations. Any number of substitutions can be defined for each script or language system represented in a font.

The GSUB table supports five types of glyph substitutions that are widely used in international typography:

(1) A single substitution replaces a single glyph with another single glyph. This is used to render positional glyph variants in Arabic and vertical text in the Far East.

(2) A multiple substitution replaces a single glyph with more than one glyph. This is used to specify actions such as ligature decomposition.

(3) An alternate substitution identifies functionally equivalent but different looking forms of a glyph. These glyphs are often referred to as aesthetic alternatives. For example, a font might have five different glyphs for the ampersand symbol, but one would have a default glyph index in the cmap table. The client could use the default glyph or substitute any of the four alternatives.

(4) A ligature substitution replaces several glyph indices with a single glyph index, as when an Arabic ligature glyph replaces a string of separate glyphs.

(5) Contextual substitution, the most powerful type, describes glyph substitutions in context—that is, a substitution of one or more glyphs within a certain pattern of glyphs. Each substitution describes one or more input glyph sequences and one or more substitutions to be performed on that sequence. Contextual substitutions can be applied to specific glyph sequences, glyph classes, or sets of glyphs.

The GSUB table begins with a header that defines offsets to a ScriptList, a FeatureList, and a LookupList. The ScriptList identifies all the scripts and language systems in the font that use glyph substitutes. The FeatureList defines all the glyph substitution features required to render these scripts and language systems. The LookupList contains all the lookup data needed to implement each glyph substitution feature.

Lookup data is defined in one or more subtables that define the specific conditions, type, and results of a substitution action used to implement a feature. All subtables in a lookup must be of the same LookupType, as listed in the LookupType Enumeration table.

Lookuptype Enumeration Table for Glyph Substitution

| Value | Type | Description |
|---|---|---|
| 1 | Single | Replace one glyph with one glyph |
| 2 | Multiple | Replace one glyph with more than one glyph |
| 3 | Alternate | Replace one glyph with one of many glyphs |
| 4 | Ligature | Replace multiple glyphs with one glyph |
| 5 | Context | Replace one or more glyphs in context |
| 6 | Chaining Context | Replace one or more glyphs in chained context |
| 7+ | Reserved | For future use |

Each LookupType subtable has one or more formats. The "best" format depends on the type of substitution and the resulting storage efficiency. When glyph information is best presented in more than one format, a single lookup may define more than one subtable, as long as all the subtables are for the same LookupType. For example, within a given lookup, a glyph index array format may best represent one set of target glyphs, whereas a glyph index range format may be better for another set.

A series of substitution operations on the same glyph or string requires multiple lookups, one for each separate action. Each lookup is given a different array number in the LookupList table and is applied in the LookupList order.

During text processing, a client applies a lookup to each glyph in the string before moving to the next lookup. A lookup is finished for a glyph after the client locates the target glyph or glyph context and performs a substitution, if specified. To move to the "next" glyph, the client will typically skip all the glyphs that participated in the lookup operation: glyphs that were substituted as well as any other glyphs that formed a context for the operation. In the case of chained contextual lookups, glyphs comprising backtrack and lookahead sequences may participate in more than one context.

The following paragraphs describe the GSUB header and the subtables defined for each GSUB LookupType.

The GSUB table begins with a header that contains a version number for the table (Version) and offsets to a three tables: ScriptList, FeatureList, and LookupList.

GSUB Header

| Type | Name | Description |
|---|---|---|
| Fixed | Version | Version of the GSUB table-initially set to 0x00010000 |
| Offset | ScriptList | Offset to ScriptList table-from beginning of GSUB table |
| Offset | FeatureList | Offset to FeatureList table-from beginning of GSUB table |
| Offset | LookupList | Offset to LookupList table-from beginning of GSUB table |

Single substitution (SingleSubst) subtables tell a client to replace a single glyph with another glyph. The subtables can be either of two formats. Both formats require two distinct sets of glyph indices: one that defines input glyphs (specified in the Coverage table), and one that defines the output glyphs. Format 1 requires less space than Format 2, but it is less flexible.

Single Substitution Format 1 calculates the indices of the output glyphs, which are not explicitly defined in the subtable. To calculate an output glyph index, Format 1 adds a constant delta value to the input glyph index. For the substitutions to occur properly, the glyph indices in the input and output ranges must be in the same order. This format does not use the Coverage Index that is returned from the Coverage table.

The SingleSubstFormat1 subtable begins with a format identifier (SubstFormat) of 1. An offset references a Coverage table that specifies the indices of the input glyphs. DeltaGlyphID is the constant value added to each input glyph index to calculate the index of the corresponding output glyph.

SingleSubstFormat1 Subtable

| Type | Name | Description |
|---|---|---|
| uint16 | SubstFormat | Format identifier-format = 1 |
| Offset | Coverage | Offset to Coverage table-from beginning of Substitution table |
| int16 | DeltaGlyphID | Add to original GlyphID to get substitute GlyphID |

Single Substitution Format 2 is more flexible than Format 1, but requires more space. It provides an array of output glyph indices (Substitute) explicitly matched to the input glyph indices specified in the Coverage table. The SingleSubstFormat 2 subtable specifies a format identifier (SubstFormat), an offset to a Coverage table that defines the input glyph indices, a count of output glyph indices in the Substitute array (GlyphCount), and a list of the output glyph indices in the Substitute array (Substitute). The Substitute array must contain the same number of glyph indices as the Coverage table. To locate the corresponding output glyph index in the Substitute array, this format uses the Coverage Index returned from the Coverage table.

SingleSubstFormat2 Subtable

| Type | Name | Description |
|---|---|---|
| uint16 | SubstFormat | Format identifier-format = 2 |
| Offset | Coverage | Offset to Coverage table-from beginning of Substitution table |
| uint16 | GlyphCount | Number of GlyphIDs in the Substitute array |
| GlyphID | Substitute[GlyphCount] | Array of substitute GlyphIDs-ordered by Coverage Index |

LookupType 2: Multiple Substitution Subtable. A Multiple Substitution (MultipleSubst) subtable replaces a single glyph with more than one glyph, as when multiple glyphs replace a single ligature. The subtable has a single format: MultipleSubstFormat1. The subtable specifies a format identifier (SubstFormat), an offset to a Coverage table that defines the input glyph indices, a count of offsets in the Sequence array (SequenceCount), and an array of offsets to Sequence tables that define the output glyph indices (Sequence). The Sequence table offsets are ordered by the Coverage Index of the input glyphs.

For each input glyph listed in the Coverage table, a Sequence table defines the output glyphs. Each Sequence table contains a count of the glyphs in the output glyph sequence (GlyphCount) and an array of output glyph indices (Substitute). The order of the output glyph indices depends on the writing direction of the text. For text written left to right, the left-most glyph will be first glyph in the sequence. Conversely, for text written right to left, the right-most glyph will be first.

If the glyph should be deleted, the GlyphCount is set to zero, and no Substitute array is allocated.

MultipleSubstFormat1 Subtable

| Type | Name | Description |
|---|---|---|
| uint16 | SubstFormat | Format identifier-format = 1 |
| Offset | Coverage | Offset to Coverage table-from beginning of Substitution table |
| uint16 | SequenceCount | Number of Sequence table offsets in the Sequence array |
| Offset | Sequence[SequenceCount] | Array of offsets to Sequence tables-from beginning of Substitution table-ordered by Coverage Index |

Sequence Table

| Type | Name | Description |
|---|---|---|
| uint16 | GlyphCount | Number of GlyphIDs in the Substitute array-to indicate glyph deletion, set to zero (0) |
| GlyphID | Substitute[GlyphCount] | String of GlyphIDs to substitute |

LookupType 3: Alternate Substitution Subtable. An Alternate Substitution (AlternateSubst) subtable identifies any number of aesthetic alternatives from which a user can choose a glyph variant to replace the input glyph. For example, if a font contains four variants of the ampersand symbol, the cmap table will specify the index of one of the four glyphs as the default glyph index, and an AlternateSubst subtable will list the indices of the other three glyphs as alternatives. A text-processing client would then have the option of replacing the default glyph with any of the three alternatives.

The subtable has one format: AlternateSubstFormat1. The subtable contains a format identifier (SubstFormat), an offset to a Coverage table containing the indices of glyphs with alternative forms (Coverage), a count of offsets to AlternateSet tables (AlternateSetCount), and an array of offsets to AlternateSet tables (AlternateSet).

For each glyph, an AlternateSet subtable contains a count of the alternative glyphs (GlyphCount) and an array of their glyph indices (Alternate). Because all the glyphs are functionally equivalent, they can be in any order in the array.

AlternateSubstFormat1 Subtable

| Type | Name | Description |
|---|---|---|
| uint16 | SubstFormat | Format identifier-format = 1 |
| Offset | Coverage | Offset to Coverage table-from beginning of Substitution table |
| uint16 | AlternateSetCount | Number of AlternateSet tables |
| Offset | AlternateSet[AlternateSetCount] | Array of offsets to AlternateSet tables-from beginning of Substitution table-ordered by Coverage Index |

AlternateSet Table

| Type | Name | Description |
|---|---|---|
| uint16 | GlyphCount | Number of GlyphIDs in the Alternate array |
| GlyphID | Alternate[GlyphCount] | Array of alternate GlyphIDs-in arbitraty order |

LookupType 4: Ligature Substitution Subtable. A Ligature Substitution (LigatureSubst) subtable identifies ligature substitutions where a single glyph replaces multiple glyphs. One LigatureSubst subtable can specify any number of ligature substitutions. The subtable uses a single format: LigatureSubstFormat1. It contains a format identifier (SubstFormat), a Coverage table offset (Coverage), a count of the ligature sets defined in this table (LigSetCount), and an array of offsets to LigatureSet tables (LigatureSet). The Coverage table specifies only the index of the first glyph component of each ligature set.

LigatureSubstFormat1 Subtable

| Type | Name | Description |
|---|---|---|
| uint16 | SubstFormat | Format identifier-format = 1 |
| Offset | Coverage | Offset to Coverage table-from beginning of Substitution table |
| uint16 | LigSetCount | Number of LigatureSet tables |
| Offset | LigatureSet[LigSetCount] | Array of offsets to LigatureSet tables-from beginning of Substitution table-ordered by Coverage Index |

A LigatureSet table, one for each covered glyph, specifies all the ligature strings that begin with the covered glyph. For example, if the Coverage table lists the glyph index for a lowercase "f," then a LigatureSet table will define the "ffl," "fl," "ffi," "fi," and "ff" ligatures. If the Coverage table also lists the glyph index for a lowercase "e," then a different LigatureSet table will define the "etc" ligature.

A LigatureSet table consists of a count of the ligatures that begin with the covered glyph (LigatureCount) and an array of offsets to Ligature tables, which define the glyphs in each ligature (Ligature). The order in the Ligature offset array defines the preference for using the ligatures. For example, if the "ffl" ligature is preferable to the "ff" ligature, then the Ligature array would list the offset to the "ffl" Ligature table before the offset to the "ff" Ligature table.

LigatureSet Table

| Type | Name | Description |
|---|---|---|
| uint16 | LigatureCount | Number of Ligature tables |
| Offset | Ligature[LigatureCount] | Array of offsets to Ligature tables-from beginning of LigatureSet table-ordered by preference |

For each ligature in the set, a Ligature table specifies the GlyphID of the output ligature glyph (LigGlyph); a count of the total number of component glyphs in the ligature, including the first component (CompCount); and an array of GlyphIDs for the components (Component). The array starts with the second component glyph (array index=1) in the ligature because the first component glyph is specified in the Coverage table.

Ligature Table

| Type | Name | Description |
|---|---|---|
| GlyphID | LigGlyph | GlyphID of ligature to substitute |
| uint16 | CompCount | Number of components in the ligature |

Ligature Table -continued

| Type | Name | Description |
| --- | --- | --- |
| GlyphID | Component[CompCount - 1] | Array of component GlyphIDs-start with the second component-ordered in writing direction |

LookupType 5: Contextual Substitution Subtable. A Contextual Substitution (ContextSubst) subtable defines the most powerful type of glyph substitution lookup: it describes glyph substitutions in context that replace one or more glyphs within a certain pattern of glyphs. ContextSubst subtables can be any of three formats that define a context in terms of a specific sequence of glyphs, glyph classes, or glyph sets. Each format can describe one or more input glyph sequences and one or more substitutions for each sequence. All ContextSubst subtables specify the substitution data in a SubstLookupRecord. A description of that record follows the descriptions of the three formats available for ContextSubst subtables.

Context Substitution Format 1 defines the context for a glyph substitution as a particular sequence of glyphs. For example, a context could be <xyz>, <holiday>, <!?*#@>, or any other glyph sequence. Within a context sequence, Format 1 identifies particular glyph positions (not glyph indices) as the targets for specific substitutions. When a text-processing client locates a context in a string of text, it finds the lookup data for a targeted position and makes a substitution by applying the lookup data at that location. For example, if a client is to replace the glyph string <abc> with its reverse glyph string <cba>, the input context is defined as the glyph sequence, <abc>, and the lookups defined for the context are (1) "a" to "c" and (2) "c" to "a". When a client encounters the context <abc>, the lookups are performed in the order stored. First, "c" is substituted for "a" resulting in <cbc>. Second, "a" is substituted for the "c" that has not yet been touched, resulting in <cba>.

To specify a context, a Coverage table lists the first glyph in the sequence, and a SubRule table identifies the remaining glyphs. To describe the >abc< context used in the previous example, the Coverage table lists the glyph index of the first component of the sequence-the "a" glyph. A SubRule table defines indices for the "b" and "c" glyphs.

A single ContextSubstFormat1 subtable may define more than one context glyph sequence. If different context sequences begin with the same glyph, then the Coverage table should list the glyph only once because all glyphs in the table must be unique. For example, if three contexts each start with an "s" and two start with a "t," then the Coverage table will list one "s" and one "t." For each context, a SubRule table lists all the glyphs that follow the first glyph. The table also contains an array of SubstLookupRecords that specify the substitution lookup data for each glyph position (including the first glyph position) in the context.

All of the SubRule tables defining contexts that begin with the same first glyph are grouped together and defined in a SubRuleSet table. For example, the SubRule tables that define the three contexts that begin with an "s" are grouped in one SubRuleSet table, and the SubRule tables that define the two contexts that begin with a "t" are grouped in a second SubRuleSet table. Each glyph listed in the Coverage table must have a SubRuleSet table defining all the SubRule tables that apply to a covered glyph.

To locate a context glyph sequence, the text-processing client searches the Coverage table each time it encounters a new text glyph. If the glyph is covered, the client reads the corresponding SubRuleSet table and examines each SubRule table in the set to determine whether the rest of the context matches the subsequent glyphs in the text. If the context and text string match, the client finds the target glyph positions, applies the lookups for those positions, and completes the substitutions.

A ContextSubstFormat1 subtable contains a format identifier (SubstFormat), an offset to a Coverage table (Coverage), a count of defined SubRuleSets (SubRuleSetCount), and an array of offsets to the SubRuleSet tables (SubRuleSet). As mentioned, one SubRuleSet table must be defined for each glyph listed in the Coverage table. In the SubRuleSet array, the SubRuleSet table offsets are ordered in the Coverage Index order. The first SubRuleSet in the array applies to the first GlyphID listed in the Coverage table, the second SubRuleSet in the array applies to the second GlyphID listed in the Coverage table, and so on.

ContextSubstFormat1 Subtable

| Type | Name | Description |
| --- | --- | --- |
| uint16 | SubstFormat | Format identifier-format = 1 |
| Offset | Coverage | Offset to Coverage table-from beginning of Substitution table |
| uint16 | SubRuleSetCount | Number of SubRuleSet tables-must equal GlyphCount in Coverage table |
| Offset | SubRuleSet[SubRuleSetCount] | Array of offsets to SubRuleSet tables-from beginning of Substitution table-ordered by Coverage Index |

A SubRuleSet table consists of an array of offsets to SubRule tables (SubRule), ordered by preference, and a count of the SubRule tables defined in the set (SubRuleCount). The order in the SubRule array can be critical. Consider two contexts, <abc> and <abcd>. If <abc> is first in the SubRule array, all instances of <abc> in the text-including all instances of <abcd>-will be changed. If <abcd> comes first in the array, however, only <abcd> sequences will be changed, without affecting any instances of <abc>.

SubRuleSet Table

| Type | Name | Description |
| --- | --- | --- |
| uint16 | SubRuleCount | Number of SubRule tables |
| Offset | SubRule[SubRuleCount] | Array of offsets to SubRule tables-from beginning of SubRuleSet table-ordered by preference |

A SubRule table consists of a count of the glyphs to be matched in the input context sequence (GlyphCount), including the first glyph in the sequence, and an array of glyph indices that describe the context (Input). The Coverage table specifies the index of the first glyph in the context, and the Input array begins with the second glyph (array index=1) in the context sequence.

A SubRule table also contains a count of the substitutions to be performed on the input glyph sequence (SubstCount) and an array of SubstitutionLookupRecords (SubstLookupRecord). Each record specifies a position in the input glyph sequence and a LookupListIndex to the substitution lookup that is applied at that position. The array should list records in design order, or the order the lookups should be applied to the entire glyph sequence.

SubRule Table

| Type | Name | Description |
| --- | --- | --- |
| uint16 | GlyphCount | Total number of glyphs in input glyph sequence-includes the first glyph |
| uint 16 | SubstCount | Number of SubstLookupRecords |
| GlyphID | Input[GlyphCount - 1] | Array of input GlyphIDs-start with second glyph |
| struct | SubstLookupRecord[SubstCount] | Array of SubstLookupRecords-in design order |

Context Substitution Format 2 is a more flexible format than Format 1 and describes class-based context substitution. For this format, a specific integer, called a class value, must be assigned to each glyph component in all context glyph sequences. Contexts are then defined as sequences of glyph class values. More than one context may be defined at a time.

For example, suppose that a swash capital glyph should replace each uppercase letter glyph that is preceded by a space glyph and followed by a lowercase letter glyph (a glyph sequence of space—uppercase—lowercase). The set of uppercase glyphs would constitute one glyph class (Class 1), the set of lowercase glyphs would constitute a second class (Class 2), and the space glyph would constitute a third class (Class 3). The input context might be specified with a context rule (called a SubClassRule) that describes "the set of glyph strings that form a sequence of three glyph classes, one glyph from Class 3, followed by one glyph from Class 1, followed by one glyph from Class 2."

Each ContextSubstFormat2 subtable contains an offset to a class definition table (ClassDef), which defines the glyph class values of all input contexts. Generally, a unique ClassDef table will be declared in each instance of the ContextSubstFormat2 table that is included in a font, even though several Format 2 tables could share ClassDef tables. Class assignments are fixed (the same for each position in the context), and classes are exclusive (a glyph cannot be in more than one class at a time). The output glyphs that replace the glyphs in the context sequences do not need class values because they are specified elsewhere by GlyphID.

The ContextSubstFormat2 subtable also contains a format identifier (SubstFormat) and defines an offset to a Coverage table (Coverage). For this format, the Coverage table lists indices for the complete set of unique glyphs (not glyph classes) that may appear as the first glyph of any class-based context. In other words, the Coverage table contains the list of glyph indices for all the glyphs in all classes that may be first in any of the context class sequences. For example, if the contexts begin with a Class 1 or Class 2 glyph, then the Coverage table will list the indices of all Class 1 and Class 2 glyphs.

A ContextSubstFormat2 subtable also defines an array of offsets to the SubClassSet tables (SubClassSet) and a count of the SubClassSet tables (SubClassSetCnt). The array contains one offset for each class (including Class 0) in the ClassDef table. In the array, the class value defines an offset's index position, and the SubClassSet offsets are ordered by ascending class value (from 0 to SubClassSetCnt-1).

For example, the first SubClassSet listed in the array contains all contexts beginning with Class 0 glyphs, the second SubClassSet contains all contexts beginning with Class 1 glyphs, and so on. If no contexts begin with a particular class (that is, if a SubClassSet contains no SubClassRule tables), then the offset to that particular SubClassSet in the SubClassSet array will be set to NULL.

ContextSubstFormat2 Subtable

| Type | Name | Description |
| --- | --- | --- |
| uint16 | SubstFormat | Format identifier-format = 2 |
| Offset | Coverage | Offset to Coverage table-from beginning of Substitution table |
| Offset | ClassDef | Offset to glyph ClassDef table-from beginning of Substitution table |
| uint16 | SubClassSetCnt | Number of SubClassSet tables |
| Offset | SubClassSet[SubClassSetCnt] | Array of offsets to SubClassSet tables-from beginning of Substitution table-ordered by class-may be NULL |

Each context is defined in a SubClassRule table, and all SubClassRules that specify contexts beginning with the same class value are grouped in a SubClassSet table. Consequently, the SubClassSet containing a context identifies a context's first class component.

Each SubClassSet table consists of a count of the SubClassRule tables defined in the SubClassSet (SubClassRuleCnt) and an array of offsets to SubClassRule tables (SubClassRule). The SubClassRule tables are ordered by preference in the SubClassRule array of the SubClassSet.

SubClassSet Subtable

| Type | Name | Description |
| --- | --- | --- |
| uint16 | SubClassRuleCnt | Number of SubClassRule tables |
| Offset | SubClassRule[SubClassRuleCount] | Array of offsets to SubClassRule tables-from beginning of SubClassSet-ordered by preference |

For each context, a SubClassRule table contains a count of the glyph classes in the context sequence (GlyphCount), including the first class. A Class array lists the classes, beginning with the second class (array index=1), that follow the first class in the context.

The values specified in the Class array are the values defined in the ClassDef table. For example, a context consisting of the sequence "Class 2, Class 7, Class 5, Class 0" will produce a Class array of 7,5,0. The first class in the sequence, Class 2, is identified in the ContextSubstFormat 2 table by the SubClassSet array index of the corresponding SubClassSet.

A SubClassRule also contains a count of the substitutions to be performed on the context (SubstCount) and an array of SubstLookupRecords (SubstLookupRecord) that supply the substitution data. For each position in the context that requires a substitution, a SubstLookupRecord specifies a LookupList index and a position in the input glyph sequence where the lookup is applied. The SubstLookupRecord array lists SubstLookupRecords in design order-that is, the order in which lookups should be applied to the entire glyph sequence.

SubClassRule Table

| Type | Name | Description |
|---|---|---|
| uint16 | GlyphCount | Total number of classes specified for the context in the rule-includes the first class |
| uint16 | SubstCount | Number of SubstLookupRecords |
| uint16 | Class[GlyphCount - 1] | Array of classes-beginning with the second class-to be matched to the input glyph class sequence |
| struct | SubstLookupRecord[SubstCount] | Array of Substitution lookups-in design order |

Context Substitution Format 3, coverage-based context substitution, defines a context rule as a sequence of coverage tables. Each position in the sequence may define a different Coverage table for the set of glyphs that matches the context pattern. With Format 3, the glyph sets defined in the different Coverage tables may intersect, unlike Format 2 which specifies fixed class assignments (identical for each position in the context sequence) and exclusive classes (a glyph cannot be in more than one class at a time).

For example, consider an input context that contains a lowercase glyph (position 0), followed by an uppercase glyph (position 1), either a lowercase or numeral glyph (position 2), and then either a lowercase or uppercase vowel (position 3). This context requires four Coverage tables, one for each position:

In position 0, the Coverage table lists the set of lowercase glyphs.

In position 1, the Coverage table lists the set of uppercase glyphs.

In position 2, the Coverage table lists the set of lowercase and numeral glyphs, a superset of the glyphs defined in the Coverage table for position 0.

In position 3, the Coverage table lists the set of lowercase and uppercase vowels, a subset of the glyphs defined in the Coverage tables for both positions 0 and 1.

Unlike Formats 1 and 2, Format 3 defines only one context rule at a time. It consists of a format identifier (SubstFormat), a count of the glyphs in the sequence to be matched (GlyphCount), and an array of Coverage offsets that describe the input context sequence (Coverage). The subtable also contains a count of the substitutions to be performed on the input Coverage sequence (SubstCount) and an array of SubstLookupRecords (SubstLookupRecord) in design order-that is, the order in which lookups should be applied to the entire glyph sequence.

ChainContextSubstFormat3 Subtable

| Type | Name | Description |
|---|---|---|
| uint16 | SubstFormat | Format identifier-format = 3 |
| uint16 | GlyphCount | Number of glyphs in the input glyph sequence |
| uint16 | SubstCount | Number of SubstLookupRecords |
| Offset | Coverage[GlyphCount] | Array of offsets to Coverage table-from beginning of Substitution table-in glyph sequence order |
| struct | SubstLookupRecord[SubstCount] | Array of SubstLookupRecords-in esign order |

LookupType 6: Chaining Contextual Substitution Subtable. A Chaining Contextual Substitution subtable (ChainContextSubst) describes glyph substitutions in context with an ability to look back and/or look ahead in the sequence of glyphs. The design of the Chaining Contextual Substitution subtable is parallel to that of the Contextual Substitution subtable, including the availability of three formats for handling sequences of glyphs, glyph classes, or glyph sets. Each format can describe one or more backtrack, input, and lookahead sequences and one or more substitutions for each sequence.

Chaining Context Substitution Format 1, Simple Chaining Context Glyph Substitution, defines the context for a glyph substitution as a particular sequence of glyphs. For example, a context could be <xyz>, <holiday>, <!?*#@>, or any other glyph sequence. Within a context sequence, Format 1 identifies particular glyph positions (not glyph indices) as the targets for specific substitutions. When a text-processing client locates a context in a string of text, it finds the lookup data for a targeted position and makes a substitution by applying the lookup data at that location.

To specify the context, the coverage table lists the first glyph in the input sequence, and the ChainSubRule subtable defines the rest. Once a covered glyph is found at position i, the client reads the corresponding ChainSubRuleSet table and examines each table to determine if it matches the surrounding glyphs in the text. There is a match if the string <backtrack sequence>+<covered glyph>+<input sequence>+<lookahead sequence> matches with the glyphs at position (i—BacktrackGlyphCount) in the text. If there is a match, then the client finds the target glyph positions for substitutions and completes the substitutions. Please note that Oust like in the ContextSubstFormat1 subtable) these lookups are required to operate within the range of text from the covered glyph to the end of the input sequence. No substitutions can be defined for the backtracking sequence or the lookahead sequence.

Once the substitutions are complete, the client should move to the glyph position immediately following the matched input sequence and resume the lookup process from there.

A single ChainContextSubstFormat1 subtable may define more than one context glyph sequence. If different context sequences begin with the same glyph, then the Coverage table should list the glyph only once because all glyphs in the table must be unique. For example, if three contexts each start with an "s" and two start with a "t." then the Coverage table will list one "s" and one "t."

All of the ChainSubRule tables defining contexts that begin with the same first glyph are grouped together and defined in a ChainSubRuleSet table. For example, the ChainSubRule tables that define the three contexts that begin with an "s" are grouped in one ChainSubRuleSet table, and the ChainSubRule tables that define the two contexts that begin with a "t" are grouped in a second ChainSubRuleSet table. Each glyph listed in the Coverage table must have a ChainSubRuleSet table defining all the ChainSubRule tables that apply to a covered glyph.

A ChainContextSubstFormat1 subtable contains a format identifier (SubstFormat), an offset to a Coverage table (Coverage), a count of defined ChainSubRuleSets (ChainSubRuleSetCount), and an array of offsets to the ChainSubRuleSet tables (ChainSubRuleSet). As mentioned, one ChainSubRuleSet table must be defined for each glyph listed in the Coverage table.

In the ChainSubRuleSet array, the ChainSubRuleSet table offsets are ordered in the Coverage Index order. The first ChainSubRuleSet in the array applies to the first GlyphID listed in the Coverage table, the second ChainSubRuleSet in the array applies to the second GlyphID listed in the Coverage table, and so on.

ChainContextSubstFormat1 Subtable

| Type | Name | Description |
| --- | --- | --- |
| uint16 | SubstFormat | Format identifier-format = 1 |
| Offset | Coverage | Offset to Coverage table-from beginning of Substitution table |
| uint16 | ChainSubRuleSetCount | Number of ChainSubRuleSet ables-must equal GlyphCount in overage table |
| Offset | ChainSubRuleSet[ChainSubRuleSetCount] | Array of offsets to ChainSubRuleSet tables-from beginning of Substitution table-ordered by Coverage Index |

A ChainSubRuleSet table consists of an array of offsets to ChainSubRule tables (ChainSubRule), ordered by preference, and a count of the ChainSubRule tables defined in the set (ChainSubRuleCount).

The order in the ChainSubRule array can be critical. Consider two contexts, <abc> and <abcd>. If <abc> is first in the ChainSubRule array, all instances of <abc> in the text-including all instances of <abcd>-will be changed. If <abcd> comes first in the array, however, only <abcd> sequences will be changed, without affecting any instances of <abc>.

ChainSubRuleSet Table

| Type | Name | Description |
| --- | --- | --- |
| uint16 | ChainSubRuleCount | Number of ChainSubRule tables |
| Offset | ChainSubRule[ChainSubRuleCount] | Array of offsets to ChainSubRule tables-from beginning of ChainSubRuleSet table-ordered by preference |

A ChainSubRule table consists of a count of the glyphs to be matched in the backtrack, input, and lookahead context sequences, including the first glyph in each sequence, and an array of glyph indices that describe each portion of the contexts. The Coverage table specifies the index of the first glyph in each context, and each array begins with the second glyph (array index =1) in the context sequence. Note: All arrays list the indices in the order the corresponding glyphs appear in the text. For text written from right to left, the right-most glyph will be first; conversely, for text written from left to right, the left-most glyph will be first.

A ChainSubRule table also contains a count of the substitutions to be performed on the input glyph sequence (SubstCount) and an array of SubstitutionLookupRecords (SubstLookupRecord). Each record specifies a position in the input glyph sequence and a LookupListIndex to the substitution lookup that is applied at that position. The array should list records in design order, or the order the lookups should be applied to the entire glyph sequence.

ChainSubRule Subtable

| Type | Name | Description |
| --- | --- | --- |
| uint16 | BacktrackGlyphCount | Total number of glyphs in the backtrack sequence (number of glyphs to be matched before the first glyph) |
| GlyphID | Backtrack[BacktrackGlyphCount] | Array of backtracking GlyphID's (to be matched before the input sequence) |
| uint16 | InputGlyphCount | Total number of glyphs in the input sequence (includes the first glyph) |
| GlyphID | Input[InputGlyphCount - 1] | Array of input GlyphIDs (start with second glyph) |
| uint16 | LookaheadGlyphCount | Total number of glyphs in the look ahead sequence (number of glyphs to be matched after the input sequence) |
| GlyphID | LookAhead[LookAheadGlyphCount] | Array of lookahead GlyphID's (to be matched after the input sequence) |
| uint16 | SubstCount | Number of SubstLookupRecords |
| struct | SubstLookupRecord[SubstCount] | Array of SubstLookupRecords (in design order) |

Chaining Context Substitution Format 2, Class-based Chaining Context Glyph Substitution, describes class-based chaining context substitution. For this format, a specific integer, called a class value, must be assigned to each glyph component in all context glyph sequences. Contexts are then defined as sequences of glyph class values. More than one context may be defined at a time.

To chain contexts, three classes are used in the glyph ClassDef table: Backtrack ClassDef, Input ClassDef, and Lookahead ClassDef.

The ChainContextSubstFormat2 subtable also contains a format identifier (SubstFormat) and defines an offset to a Coverage table (Coverage). For this format, the Coverage table lists indices for the complete set of unique glyphs (not glyph classes) that may appear as the first glyph of any class-based context. In other words, the Coverage table contains the list of glyph indices for all the glyphs in all classes that may be first in any of the context class sequences. For example, if the contexts begin with a Class 1 or Class 2 glyph, then the Coverage table will list the indices of all Class 1 and Class 2 glyphs.

A ChainContextSubstFormat2 subtable also defines an array of offsets to the ChainSubClassSet tables (ChainSubClassSet) and a count of the ChainSubClassSet tables (ChainSubClassSetCnt). The array contains one offset for each class (including Class 0) in the ClassDef table. In the array, the class value defines an offset's index position, and the ChainSubClassSet offsets are ordered by ascending class value (from 0 to ChainSubClassSetCnt−1).

If no contexts begin with a particular class (that is, if a ChainSubClassSet contains no ChainSubClassRule tables), then the offset to that particular ChainSubClassSet in the ChainSubClassSet array will be set to NULL.

ChainContextSubstFormat2 Subtable

| Type | Name | Description |
| --- | --- | --- |
| uint16 | SubstFormat | Format identifier-format = 2 |
| Offset | Coverage | Offset to Coverage table-from beginning of Substitution table |
| Offset | BacktrackClassDef | Offset to glyph ClassDef table containing backtrack sequence data-from beginning of Substitution table |
| Offset | InputClassDef | Offset to glyph ClassDef table containing input sequence data-from beginning of Substitution table |
| Offset | LookaheadClassDef | Offset to glyph ClassDef table containing lookahead sequence data-from beginning of Substitution table |
| uint16 | ChainSubClassSetCnt | Number of ChainSubClassSet tables |
| Offset | ChainSubClassSet[ChainSubClassSetCnt] | Array of offsets to ChainSubClassSet tables-from beginning of Substitution table-ordered by input class-may be NULL |

Each context is defined in a ChainSubClassRule table, and all ChainSubClassRules that specify contexts beginning with the same class value are grouped in a ChainSubClassSet table. Consequently, the ChainSubClassSet containing a context identifies a context's first class component.

Each ChainSubClassSet table consists of a count of the ChainSubClassRule tables defined in the ChainSubClassSet (ChainSubClassRuleCnt) and an array of offsets to ChainSubClassRule tables (ChainSubClassRule). The ChainSubClassRule tables are ordered by preference in the ChainSubClassRule array of the ChainSubClassSct.

ChainSubClassSet Subtable

| Type | Name | Description |
| --- | --- | --- |
| uint16 | ChainSubClassRuleCnt | Number of ChainSubClassRule tables |
| Offset | ChainSubClassRule[ChainSubClassRuleCount] | Array of offsets to ChainSubClassRule tables-from beginning of ChainSubClassSet-ordered by preference |

For each context, a ChainSubClassRule table contains a count of the glyph classes in the context sequence (GlyphCount), including the first class. A Class array lists the classes, beginning with the second class (array index=1), that follow the first class in the context.

The values specified in the Class array are the values defined in the ClassDef table. The first class in the sequence, Class 2, is identified in the ChainContextSubstFormat2 table by the ChainSubClassSet array index of the corresponding ChainSubClassSet.

A ChainSubClassRule also contains a count of the substitutions to be performed on the context (SubstCount) and an array of SubstLookupRecords (SubstLookupRecord) that supply the substitution data. For each position in the context that requires a substitution, a SubstLookupRecord specifies a LookupList index and a position in the input glyph sequence where the lookup is applied. The SubstLookupRecord array lists SubstLookupRecords in design order—that is, the order in which lookups should be applied to the entire glyph sequence.

ChainSubClassRule Table

| Type | Name | Description |
| --- | --- | --- |
| uint16 | BacktrackGlyphCount | Total number of glyphs in the backtrack sequence (number of glyphs to be matched before the first glyph) |
| uint16 | Backtrack[BacktrackGlyphCount] | Array of backtracking classes (to be matched before the input sequence) |
| uint16 | InputGlyphCount | Total number of classes in the input sequence (includes the first class) |
| uint16 | Input[InputGlyphCount - 1] | Array of input classes (start with second class; to be matched with the input glyph sequence) |
| uint16 | LookaheadGlyphCount | Total number of classes in the look ahead sequence (number of classes to be matched after the input sequence) |

-continued

ChainSubClassRule Table

| Type | Name | Description |
|---|---|---|
| uint16 | LookAhead[LookAheadGlyphCount] | Array of lookahead classes (to be matched after the input sequence) |
| uint16 | SubstCount | Number of SubstLookupRecords |
| struct | SubstLookupRecord[SubstCount] | Array of SubstLookupRecords (in design order) |

Chaining Context Substitution Format 3, Coverage-based Chaining Context Glyph Substitution, defines a chaining context rule as a sequence of Coverage tables. Each position in the sequence may define a different Coverage table for the set of glyphs that matches the context pattern. With Format 3, the glyph sets defined in the different Coverage tables may intersect, unlike Format 2 which specifies fixed class assignments (identical for each position in the backtrack, input, or lookahead sequence) and exclusive classes (a glyph cannot be in more than one class at a time).

The subtable also contains a count of the substitutions to be performed on the input Coverage sequence (SubstCount) and an array of SubstLookupRecords (SubstLookupRecord) in design order: that is, the order in which lookups should be applied to the entire glyph sequence. (SubstLookupRecords are described next.)

ChainContextSubstFormat3 Subtable

| Type | Name | Description |
|---|---|---|
| uint16 | SubstFormat | Format identifier-format = 3 |
| uint16 | BacktrackGlyphCount | Number of glyphs in the backtracking sequence |
| Offset | Coverage[BacktrackGlyphCount] | Array of offsets to coverage tables in backtracking sequence, in glyph sequence order |
| uint16 | InputGlyphCount | Number of glyphs in input sequence |
| Offset | Coverage[InputGlyphCount] | Array of offsets to coverage tables in input sequence, in glyph sequence order |
| uint16 | LookaheadGlyphCount | Number of glyphs in lookahead sequence |
| Offset | Coverage[LookaheadGlyphCount] | Array of offsets to coverage tables in lookahead sequence, in glyph sequence order |
| uint16 | SubstCount | Number of SubstLookupRecords |
| struct | SubstLookupRecord[SubstCount] | Array of SubstLookupRecords, in design order |

Substitution Lookup Record. All contextual substitution subtables specify the substitution data in a Substitution Lookup Record (SubstLookupRecord). Each record contains a SequenceIndex, which indicates the position where the substitution will occur in the glyph sequence. In addition, a LookupListIndex identifies the lookup to be applied at the glyph position specified by the SequenceIndex.

SubstLookupRecord

| Type | Name | Description |
|---|---|---|
| uint16 | SequenceIndex | Index into current glyph sequence-first glyph = 0 |
| uint16 | LookupListIndex | Lookup to apply to that position-zero-based |

The SequenceIndex in a SubstLookupRecord must take into consideration the order in which lookups are applied to the entire glyph sequence. Because multiple substitutions may occur per context, the SequenceIndex and LookupListIndex refer to the glyph sequence after the text-processing client has applied any previous lookups. In other words, the SequenceIndex identifies the location for the substitution at the time that the lookup is to be applied. For example, consider an input glyph sequence of four glyphs. The first glyph does not have a substitute, but the middle two glyphs will be replaced with a ligature, and a single glyph will replace the fourth glyph. The first glyph is in position 0. No lookups will be applied at position 0, so no SubstLookupRecord is defined. The SubstLookupRecord defined for the ligature substitution specifies the SequenceIndex as position 1, which is the position of the first-glyph component in the ligature string. After the ligature replaces the glyphs in positions 1 and 2, however, the input glyph sequence consists of only three glyphs, not the original four. To replace the last glyph in the sequence, the SubstLookupRecord defines the SequenceIndex as position 2 instead of position 3. This position reflects the effect of the ligature substitution applied before this single substitution. This example assumes that the LookupList specifies the ligature substitution lookup before the single substitution lookup.

GPOS—The Glyph Positioning Table

The Glyph Positioning table (GPOS) provides precise control over glyph placement for sophisticated text layout and rendering in each script and language system that a font supports.

With the GPOS table, a font developer can define a complete set of positioning adjustment features in an OpenType font. GPOS data is organized by script and language system.

X and Y values specified in OpenType fonts for placement operations are always within the typical Cartesian coordinate system (origin at the lower left), regardless of the writing direction. However, it is important to note that the meaning of "advance width" changes, depending on the writing direction.

Other GPOS features can define attachment points to combine glyphs and position them with respect to one another. A glyph might have multiple attachment points.

To reduce the size of the font file, a base glyph may use the same attachment point for all mark glyphs assigned to a particular class. For example, a base glyph could have two attachment points, one above and one below the glyph. Then all marks that attach above glyphs would be attached at the high point, and all marks that attach below glyphs would be attached at the low point.

Attachment points also are useful for connecting cursive-style glyphs. Glyphs in cursive fonts can be designed to attach or overlap when rendered. Alternatively, the font developer can use OpenType to create a cursive attachment feature and define explicit exit and entry attachment points for each glyph.

The GPOS table supports eight types of actions for positioning and attaching glyphs:

(1) A single adjustment positions one glyph, such as a superscript or subscript.

(2) A pair adjustment positions two glyphs with respect to one another. Kerning is an example of pair adjustment.

(3) A cursive attachment describes cursive scripts and other glyphs that are connected with attachment points when rendered.

(4) A MarkToBase attachment positions combining marks with respect to base glyphs, as when positioning vowels, diacritical marks, or tone marks in Arabic, Hebrew, and Vietnamese.

(5) A MarkToLigature attachment positions combining marks with respect to ligature glyphs. Because ligatures may have multiple points for attaching marks, the font developer needs to associate each mark with one of the ligature glyph's components.

(6) A MarkToMark attachment positions one mark relative to another, as when positioning tone marks with respect to vowel diacritical marks in Vietnamese.

(7) Contextual positioning describes how to position one or more glyphs in context, within an identifiable sequence of specific glyphs, glyph classes, or varied sets of glyphs. One or more positioning operations may be performed on "input" context sequences. FIG. 4e illustrates a context for positioning adjustments.

(8) Chaining Contextual positioning describes how to position one or more glyphs in a chained context, within an identifiable sequence of specific glyphs, glyph classes, or varied sets of glyphs. One or more positioning operations may be performed on "input" context sequences.

The GPOS table begins with a header that defines offsets to a ScriptList, a FeatureList, and a LookupList. The ScriptList identifies all the scripts and language systems in the font that use glyph positioning. The FeatureList defines all the glyph positioning features required to render these scripts and language systems. The LookupList contains all the lookup data needed to implement each glyph positioning feature.

The GPOS table is organized so text-processing clients can easily locate the features and lookups that apply to a particular script or language system. To access GPOS information, clients should use the following procedure:

1. Locate the current script in the GPOS ScriptList table.
2. If the language system is known, search the script for the correct LangSys table; otherwise, use the script's default language system (DefaultLangSys table).
3. The LangSys table provides index numbers into the GPOS FeatureList table to access a required feature and a number of additional features.
4. Inspect the FeatureTag of each feature, and select the features to apply to an input glyph string.
5. Each feature provides an array of index numbers into the GPOS LookupList table. Lookup data is defined in one or more subtables that contain information about specific glyphs and the kinds of operations to be performed on them.
6. Assemble all lookups from the set of chosen features, and apply the lookups in the order given in the LookupList table.

A lookup uses subtables to define the specific conditions, type, and results of a positioning action used to implement a feature. All subtables in a lookup must be of the same LookupType, as listed in the LookupType Enumeration table.

LookupType Enumeration Table for Glyph Positioning

| Value | Type | Description |
|---|---|---|
| 1 | Single adjustment | Adjust position of a single glyph |
| 2 | Pair adjustment | Adjust position of a pair of glyphs |
| 3 | Cursive attachment | Attach cursive glyphs |
| 4 | MarkToBase attachment | Attach a combining mark to a base glyph |
| 5 | MarkToLigature attachment | Attach a combining mark to a ligature |
| 6 | MarkToMark attachment | Attach a combining mark to another mark |
| 7 | Context positioning | Position one or more glyphs in context |
| 8 | Chained Context positioning | Position one or more glyphs in chained context |
| 9+ | Reserved | For future use |

Each LookupType is defined by one or more subtables, whose format depends on the type of positioning operation and the resulting storage efficiency. When glyph information is best presented in more than one format, a single lookup may define more than one subtable, as long as all the subtables are of the same LookupType. For example, within a given lookup, a glyph index array format may best represent one set of target glyphs, whereas a glyph index range format may be better for another set.

A series of positioning operations on the same glyph or string requires multiple lookups, one for each separate action. The values in the ValueRecords are accumulated in these cases. Each lookup is given a different array number in the LookupList table and is applied in the LookupList order.

During text processing, a client applies a lookup to each glyph in the string before moving to the next lookup. A lookup is finished for a glyph after the client locates the target glyph or glyph context and performs a positioning, if specified. To move to the "next" glyph, the client will typically skip all the glyphs that participated in the lookup operation. There is just one exception: the "next" glyph in a sequence may be one of those that formed a context for the operation just performed.

The GPOS table begins with a header that contains a version number (Version) initially set to 1.0 (0x00010000) and offsets to three tables: ScriptList, FeatureList, and LookupList.

GPOS Header

| Value | Type | Description |
|---|---|---|
| Fixed | Version | Version of the GPOS table-initially = 0x00010000 |
| Offset | ScriptList | Offset to ScriptList table-from beginning of GPOS table |
| Offset | FeatureList | Offset to FeatureList table-from beginning of GPOS table |
| Offset | LookupList | Offset to LookupList table-from beginning of GPOS table |

Lookup Type 1: Single Adjustment Positioning Subtable. A single adjustment positioning subtable (SinglePos) is used to adjust the position of a single glyph, such as a subscript or superscript. In addition, a SinglePos subtable is commonly used to implement lookup data for contextual positioning. A SinglePos subtable will have one of two formats: one that applies the same adjustment to a series of glyphs, or one that applies a different adjustment for each unique glyph.

Single Adjustment Positioning: Format 1. A SinglePosFormat1 subtable applies the same positioning value or values to each glyph listed in its Coverage table. For instance, when a font uses old-style numerals, this format could be applied to lower the position of all math operator glyphs uniformly. The Format 1 subtable consists of a format identifier (PosFormat), an offset to a Coverage table that defines the glyphs to be adjusted by the positioning values (Coverage), and the format identifier (ValueFormat) that describes the amount and kinds of data in the ValueRecord. The ValueRecord specifies one or more positioning values to be applied to all covered glyphs (Value). For example, if all glyphs in the Coverage table require both horizontal and vertical adjustments, the ValueRecord will specify values for both XPlacement and Yplacement.

| | SinglePosFormat1 Subtable | |
|---|---|---|
| Value | Type | Description |
| uint16 | PosFormat | Format identifier-format = 1 |
| Offset | Coverage | Offset to Coverage table-from beginning of SinglePos subtable |
| uint16 | ValueFormat | Defines the types of data in the ValueRecord |
| ValueRecord | Value | Defines positioning value(s)-applied to all glyphs in the Coverage table |

Single Adjustment Positioning: Format 2. A SinglePosFormat2 subtable provides an array of ValueRecords that contains one positioning value for each glyph in the Coverage table. This format is more flexible than Format 1, but it requires more space in the font file. All ValueRecords defined in a SinglePos subtable must have the same ValueFormat. In this example, if XPlacement is the only value that a ValueRecord needs to optically align the glyphs, then XPlacement will be the only value specified in the ValueFormat of the subtable.

As in Format 1, the Format 2 subtable consists of a format identifier (PosFormat), an offset to a Coverage table that defines the glyphs to be adjusted by the positioning values (Coverage), and the format identifier (ValueFormat) that describes the amount and kinds of data in the ValueRecords. In addition, the Format 2 subtable includes a count of the ValueRecords (ValueCount) and an array of ValueRecords that specify positioning values (Value). One ValueRecord is defined for each glyph in the Coverage table. Because the array follows the Coverage Index order, the first ValueRecord applies to the first glyph listed in the Coverage table, and so on.

| | SinglePosFormat2 Subtable | |
|---|---|---|
| Value | Type | Description |
| uint16 | PosFormat | Format identifier-format = 2 |
| Offset | Coverage | Offset to Coverage table-from beginning of SinglePos subtable |
| uint16 | ValueFormat | Defines the types of data in the ValueRecord |

-continued

| | SinglePosFormat2 Subtable | |
|---|---|---|
| Value | Type | Description |
| uint16 | ValueCount | Number of ValueRecords |
| ValueRecord | Value[ValueCount] | Array of ValueRecords-positioning values applied to glyphs |

Lookup Type 2: Pair Adjustment Positioning Subtable. A pair adjustment Positioning subtable (PairPos) is used to adjust the positions of two glyphs in relation to one another—for instance, to specify kerning data for pairs of glyphs. Compared to a typical kerning table, however, a PairPos subtable offers more flexiblity and precise control over glyph positioning. The PairPos subtable can adjust each glyph in a pair independently in both the X and Y directions, and it can explicitly describe the particular type of adjustment applied to each glyph. In addition, a PairPos subtable can use Device tables to adjust glyph positions subtly at each font size and device resolution.

PairPos subtables can be either of two formats: one that identifies glyphs individually by index (Format 1), or one that identifies glyphs by class (Format 2).

Pair Positioning Adjustment: Format 1. Format 1 uses glyph indices to access positioning data for one or more specific pairs of glyphs. All pairs are specified in the order determined by the layout direction of the text. For text written from right to left, the right-most glyph will be the first glyph in a pair; conversely, for text written from left to right, the left-most glyph will be first.

A PairPosFormat1 subtable contains a format identifier (PosFormat) and two ValueFormats: ValueFormat1 and ValueFormat2. ValueFormat1 applies to the ValueRecord of the first glyph in each pair. ValueRecords for all first glyphs must use ValueFormat1. If ValueFormat1 is set to zero (0), the corresponding glyph has no ValueRecord and, therefore, should not be repositioned. ValueFormat2 applies to the ValueRecord of the second glyph in each pair. ValueRecords for all second glyphs must use ValueFormat2. If ValueFormat2 is set to null, then the second glyph of the pair is the "next" glyph for which a lookup should be performed.

A PairPos subtable also defines an offset to a Coverage table (Coverage) that lists the indices of the first glyphs in each pair. More than one pair can have the same first glyph, but the Coverage table will list that glyph only once. The subtable also contains an array of offsets to PairSet tables (PairSet) and a count of the defined tables (PairSetCount). The PairSet array contains one offset for each glyph listed in the Coverage table and uses the same order as the Coverage Index.

| | PairPosFormat1 Subtable | |
|---|---|---|
| Value | Type | Description |
| uint16 | PosFormat | Format identifier-format = 1 |
| Offset | Coverage | Offset to Coverage table-from beginning of PairPos subtable-only the first glyph in each pair |
| uint16 | ValueFormat1 | Defines the types of data in ValueRecord1-for the first glyph in the pair-may be zero (0) |
| uint16 | ValueFormat2 | Defines the types of data in ValueRecord2-for the second glyph in the pair-may be zero (0) |

PairPosFormat1 Subtable (continued)

| Value | Type | Description |
| --- | --- | --- |
| uint16 | PairSetCount | Number of PairSet tables |
| ValueRecord | PairSet[PairSetCount] | Array of offsets to PairSet tables-from beginning of PairPos subtable-ordered by Coverage Index |

A PairSet table enumerates all the glyph pairs that begin with a covered glyph. An array of PairValueRecords (PairValueRecord) contains one record for each pair and lists the records sorted by the GlyphID of the second glyph in each pair. PairValueCount specifies the number of PairValueRecords in the set.

PairSet Table

| Value | Type | Description |
| --- | --- | --- |
| uint16 | PairValueCount | Number of PairValueRecords |
| struct | PairValueRecord [PairValueCount] | Array of PairValueRecords-ordered by GlyphID of the second glyph |

A PairValueRecord specifies the second glyph in a pair (SecondGlyph) and defines a ValueRecord for each glyph (Value1 and Value2). If ValueFormat1 is set to zero (0) in the PairPos subtable, ValueRecord1 will be empty; similarly, if ValueFormat2 is 0, Value2 will be empty.

PairValueRecord

| Value | Type | Description |
| --- | --- | --- |
| GlyphID | SecondGlyph | GlyphID of second glyph in the pair-first glyph is listed in the Coverage table |
| ValueRecord | Value1 | Positioning data for the first glyph in the pair |
| ValueRecord | Value2 | Positioning data for the second glyph in the pair |

Pair Positioning Adjustment: Format 2. Format 2 defines a pair as a set of two glyph classes and modifies the positions of all the glyphs in a class. For example, this format is useful in Japanese scripts that apply specific kerning operations to all glyph pairs that contain punctuation glyphs. One class would be defined as all glyphs that may be coupled with punctuation marks, and the other classes would be groups of similar punctuation glyphs.

The PairPos Format2 subtable begins with a format identifier (PosFormat) and an offset to a Coverage table (Coverage), measured from the beginning of the PairPos subtable. The Coverage table lists the indices of the first glyphs that may appear in each glyph pair. More than one pair may begin with the same glyph, but the Coverage table lists the glyph index only once.

A PairPosFormat2 subtable also includes two ValueFormats. ValueFormat1 applies to the ValueRecord of the first glyph in each pair. ValueRecords for all first glyphs must use ValueFormat1. If ValueFormat1 is set to zero (0), the corresponding glyph has no ValueRecord and, therefore, should not be repositioned. ValueFormat2 applies to the ValueRecord of the second glyph in each pair. ValueRecords for all second glyphs must use ValueFormat2. If ValueFormat2 is set to null, then the second glyph of the pair is the "next" glyph for which a lookup should be performed.

PairPosFormat2 requires that each glyph in all pairs be assigned to a class, which is identified by an integer called a class value. Pairs are then represented in a two-dimensional array as sequences of two class values. Multiple pairs can be represented in one Format 2 subtable.

A PairPosFormat2 subtable contains offsets to two class definition tables: one that assigns class values to all the first glyphs in all pairs (ClassDef1), and one that assigns class values to all the second glyphs in all pairs (ClassDef2). If both glyphs in a pair use the same class definition, the offset value will be the same for ClassDef1 and ClassDef2. The subtable also specifies the number of glyph classes defined in ClassDef1 (Class1Count) and in ClassDef2 (Class2Count), including Class0.

For each class identified in the ClassDef1 table, a Class1Record enumerates all pairs that contain a particular class as a first component. The Class1Record array stores all Class1Records according to class value. Note: Class1Records are not tagged with a class value identifier. Instead, the index value of a Class1Record in the array defines the class value represented by the record. For example, the first Class1Record enumerates pairs that begin with a Class 0 glyph, the second Class1Record enumerates pairs that begin with a Class1 glyph, and so on.

PairPosFormat2 Subtable

| Value | Type | Description |
| --- | --- | --- |
| uint16 | PosFormat | Format identifier-format = 2 |
| Offset | Coverage | Offset to Coverage table-from beginning of PairPos subtable-for the first glyph of the pair |
| uint16 | ValueFormat1 | ValueRecord definition-for the first glyph of the pair-may be zero (0) |
| uint16 | ValueFormat2 | ValueRecord definition-for the second glyph of the pair-may be zero (0) |
| Offset | ClassDef1 | Offset to ClassDef table-from beginning of PairPos subtable-for the first glyph of the pair |
| Offset | ClassDef2 | Offset to ClassDef table-from beginning of PairPos subtable-for the second glyph of the pair |
| uint16 | Class1Count | Number of classes in ClassDef1 table-includes Class0 |
| uint16 | Class2Count | Number of classes in ClassDef2 table-includes Class0 |
| struct | Class1Record[Class1Count] | Array of Class1 records-ordered by Class1 |

Each Class1Record contains an array of Class2Records (Class2Record), which also are ordered by class value. One Class2Record must be declared for each class in the ClassDef2 table, including Class 0.

Class1Record

| Value | Type | Description |
| --- | --- | --- |
| struct | Class2Record[Class2Count] | Array of Class2 records-ordered by Class2 |

A Class2Record consists of two ValueRecords, one for the first glyph in a class pair (Value1) and one for the second glyph (Value2). If the PairPos subtable has a value of zero (0) for ValueFormat1 or ValueFormat2, the corresponding record (ValueRecord1 or ValueRecord2) will be empty.

| Class2Record | | |
|---|---|---|
| Value | Type | Description |
| ValueRecord | Value1 | Positioning for first glyph-empty if ValueFormat1 = 0 |
| ValueRecord | Value2 | Positioning for second glyph-empty if ValueFormat2 = 0 |

Lookup Type 3: Cursive Attachment Positioning Subtable. Some cursive fonts are designed so that adjacent glyphs join when rendered with their default positioning. However, if positioning adjustments are needed to join the glyphs, a cursive attachment positioning (CursivePos) subtable can describe how to connect the glyphs by aligning two anchor points: the designated exit point of a glyph, and the designated entry point of the following glyph.

The subtable has one format: CursivePosFormat1. It begins with a format identifier (PosFormat) and an offset to a Coverage table (Coverage), which lists all the glyphs that define cursive attachment data. In addition, the subtable contains one EntryExitRecord for each glyph listed in the Coverage table, a count of those records (EntryExitCount), and an array of those records in the same order as the Coverage Index (EntryExitRecord).

| CursivePosFormat1 Subtable | | |
|---|---|---|
| Value | Type | Description |
| uint16 | PosFormat | Format identifier-format = 1 |
| Offset | Coverage | Offset to Coverage table-from beginning of CursivePos subtable |
| uint16 | EntryExitCount | Number of EntryExit records |
| struct | EntryExitRecord-[EntryExitCount] | Array of EntryExit records-in Coverage Index order |

Each EntryExitRecord consists of two offsets: one to an Anchor table that identifies the entry point on the glyph (EntryAnchor), and an offset to an Anchor table that identifies the exit point on the glyph (ExitAnchor). To position glyphs using the CursivePosFormat1 subtable, a text-processing client aligns the ExitAnchor point of a glyph with the EntryAnchor point of the following glyph. If no corresponding anchor point exists, either the EntryAnchor or ExitAnchor offset may be NULL.

| EntryExitRecord | | |
|---|---|---|
| Value | Type | Description |
| Offset | EntryAnchor | Offset to EntryAnchor table-from beginning of CursivePos subtable-may be NULL |
| Offset | ExitAnchor | Offset to ExitAnchor table-from beginning of CursivePos subtable-may be NULL |

Lookup Type 4: MarkToBase Attachment Positioning Subtable. The MarkToBase attachment (MarkBasePos) subtable is used to position combining mark glyphs with respect to base glyphs. In the MarkBasePos subtable, every mark glyph has an anchor point and is associated with a class of marks. Each base glyph then defines an anchor point for each class of marks it uses. For example, assume two mark classes: all marks positioned above base glyphs (Class 0), and all marks positioned below base glyphs (Class 1). In this case, each base glyph that uses these marks would define two anchor points, one for attaching the mark glyphs listed in Class 0, and one for attaching the mark glyphs listed in Class 1.

To identify the base glyph that combines with a mark, the text-processing client must look backward in the glyph string from the mark to the preceding base glyph. To combine the mark and base glyph, the client aligns their attachment points, positioning the mark with respect to the final pen point (advance) position of the base glyph.

The MarkToBase Attachment subtable has one format: MarkBasePosFormat1. The subtable begins with a format identifier (PosFormat) and offsets to two Coverage tables: one that lists all the mark glyphs referenced in the subtable (MarkCoverage), and one that lists all the base glyphs referenced in the subtable (BaseCoverage).

For each mark glyph in the MarkCoverage table, a record specifies its class and an offset to the Anchor table that describes the mark's attachment point (MarkRecord). A mark class is identified by a specific integer, called a class value. ClassCount specifies the total number of distinct mark classes defined in all the MarkRecords.

The MarkBasePosFormat1 subtable also contains an offset to a MarkArray table, which contains all the MarkRecords stored in an array (MarkRecord) by MarkCoverage Index. A MarkArray table also contains a count of the defined MarkRecords (MarkCount).

The MarkBasePosFormat1 subtable also contains an offset to a BaseArray table (BaseArray).

| MarkBasePosFormat1 Subtable | | |
|---|---|---|
| Value | Type | Description |
| uint16 | PosFormat | Format identifier-format = 1 |
| Offset | MarkCoverage | Offset to MarkCoverage table-from beginning of MarkBasePos subtable |
| Offset | BaseCoverage | Offset to BaseCoverage table-from beginning of MarkBasePos subtable |
| uint16 | ClassCount | Number of classes defined for marks |
| Offset | MarkArray | Offset to MarkArray table-from beginning of MarkBasePos subtable |
| Offset | BaseArray | Offset to BaseArray table-from beginning of MarkBasePos subtable |

The BaseArray table consists of an array (BaseRecord) and count (BaseCount) of BaseRecords. The array stores the BaseRecords in the same order as the BaseCoverage Index. Each base glyph in the BaseCoverage table has a BaseRecord.

| BaseArray Table | | |
|---|---|---|
| Value | Type | Description |
| uint16 | BaseCount | Number of BaseRecords |
| struct | BaseRecord[BaseCount] | Array of BaseRecords-in order of BaseCoverage Index |

A BaseRecord declares one Anchor table for each mark class (including Class 0) identified in the MarkRecords of the MarkArray. Each Anchor table specifies one attachment point used to attach all the marks in a particular class to the base glyph. A BaseRecord contains an array of offsets to Anchor tables (BaseAnchor). The zero-based array of offsets defines the entire set of attachment points each base glyph uses to attach marks. The offsets to Anchor tables are ordered by mark class. Note: Anchor tables are not tagged with class value identifiers. Instead, the index value of an Anchor table in the array defines the class value represented by the Anchor table.

| | BaseRecord | |
|---|---|---|
| Value | Type | Description |
| Offset | BaseAnchor[ClassCount] | Array of offsets (one per class) to Anchor tables-from beginning of BaseArray table-ordered by class-zero-based |

Lookup Type 5: MarkToLigature Attachment Positioning Subtable. The MarkToLigature attachment (MarkLigPos) subtable is used to position combining mark glyphs with respect to ligature base glyphs. With MarkToBase attachment, described previously, a single base glyph defines an attachment point for each class of marks. In contrast, MarkToLigature attachment describes ligature glyphs composed of several components that can each define an attachment point for each class of marks. As a result, a ligature glyph may have multiple base attachment points for one class of marks. The specific attachment point for a mark is defined by the ligature component that the subtable associates with the mark.

The MarkLigPos subtable can be used to define multiple mark-to-ligature attachments. In the subtable, every mark glyph has an anchor point and is associated with a class of marks. Every ligature glyph specifies a two-dimensional array of data: each component in a ligature defines an array of anchor points, one for each class of marks.

For example, assume two mark classes: all marks positioned above base glyphs (Class 0), and all marks positioned below base glyphs (Class 1). In this case, each component of a base ligature glyph may define two anchor points, one for attaching the mark glyphs listed in Class 0, and one for attaching the mark glyphs listed in Class 1. Alternatively, if the language system does not allow marks on the second component, the first ligature component may define two anchor points, one for each class of marks, and the second ligature component may define no anchor points.

To position a combining mark using a MarkToLigature attachment subtable, the text-processing client must work backward from the mark to the preceding ligature glyph. To correctly access the subtables, the client must keep track of the component associated with the mark. Aligning the attachment points combines the mark and ligature.

The MarkToLigature attachment subtable has one format: MarkLigPosFormat1. The subtable begins with a format identifier (PosFormat) and offsets to two Coverage tables that list all the mark glyphs (MarkCoverage) and Ligature glyphs (LigatureCoverage) referenced in the subtable. For each glyph in the MarkCoverage table, a MarkRecord specifies its class and an offset to the Anchor table that describes the mark's attachment point. A mark class is identified by a specific integer, called a class value. ClassCount records the total number of distinct mark classes defined in all MarkRecords.

The MarkBasePosFormat1 subtable contains an offset, measured from the beginning of the subtable, to a MarkAr-ray table, which contains all MarkRecords stored in an array (MarkRecord) by MarkCoverage Index. The MarkLigPos-Format1 subtable also contains an offset to a LigatureArray table (LigatureArray).

| | MarkLigPosFormat1 Subtable | |
|---|---|---|
| Value | Type | Description |
| uint 16 | PosFormat | Format identifier-format = 1 |
| Offset | MarkCoverage | Offset to Mark Coverage table-from beginning of MarkLigPos subtable |
| Offset | LigatureCoverage | Offset to Ligature Coverage table-from beginning of MarkLigPos subtable |
| uint 16 | ClassCount | Number of defined mark classes |
| Offset | MarkArray | Offset to MarkArray table-from beginning of MarkLigPos subtable |
| Offset | LigatureArray | Offset to LigatureArray table-from beginning of MarkLigPos subtable |

The LigatureArray table contains a count (LigatureCount) and an array of offsets (LigatureAttach) to LigatureAttach tables. The LigatureAttach array lists the offsets to LigatureAttach tables, one for each ligature glyph listed in the LigatureCoverage table, in the same order as the LigatureCoverage Index.

| | LigatureArray Table | |
|---|---|---|
| Value | Type | Description |
| uint16 | LigatureCount | Number of LigatureAttach table offsets |
| Offset | LigatureAttach-[LigatureCount] | Array of offsets to LigatureAttach tables-from beginning of LigatureArray table-ordered by LigatureCoverage Index |

Each LigatureAttach table consists of an array (ComponentRecord) and count (ComponentCount) of the component glyphs in a ligature. The array stores the ComponentRecords in the same order as the components in the ligature. The order of the records also corresponds to the writing direction of the text. For text written left to right, the first component is on the left; for text written right to left, the first component is on the right.

| | LigatureAttach Table | |
|---|---|---|
| Value | Type | Description |
| uint16 | ComponentCount | Number of ComponentRecords in this ligature |
| struct | ComponentRecord-[ComponentCount] | Array of Component records-ordered in writing direction |

A ComponentRecord, one for each component in the ligature, contains an array of offsets to the Anchor tables that define all the attachment points used to attach marks to the component (LigatureAnchor). For each mark class (including Class 0) identified in the MarkArray records, an Anchor table specifies the point used to attach all the marks in a particular class to the ligature base glyph, relative to the component.

In a ComponentRecord, the zero-based LigatureAnchor array lists offsets to Anchor tables by mark class. If a component does not define an attachment point for a particular class of marks, then the offset to the corresponding Anchor table will be NULL.

ComponentRecord

| Value | Type | Description |
|---|---|---|
| Offset | LigatureAnchor-[Classcount] | Array of offsets (one per class) to Anchor tables-from beginning of LigatureAttach table-ordered by class-NULL if a component does not have an attachment for a class-zero-based array |

Lookup Type 6: MarkToMark Attachment Positioning Subtable. The MarkToMark attachment (MarkMarkPos) subtable is identical in form to the MarkToBase attachment subtable, although its function is different. MarkToMark attachment defines the position of one mark relative to another mark as when, for example, positioning tone marks with respect to vowel diacritical marks in Vietnamese.

The attaching mark is Mark1, and the base mark being attached to is Mark2. In the MarkMarkPos subtable, every Mark1 glyph has an anchor attachment point and is associated with a class of marks. Each Mark2 glyph defines an anchor point for each class of marks. For example, assume two Mark1 classes: all marks positioned to the left of Mark2 glyphs (Class 0), and all marks positioned to the right of Mark2 glyphs (Class 1). Each Mark2 glyph that uses these marks defines two anchor points: one for attaching the Mark1 glyphs listed in Class 0, and one for attaching the Mark1 glyphs listed in Class 1.

To identify the Mark2 glyph that combines with a Mark1 glyph, the text-processing client must move backward in the glyph string order from the Mark1 glyph to the preceding mark, which becomes Mark2. Aligning the attachment points combines the mark glyphs.

The MarkToMark attachment subtable has one format: MarkMarkPosFormat1. The subtable begins with a format identifier (PosFormat) and offsets to two Coverage tables: one that lists all the Mark1 glyphs referenced in the subtable (Mark1Coverage), and one that lists all the Mark2 glyphs referenced in the subtable (Mark2Coverage).

For each mark glyph in the Mark1Coverage table, a MarkRecord specifies its class and an offset to the Anchor table that describes the mark's attachment point. A mark class is identified by a specific integer, called a class value. ClassCount specifies the total number of distinct mark classes defined in all the MarkRecords.

The MarkMarkPosFormat1 subtable also contains two offsets, measured from the beginning of the subtable, to two arrays: (i) The MarkArray table contains all MarkRecords stored by Mark1Coverage Index in an array (MarkRecord). The MarkArray table also contains a count of the number of defined MarkRecords (MarkCount). (ii) The Mark2Array table consists of an array (Mark2Record) and count (Mark2Count) of Mark2Records.

MarkMarkPosFormat1 Subtable

| Value | Type | Description |
|---|---|---|
| uint16 | PosFormat | Format identifier-format = 1 |
| Offset | Mark1Coverage | Offset to Combining Mark Coverage table-from beginning of MarkMarkPos subtable |

-continued

MarkMarkPosFormat1 Subtable

| Value | Type | Description |
|---|---|---|
| Offset | Mark2Coverage | Offset to Base Mark Coverage table-from beginning of MarkMarkPos subtable |
| uint16 | ClassCount | Number of Combining Mark classes defined |
| Offset | Mark1Array | Offset to MarkArray table for Mark1-from beginning of MarkMarkPos subtable |
| Offset | Mark2Array | Offset to Mark2Array table for Mark2-from beginning of MarkMarkPos subtable |

The Mark2Array, shown next, contains one Mark2Record for each Mark2 glyph listed in the Mark2Coverage table. It stores the records in the same order as the Mark2Coverage Index.

Mark2Array Table

| Value | Type | Description |
|---|---|---|
| uint16 | Mark2Count | Number of Mark2 records |
| struct | Mark2Record[Mark2Count] | Array of Mark2 records-in Coverage order |

Each Mark2Record contains an array of offsets to Anchor tables (Mark2Anchor). The array of zero-based offsets, measured from the beginning of the Mark2Array table, defines the entire set of Mark2 attachment points used to attach Mark1 glyphs to a specific Mark2 glyph. The Anchor tables in the Mark2Anchor array are ordered by Mark1 class value.

A Mark2Record declares one Anchor table for each mark class (including Class 0) identified in the MarkRecords of the MarkArray. Each Anchor table specifies one Mark2 attachment point used to attach all the Mark1 glyphs in a particular class to the Mark2 glyph.

Mark2Record

| Value | Type | Description |
|---|---|---|
| Offset | Mark2Anchor-[ClassCount] | Array of offsets (one per class) to Anchor tables-from beginning of Mark2Array table-zero-based array |

Lookup Type 7: Contextual Positioning Subtables. A Contextual Positioning (ContextPos) subtable defines the most powerful type of glyph positioning lookup. It describes glyph positioning in context so a text-processing client can adjust the position of one or more glyphs within a certain pattern of glyphs. Each subtable describes one or more "input" glyph sequences and one or more positioning operations to be performed on that sequence.

ContextPos subtables can have one of three formats, which closely mirror the formats used for contextual glyph substitution. One format applies to specific glyph sequences (Format 1), one defines the context in terms of glyph classes (Format 2), and the third format defines the context in terms of sets of glyphs (Format 3).

All ContextPos subtables specify positioning data in a PosLookupRecord.

Context Positioning Subtable: Format 1. Format 1 defines the context for a glyph positioning operation as a particular sequence of glyphs. For example, a context could be <To>, <xyzabc>, <!?*#@>, or any other glyph sequence. Within the context, Format 1 identifies particular glyph positions (not glyph indices) as the targets for specific adjustments. When a text-processing client locates a context in a string of text, it makes the adjustment by applying the lookup data defined for a targeted position at that location.

ContextPosFormat1 defines the context in two places. A Coverage table specifies the first glyph in the input sequence, and a PosRule table identifies the remaining glyphs.

A single ContextPosFormat1 subtable may define more than one context glyph sequence. If different context sequences begin with the same glyph, then the Coverage table should list the glyph only once because all first glyphs in the table must be unique. For example, if three contexts each start with an "s" and two start with a "t," then the Coverage table will list one "s" and one "t."

For each context, a PosRule table lists all the glyphs, in order, that follow the first glyph. The table also contains an array of PosLookupRecords that specify the positioning lookup data for each glyph position (including the first glyph position) in the context.

All the PosRule tables defining contexts that begin with the same first glyph are grouped together and defined in a PosRuleSet table. For example, the PosRule tables that define the three contexts that begin with an "s" are grouped in one PosRuleSet table, and the PosRule tables that define the two contexts that begin with a "t" are grouped in a second PosRuleSet table. Each unique glyph listed in the Coverage table must have a PosRuleSet table that defines all the PosRule tables for a covered glyph.

To locate a context glyph sequence, the text-processing client searches the Coverage table each time it encounters a new text glyph. If the glyph is covered, the client reads the corresponding PosRuleSet table and examines each PosRule table in the set to determine whether the rest of the context defined there matches the subsequent glyphs in the text. If the context and text string match, the client finds the target glyph position, applies the lookup for that position. and completes the positioning action.

A ContextPosFormat1 subtable contains a format identifier (PosFormat), an offset to a Coverage table (Coverage), a count of the number of PosRuleSets that are defined (PosRuleSetCount), and an array of offsets to the PosRuleSet tables (PosRuleSet). As mentioned, one PosRuleSet table must be defined for each glyph listed in the Coverage table.

In the PosRuleSet array, the PosRuleSet tables are ordered in the Coverage Index order. The first PosRuleSet in the array applies to the first GlyphID listed in the Coverage table, the second PosRuleSet in the array applies to the second GlyphID listed in the Coverage table, and so on.

ContextPosFormat1 Subtable

| Value | Type | Description |
| --- | --- | --- |
| uint16 | PosFormat | Format identifier-format = 1 |
| Offset | Coverage | Offset to Coverage table-from beginning of ContextPos subtable |
| uint16 | PosRuleSetCount | Number of PosRuleSet tables |
| Offset | PosRuleSet-[PosRuleSetCount] | Array of offsets to PosRuleSet tables-from beginning of ContextPos subtable-ordered by Coverage Index |

A PosRuleSet table consists of an array of offsets to PosRule tables (PosRule), ordered by preference, and a count of the PosRule tables defined in the set (PosRuleCount).

PosRuleSet Table

| Value | Type | Description |
| --- | --- | --- |
| uint 16 | PosRuleCount | Number of PosRule tables |
| Offset | PosRulePosRuleCount] | Array of offsets to PosRule tables-from beginning of PosRuleSet-ordered by preference |

A PosRule table consists of a count of the glyphs to be matched in the input context sequence (GlyphCount), including the first glyph in the sequence, and an array of glyph indices that describe the context (Input). The Coverage table specifies the index of the first glyph in the context, and the Input array begins with the second glyph in the context sequence. As a result, the first index position in the array is specified with the number one (1), not zero (0). The Input array lists the indices in the order the corresponding glyphs appear in the text. For text written from right to left, the right-most glyph will be first; conversely, for text written from left to right, the left-most glyph will be first.

A PosRule table also contains a count of the positioning operations to be performed on the input glyph sequence (PosCount) and an array of PosLookupRecords (PosLookupRecord). Each record specifies a position in the input glyph sequence and a LookupList index to the positioning lookup to be applied there. The array should list records in design order, or the order the lookups should be applied to the entire glyph sequence.

PosRule Subtable

| Value | Type | Description |
| --- | --- | --- |
| uint16 | GlyphCount | Number of glyphs in the Input glyph sequence |
| uint16 | PosCount | Number of PosLookupRecords |
| GlyphID | Input[GlyphCount-1] | Array of input GlyphIDs-starting with the second glyph |
| struct | PosLookupRecord-[PosCount] | Array of positioning lookups-in design order |

Context Positioning Subtable Format 2 is more flexible than Format 1 and describes class-based context positioning. For this format, a specific integer, called a class value, must be assigned to each glyph in all context glyph sequences. Contexts are then defined as sequences of class values. This subtable may define more than one context.

To clarify the notion of class-based context rules, suppose that certain sequences of three glyphs need special kerning. The glyph sequences consist of an uppercase glyph that overhangs on the right side, a punctuation mark glyph, and then a quote glyph. In this case, the set of uppercase glyphs would constitute one glyph class (Class1), the set of punctuation mark glyphs would constitute a second glyph class (Class 2), and the set of quote mark glyphs would constitute a third glyph class (Class 3). The input context might be specified with a context rule (PosClassRule) that describes "the set of glyph strings that form a sequence of three glyph classes, one glyph from Class 1, followed by one glyph from Class 2, followed by one glyph from Class 3."

Each ContextPosFormat2 subtable contains an offset to a class definition table (ClassDef), which defines the class values of all glyphs in the input contexts that the subtable describes. Generally, a unique ClassDef will be declared in each instance of the ContextPosFormat2 subtable that is included in a font, even though several Format 2 subtables may share ClassDef tables. Classes are exclusive sets; a glyph cannot be in more than one class at a time. The output glyphs that replace the glyphs in the context sequence do not need class values because they are specified elsewhere by GlyphID.

The ContextPosFormat2 subtable also contains a format identifier (PosFormat) and defines an offset to a Coverage table (Coverage). For this format, the Coverage table lists indices for the complete set of glyphs (not glyph classes) that may appear as the first glyph of any class-based context. In other words, the Coverage table contains the list of glyph indices for all the glyphs in all classes that may be first in any of the context class sequences. For example, if the contexts begin with a Class 1 or Class 2 glyph, then the Coverage table will list the indices of all Class 1 and Class 2 glyphs.

A ContextPosFormat 2 subtable also defines an array of offsets to the PosClassSet tables (PosClassSet), along with a count (including Class0) of the PosClassSet tables (PosClassSetCnt). In the array, the PosClassSet tables are ordered by ascending class value (from 0 to PosClassSetCnt−1).

A PosClassSet array contains one offset for each glyph class, including Class 0. PosClassSets are not explicitly tagged with a class value; rather, the index value of the PosClassSet in the PosClassSet array defines the class that a PosClassSet represents.

For example, the first PosClassSet listed in the array contains all the PosClassRules that define contexts beginning with Class 0 glyphs, the second PosClassSet contains all PosClassRules that define contexts beginning with Class 1 glyphs, and so on. If no PosClassRules begin with a particular class (that is, if a PosClassSet contains no PosClassRules), then the offset to that particular PosClassSet in the PosClassSet array will be set to NULL.

ContextPosFormat2 Subtable

| Value | Type | Description |
|---|---|---|
| uint16 | PosFormat | Format identifier-format = 2 |
| Offset | Coverage | Offset to Coverage table-from beginning of ContextPos subtable |
| Offset | ClassDef | Offset to ClassDef table-from beginning of ContextPos subtable |
| uint16 | PosClassSetCnt | Number of PosClassSet tables |
| Offset | PosClassSet-[PosClassSetCnt] | Array of offsets to PosClassSet tables-from beginning of ContextPos subtable-ordered by class-may be NULL |

All the PosClassRules that define contexts beginning with the same class are grouped together and defined in a PosClassSet table. Consequently, the PosClassSet table identifies the class of a context's first component.

A PosClassSet enumerates all the PosClassRules that begin with a particular glyph class. For instance, PosClassSet0 represents all the PosClassRules that describe contexts starting with Class 0 glyphs, and PosClassSet1 represents all the PosClassRules that define contexts starting with Class 1 glyphs.

Each PosClassSet table consists of a count of the PosClassRules defined in the PosClassSet (PosClassRuleCnt) and an array of offsets to PosClassRule tables (PosClassRule). The PosClassRule tables are ordered by preference in the PosClassRule array of the PosClassSet.

PosClassSet Table

| Value | Type | Description |
|---|---|---|
| uint16 | PosClassRuleCnt | Number of PosClassRule tables |
| Offset | PosClassRule-[PosClassRuleCnt] | Array of offsets to PosClassRule tables-from beginning of PosClassSet-ordered by preference |

For each context, a PosClassRule table contains a count of the glyph classes in a given context (GlyphCount), including the first class in the context sequence. A class array lists the classes, beginning with the second class, that follow the first class in the context. The first class listed indicates the second position in the context sequence. Note: Text order depends on the writing direction of the text. For text written from right to left, the right-most glyph will be first. Conversely, for text written from left to right, the left-most glyph will be first.

The values specified in the Class array are those defined in the ClassDef table. For example, consider a context consisting of the sequence: Class 2, Class 7, Class 5, Class 0. The Class array will read: Class[0]=7, Class[1]=5, and Class[2]=0. The first class in the sequence, Class 2, is defined by the index into the PosClassSet array of offsets. The total number and sequence of glyph classes listed in the Class array must match the total number and sequence of glyph classes contained in the input context.

A PosClassRule also contains a count of the positioning operations to be performed on the context (PosCount) and an array of PosLookupRecords (PosLookupRecord) that supply the positioning data. For each position in the context that requires a positioning operation, a PosLookupRecord specifies a LookupList index and a position in the input glyph class sequence where the lookup is applied. The PosLookupRecord array lists PosLookupRecords in design order, or the order in which lookups are applied to the entire glyph sequence.

PosClassRule Table

| Value | Type | Description |
|---|---|---|
| uint 16 | GlyphCount | Number of glyphs to be matched |
| uint 16 | PosCount | Number of PosLookupRecords |
| uint 16 | Class-[GlyphCount-1] | Array of classes-beginning with the second class-to be matched to the input glyph sequence |
| struct | PosLookupRecord-[PosCount] | Array of positioning lookups-in design order |

Context Positioning Subtable Format 3, coverage-based context positioning, defines a context rule as a sequence of coverages. Each position in the sequence may specify a different Coverage table for the set of glyphs that matches the context pattern. With Format 3, the glyph sets defined in the different Coverage tables may intersect, unlike Format 2 which specifies fixed class assignments for the lookup (they cannot be changed at each position in the context sequence) and exclusive classes (a glyph cannot be in more than one class at a time).

For example, consider an input context that contains an uppercase glyph (position 0), followed by any narrow uppercase glyph (position 1), and then another uppercase glyph (position 2). This context requires three Coverage tables, one for each position:

In position 0, the first position, the Coverage table lists the set of all uppercase glyphs. In position 1, the second position, the Coverage table lists the set of all narrow uppercase glyphs, which is a subset of the glyphs listed in the Coverage table for position 0. In position 2, the Coverage table lists the set of all uppercase glyphs again. Note: Both position 0 and position 2 can use the same Coverage table.

Unlike Formats 1 and 2, Format 3 defines only one context rule at a time. It consists of a format identifier (PosFormat), a count of the number of glyphs in the sequence to be matched (GlyphCount), and an array of Coverage offsets that describe the input context sequence (Coverage). The Coverage tables listed in the Coverage array must be listed in text order according to the writing direction. For text written from right to left, the right-most glyph will be first. Conversely, for text written from left to right, the left-most glyph will be first.

The subtable also contains a count of the positioning operations to be performed on the input Coverage sequence (PosCount) and an array of PosLookupRecords (PosLookupRecord) in design order, or the order in which lookups are applied to the entire glyph sequence.

ContextPosFormat3 Subtable

| Value | Type | Description |
| --- | --- | --- |
| uint 16 | PosFormat | Format identifier-format = 3 |
| uint 16 | GlyphCount | Number of glyphs in the input sequence |
| uint 16 | PosCount | Number of PosLookupRecords |
| Offset | Coverage[GlyphCount] | Array of offsets to Coverage tables-from beginning of ContextPos subtable |
| struct | PosLookupRecord[PosCount] | Array of positioning lookups-in design order |

LookupType 8: Chaining Contextual Positioning Subtable. A Chaining Contextual Positioning subtable (ChainContextPos) describes glyph positioning in context with an ability to look back and/or look ahead in the sequence of glyphs. The design of the Chaining Contextual Positioning subtable is parallel to that of the Contextual Positioning subtable, including the availability of three formats.

To specify the context, the coverage table lists the first glyph in the input sequence, and the ChainPosRule subtable defines the rest. Once a covered glyph is found at position i, the client reads the corresponding ChainPosRuleSet table and examines each table to determine if it matches the surrounding glyphs in the text. There is a match if the string <backtrack sequence>+<covered glyph>+<input sequence>+<lookahead sequence> matches with the glyphs at position (i—BacktrackGlyphCount) in the text.

If there is a match, then the client finds the target glyphs for positioning and performs the operations. Just like in the ContextPosFormat1 subtable, these lookups are required to operate within the range of text from the covered glyph to the end of the input sequence. No positioning operations can be defined for the backtracking sequence or the lookahead sequence.

Chaining Context Positioning Format 1: Simple Chaining Context Glyph Positioning. This Format is identical to Format 1 of Context Positioning lookup except that the PosRule table is replaced with a ChainPosRule table. (Correspondingly, the ChainPosRuleSet table differs from the PosRuleSet table only in that it lists offsets to Chain-PosRule subtables instead of PosRule tables; and the ChainContextPosFormat1 subtable lists offsets to ChainPosRuleSet subtables instead of PosRuleSet subtables.)

ChainContextPosFormat1 Subtable

| Value | Type | Description |
| --- | --- | --- |
| uint16 | PosFormat | Format identifier—format = 1 |
| Offset | Coverage | Offset to Coverage table—from beginning of ContextPos subtable |
| uint16 | ChainPosRuleSetCount | Number of ChainPosRuleSet tables |
| Offset | ChainPosRuleSet [ChainPosRuleSetCount] | Array of offsets to ChainPosRuleSet tables—from beginning of ContextPos subtable—ordered by Coverage Index |

A ChainPosRuleSet table consists of an array of offsets to ChainPosRule tables (ChainPosRule), ordered by preference, and a count of the ChainPosRule tables defined in the set (ChainPosRuleCount).

ChainPosRuleSet Table

| Value | Type | Description |
| --- | --- | --- |
| uint16 | ChainPosRuleCount | Number of ChainPosRule tables |
| Offset | ChainPosRule [ChainPosRuleCount] | Array of offsets to ChainPosRule tables—from beginning of ChainPosRuleSet—ordered by preference |

ChainPosRule Subtable

| Type | Name | Description |
| --- | --- | --- |
| uint16 | BacktrackGlyphCount | Total number of glyphs in the backtrack sequence (number of glyphs to be matched before the first glyph) |
| GlyphID | Backtrack [BacktrackGlyphCount] | Array of backtracking GlyphID's (to be matched before the input sequence) |
| uint16 | InputGlyphCount | Total number of glyphs in the input sequence (includes the first glyph) |
| GlyphID | Input [InputGlyphCount − 1] | Array of input GlyphIDs (start with second glyph) |
| uint16 | LookaheadGlyphCount | Total number of glyphs in the look ahead sequence (number of glyphs to be matched after the input sequence) |
| GlyphID | LookAhead [LookAheadGlyphCount] | Array of lookahead GlyphID's (to be matched after the input sequence) |
| uint16 | PosCount | Number of PosLookupRecords |
| struct | PosLookupRecord [PosCount] | Array of PosLookupRecords (in design order) |

Chaining Context Positioning Format 2: Class-based Chaining Context Glyph Positioning. This lookup Format is parallel to the Context Positioning format 2, with PosClassSet subtable changed to ChainPosClassSet subtable, and PosClassRule subtable changed to ChainPosClassRule subtable.

To chain contexts, three classes are used in the glyph ClassDef table: Backtrack ClassDef, Input ClassDef, and Lookahead ClassDef.

| ChainContextPosFormat2 Subtable | | |
|---|---|---|
| Value | Type | Description |
| uint16 | PosFormat | Format identifier—format = 2 |
| Offset | Coverage | Offset to Coverage table—from beginning of ChainContextPos subtable |
| Offset | BacktrackClassDef | Offset to ClassDef table containing backtrack sequence context—from beginning of ChainContextPos subtable |
| Offset | InputClassDef | Offset to ClassDef table containing input sequence context—from beginning of ChainContextPos subtable |
| Offset | LookaheadClassDef | Offset to ClassDef table containing lookahead sequence context—from beginning of ChainContextPos subtable |
| uint16 | ChainPosClassSetCnt | Number of ChainPosClassSet tables |
| Offset | ChainPosClassSet [ChainPosClassSetCnt] | Array of offsets to ChainPosClassSet tables—from beginning of ChainContextPos subtable—ordered by input class—may be NULL |

All the ChainPosClassRules that define contexts beginning with the same class are grouped together and defined in a ChainPosClassSet table. Consequently, the ChainPosClassSet table identifies the class of a context's first component.

| ChainPosClassSet Table | | |
|---|---|---|
| Value | Type | Description |
| uint16 | ChainPosClassRuleCnt | Number of ChainPosClassRule tables |

BASE—Baseline Table

The Baseline table (BASE) provides information used to align glyphs of different scripts and sizes in a line of text, whether the glyphs are in the same font or in different fonts. To improve text layout, the Baseline table also provides minimum (min) and maximum (max) glyph extent values for each script, language system, or feature in a font.

Lines of text composed with glyphs of different scripts and point sizes need adjustment to correct interline spacing and alignment. For example, glyphs designed to be the same point size often differ in height and depth from one font to another. This variation can produce interline spacing that looks too large or too small, and diacritical marks, math symbols, subscripts, and superscripts may be clipped.

In addition, different baselines can cause text lines to waver visually as glyphs from different scripts are placed next to one another. For example, ideographic scripts position all glyphs on a low baseline. With Latin scripts, however, the baseline is higher, and some glyphs descend below it. Finally, several Indic scripts use a high "hanging baseline" to align the tops of the glyphs.

To solve these composition problems, the BASE table recommends baseline positions and min/max extents for each script. Script min/max extents can be modified for particular language systems or features.

The BASE table uses a model that assumes one script at one size is the "dominant run" during text processing—that is, all other baselines are defined in relation to this the dominant run.

For example, Latin glyphs and the ideographic Kanji glyphs have different baselines. If a Latin script of a particular size is specified as the dominant run, then all Latin glyphs of all sizes will be aligned on the roman baseline, and all Kanji glyphs will be aligned on the lower ideographic baseline defined for use with Latin text. As a result, all glyphs will look aligned within each line of text.

The BASE table supplies recommended baseline positions; a client can specify others. For instance, the client may want to assign baseline positions different from those in the font.

The BASE table gives clients the option of using script, language system, or feature-specific extent values to improve composition. For example, suppose a font contains glyphs in Latin and Arabic scripts, and the min/max extents defined for the Arabic script are larger than the Latin extents. The font also supports Urdu, a language system that includes specific variants of the Arabic glyphs, and some Urdu variants require larger min/max extents than the default Arabic extents. To accommodate the Urdu glyphs, the BASE table can define language-specific min/max extent values that will override the default Arabic extents—but only when rendering Urdu glyphs.

The BASE table also can define feature-specific min/max values that apply only when a particular feature is enabled. Suppose that the font described earlier also supports the Farsi language system, which has one feature that requires a minor alteration of the Arabic script extents to display properly. The BASE table can specify these extent values and apply them only when that feature is enabled in the Farsi language.

The BASE table begins with offsets to Axis tables that describe layout data for the horizontal and vertical layout directions of text. A font can provide layout data for both text directions or for only one text direction:

The Horizontal Axis table (HorizAxis) defines information used to lay out text horizontally. All baseline and min/max values refer to the Y direction. The Vertical Axis table (VertAxis) defines information used to lay out text vertically. All baseline and min/max values refer to the X direction. The same baseline tags can be used for both horizontal and vertical axes. For example, the 'romn' tag description used for the vertical axis would indicate the baseline of rotated Latin text.

The HorizAxis and VertAxis tables organize layout information by script in BaseScriptList tables. A BaseScriptList enumerates all scripts in the font that are written in a particular direction (horizontal or vertical).

Each Axis table also references a BaseTagList, which identifies all the baselines for all scripts written in the same direction (horizontal or vertical). The BaseTagList may also include baseline tags for scripts supported in other fonts.

Each script in a BaseScriptList is represented by a BaseScriptRecord. This record references a BaseScript table, which contains layout data for the script. In turn, the BaseScript table references a BaseValues table, which contains baseline information and several MinMax tables that define min/max extent values.

The BaseValues table specifies the coordinate values for all baselines in the BaseTagList. In addition, it identifies one of these baselines as the default baseline for the script. As glyphs in a script are scaled, they grow or shrink from the script's default baseline position. Each baseline can have unique coordinates. This contrasts with TrueType 1.0, which implies a single, fixed baseline for all scripts in a font. With the OpenType™ Layout tables, each script can be aligned independently, although more than one script may use the same baseline values.

Baseline coordinates for scripts in the same font must be specified in relation to each other for correct alignment of the glyphs. If the BaseTagList of the HorizAxis table specifies two baselines, the roman and the ideographic, then the layout data for both the Latin and Kanji scripts will specify coordinate positions for both baselines:

The BaseValues table for the Latin script will give coordinates for both baselines and specify the roman baseline as the default. The BaseValues table for the Kanji script will give coordinates for both baselines and specify the ideographic baseline as the default.

The BaseScript table can define minimum and maximum extent values for each script, language system, or feature. (These values are distinct from the min/max extent values recorded for the font as a whole in the head, hhea, vhea, and OS/2 tables.) These extent values appear in three tables:

The DefaultMinMax table defines the default min/max extents for the script. A MinMax table, referenced through a BaseLangSysRecord, specifies min/max extents to accommodate the glyphs in a specific language system. A FeatMinMaxRecord, referenced from the MinMax table, provides min/max extent values to support feature-specific glyph actions.

The actual baseline and min/max extent values used by the BASE table reside in BaseCoord tables. Three formats are defined for BaseCoord table data. All formats define single X or Y coordinate values in design units, but two formats support fine adjustments to these values based on a contour point or a Device table.

The BASE table begins with a header that consists of a version number for the table (Version), initially set to 1.0 (0x00010000), and offsets to horizontal and vertical Axis tables (HorizAxis and VertAxis). Each Axis table stores all baseline information and min/max extents for one layout direction. The HorizAxis table contains Y values for horizontal text layout; the VertAxis table contains X values for vertical text layout.

A font may supply information for both layout directions. If a font has values for only one text direction, the Axis table offset value for the other direction will be set to NULL.

| \ | BASE Header | |
|---|---|---|
| Type | Name | Description |
| fixed32 | Version | Version of the BASE table—initially 0x00010000 |
| Offset | HorizAxis | Offset to horizontal Axis table—from beginning of BASE table—may be NULL |
| Offset | VertAxis | Offset to vertical Axis table—from beginning of BASE table—may be NULL |

An Axis table is used to render scripts either horizontally or vertically. It consists of offsets, measured from the beginning of the Axis table, to a BaseTagList and a BaseScriptList:

The BaseScriptList enumerates all scripts rendered in the text layout direction.

The BaseTagList enumerates all baselines used to render the scripts in the text layout direction. If no baseline data is available for a text direction, the offset to the corresponding BaseTagList may be set to NULL.

| \ | Axis Table | |
|---|---|---|
| Type | Name | Description |
| Offset | BaseTagList | Offset to BaseTagList table—from beginning of Axis table—may be NULL |
| Offset | BaseScriptList | Offset to BaseScriptList table—from beginning of Axis table |

The BaseTagList table identifies the baselines for all scripts in the font that are rendered in the same text direction. Each baseline is identified with a 4-byte baseline tag. The BaseTagList can define any number of baselines, and it may include baseline tags for scripts supported in other fonts.

Each script in the BaseScriptList table must designate one of these BaseTagList baselines as its default, which the OpenType Layout Services use to align all glyphs in the script. Even though the BaseScriptList and the BaseTagList are defined independently of one another, the BaseTagList typically includes a tag for each different default baseline needed to render the scripts in the layout direction. If some scripts use the same default baseline, the BaseTagList needs to list the common baseline tag only once.

The BaseTagList table consists of an array of baseline identification tags (BaselineTag), listed alphabetically, and a count of the total number of baseline Tags in the array (BaseTagCount).

| \ | BaseTagList Table | |
|---|---|---|
| Type | Name | Description |
| uint16 | BaseTagCount | Number of baseline identification tags in this text direction—may be zero (0) |
| Tag | BaselineTag [BaseTagCount] | Array of 4-byte baseline identification tags—must be in alphabetical order |

The BaseScriptList table identifies all scripts in the font that are rendered in the same layout direction. If a script is not listed here, then the text-processing client will render the script using the layout information specified for the entire font.

For each script listed in the BaseScriptList table, a BaseScriptRecord must be defined that identifies the script and references its layout data. BaseScriptRecords are stored in the BaseScriptRecord array, ordered alphabetically by the BaseScriptTag in each record. The BaseScriptCount specifies the total number of BaseScriptRecords in the array.

| \ | BaseScriptList Table | |
|---|---|---|
| Type | Name | Description |
| uint16 | BaseScriptCount | Number of BaseScriptRecords defined |
| struct | BaseScriptRecord [BaseScriptCount] | Array of BaseScriptRecords—in alphabetical order by BaseScriptTag |

A BaseScriptRecord contains a script identification tag (BaseScriptTag), which must be identical to the ScriptTag used to define the script in the ScriptList of a GSUB or GPOS table. Each record also must include an offset to a BaseScript table that defines the baseline and min/max extent data for the script.

BaseScriptRecord

| Type | Name | Description |
|---|---|---|
| Tag | BaseScriptTag | 4-byte script identification tag |
| Offset | BaseScript | Offset to BaseScript table—from beginning of BaseScriptList |

A BaseScript table organizes and specifies the baseline data and min/max extent data for one script. Within a BaseScript table, the BaseValues table contains baseline information, and one or more MinMax tables contain min/max extent data.

The BaseValues table identifies the default baseline for the script and lists coordinate positions for each baseline named in the corresponding BaseTagList. Each script can assign a different position to each baseline, so each script can be aligned independently in relation to any other script.

The DefaultMinMax table defines the default min/max extent values for the script. If a language system or feature defined in the font has no effect on the script's default min/max extents, the OpenType Layout Services will use the default script values.

Sometimes language-specific overrides for min/max extents are needed to properly render the glyphs in a specific language system. For example, a glyph substitution required in a language system may result in a glyph whose extents exceed the script's default min/max extents. Each language system that specifies min/max extent values must define a BaseLangSysRecord. The record should identify the language system (BaseLangSysTag) and contain an offset to a MinMax table of language-specific extent coordinates.

Feature-specific overrides for min/max extents also may be needed to accommodate the effects of glyph actions used to implement a specific feature. For example, superscript or subscript features may require changes to the default script or language system extents. Feature-specific extent values not limited to a specific language system may be specified in the DefaultMinMax table. However, extent values used for a specific language system require a BaseLangSysRecord and a MinMax table. In addition to specifying coordinate data, the MinMax table must contain offsets to FeatMinMaxRecords that define the feature-specific min/max data.

A BaseScript table has four components: An offset to a BaseValues table (BaseValues). If no baseline data is defined for the script or the corresponding BaseTagList is set to NULL, the offset to the BaseValues table may be set to NULL. An offset to the DefaultMinMax table. If no default min/max extent data is defined for the script, this offset may be set to NULL. An array of BaseLangSysRecords (BaseLangSysRecord). The individual records stored in the BaseLangSysRecord array are listed alphabetically by BaseLangSysTag. A count of the BaseLangSysRecords included (BaseLangSysCount). If no language system or language-specific feature min/max values are defined, the BaseLangSysCount may be set to zero (0).

BaseScript Table

| Type | Name | Description |
|---|---|---|
| Offset | BaseValues | Offset to BaseValues table—from beginning of BaseScript table—may be NULL |
| Offset | DefaultMinMax | Offset to MinMax table—from beginning of BaseScript table—may be NULL |
| uint16 | BaseLangSysCount | Number of BaseLangSysRecords defined—may be zero (0) |
| struct | BaseLangSysRecord [BaseLangSysCount] | Array of BaseLangSysRecords—in alphabetical order by BaseLangSysTag |

A BaseLangSysRecord defines min/max extents for a language system or a language-specific feature. Each record contains an identification tag for the language system (BaseLangSysTag) and an offset to a MinMax table (MinMax) that defines extent coordinate values for the language system and references feature-specific extent data.

BaseLangSysRecord

| Type | Name | Description |
|---|---|---|
| Tag | BaseLangSysTag | 4-byte language system identification tag |
| Offset | MinMax | Offset to MinMax table—from beginning of BaseScript table |

A BaseValues table lists the coordinate positions of all baselines named in the BaselineTag array of the corresponding BaseTagList and identifies a default baseline for a script. Note: When the offset to the corresponding BaseTagList is NULL, a BaseValues table is not needed. However, if the offset is not NULL, then each script must specify coordinate positions for all baselines named in the BaseTagList. The default baseline, one per script, is the baseline used to lay out and align the glyphs in the script. The DefaultIndex in the BaseValues table identifies the default baseline with a value that equals the array index position of the corresponding tag in the BaselineTag array.

For example, the Han and Latin scripts use different baselines to align text. If a font supports both of these scripts, the BaselineTag array in the BaseTagList of the HorizAxis table will contain two tags, listed alphabetically: "ideo" in BaselineTag[0] for the Han ideographic baseline, and "romn" in BaselineTag[1] for the Latin baseline. The BaseValues table for the Latin script will specify the roman baseline as the default, so the DefaultIndex in the BaseValues table for Latin will be "1" to indicate the roman baseline tag. In the BaseValues table for the Han script, the DefaultIndex will be "0" to indicate the ideographic baseline tag.

Two or more scripts may share a default baseline. For instance, if the font described above also supports the Cyrillic script, the BaselineTag array does not need a baseline tag for Cyrillic because Cyrillic and Latin share the same baseline. The DefaultIndex defined in the BaseValues table for the Cyrillic script will specify "1" to indicate the roman baseline tag, listed in the second position in the BaselineTag array.

In addition to identifying the DefaultIndex, the BaseValues table contains an offset to an array of BaseCoord tables (BaseCoord) that list the coordinate positions for all baselines, including the default baseline, named in the associated BaselineTag array. One BaseCoord table is defined for each baseline. The BaseCoordCount defines the total number of BaseCoord tables, which must equal the number of baseline tags listed in BaseTagCount in the BaseTagList.

Each baseline coordinate is defined as a single X or Y value in design units measured from the zero position on the relevant X or Y axis. For example, a BaseCoord table defined in the HorizAxis table will contain a Y value because horizontal baselines are positioned vertically. BaseCoord values may be negative. Each script may assign a different coordinate to each baseline.

Offsets to each BaseCoord table are stored in a BaseCoord array within the BaseValues table. The order of the stored offsets corresponds to the order of the tags listed in the BaselineTag array of the BaseTagList. In other words, the first position in the BaseCoord array will define the offset to the BaseCoord table for the first baseline named in the BaselineTag array, the second position will define the offset to the BaseCoord table for the second baseline named in the BaselineTag array, and so on.

| | BaseValues Table | |
|---|---|---|
| Type | Name | Description |
| uint16 | DefaultIndex | Index number of default baseline for this script—equals index position of baseline tag in BaselineArray of the BaseTagList |
| uint16 | BaseCoordCount | Number of BaseCoord tables defined—should equal BaseTagCount in the BaseTagList |
| Offset | BaseCoord [BaseCoordCount] | Array of offsets to BaseCoord—from beginning of BaseValues table—order matches BaselineTag array in the BaseTagList |

The MinMax table specifies extents for scripts and language systems. It also contains an array of FeatMinMaxRecords used to define feature-specific extents. Both the MinMax table and the FeatMinMaxRecord define offsets to two BaseCoord tables: one that defines the mimimum extent value (MinCoord), and one that defines the maximum extent value (MaxCoord). Each extent value is a single X or Y value, depending upon the text direction, and is specified in design units. Coordinate values may be negative.

Different tables define the min/max extent values for scripts, language systems, and features: Min/max extent values for a script are defined in the DefaultMinMax table, referenced in a BaseScript table. Within the DefaultMinMax table, FeatMinMaxRecords can specify extent values for features that apply to the entire script. Min/max extent values for a language system are defined in the MinMax table, referenced in a BaseLangSysRecord. FeatMinMaxRecords can be defined within the MinMax table to specify extent values for features applied within a language system.

In a FeatMinMaxRecord, the MinCoord and MaxCoord tables specify the minimum and maximum coordinate values for the feature, and a FeatureTableTag defines a 4-byte feature identification tag. The FeatureTableTag must match the tag used to identify the feature in the FeatureList of the GSUB or GPOS table.

Each feature that exceeds the default min/max values requires a FeatMinMaxRecord. All FeatMinMaxRecords are listed alphabetically by FeatureTableTag in an array (FeatMinMaxRecord) within the MinMax table. FeatMinMaxCount defines the total number of FeatMinMaxRecords.

Text-processing clients should use the following procedure to access the script, language system, and feature-specific extent data:

1. Determine script extents in relation to the text content.
2. Select language-specific extent values with respect to the language system in use.
3. Have the application or user choose feature-specific extent values.
4. If no extent values are defined for a language system or for language-specific features, use the default min/max extent values for the script.

| Type | Name | Description |
|---|---|---|
| | | MinMax Table |
| Offset | MinCoord | Offset to BaseCoord table—defines minimum extent value—from the beginning of MinMax table—may be NULL |
| Offset | MaxCoord | Offset to BaseCoord table—defines maximum extent value—from the beginning of MinMax table—may be NULL |
| uint16 | FeatMinMaxCount | Number of FeatMinMaxRecords—may be zero (0) |
| struct | FeatMinMaxRecord [FeatMinMaxCount] | Array of FeatMinMaxRecords—in alphabetical order, by FeatureTableTag |
| | | FeatMinMaxRecord |
| Tag | FeatureTableTag | 4-byte feature identification tag—must match FeatureTag in FeatureList |
| Offset | MinCoord | Offset to BaseCoord table—defines minimum extent value—from beginning of MinMax table—may be NULL |
| Offset | MaxCoord | Offset to BaseCoord table—defines maximum extent value—from beginning of MinMax table—may be NULL |

Within the BASE table, a BaseCoord table defines baseline and min/max extent values. Each BaseCoord table defines one X or Y value: If defined within the HorizAxis table, then the BaseCoord table contains a Y value. If defined within the VertAxis table, then the BaseCoord table contains an X value. All values are defined in design units, which typically are scaled and rounded to the nearest integer when scaling the glyphs. Values may be negative.

Three formats available for BaseCoord table data define single X or Y coordinate values in design units. Two of the formats also support fine adjustments to the X or Y values based on a contour point or a Device table.

The first BaseCoord format (BaseCoordFormat1) consists of a format identifier, followed by a single design unit coordinate that specifies the BaseCoord value. This format has the benefits of small size and simplicity, but the BaseCoord value cannot be hinted for fine adjustments at different sizes or device resolutions.

BaseCoordFormat1 Table

| Type | Name | Description |
|---|---|---|
| uint16 | BaseCoordFormat | Format identifier—format = 1 |
| int16 | Coordinate | X or Y value, in design units |

The second BaseCoord format (BaseCoordFormat2) specifies the BaseCoord value in design units, but also supplies a glyph index and a contour point for reference. During font hinting, the contour point on the glyph outline may move. The point's final position after hinting provides the final value for rendering a given font size. Note: Glyph positioning operations defined in the GPOS table do not affect the point's final position.

BaseCoordFormat2 Table

| Type | Name | Description |
|---|---|---|
| uint16 | BaseCoordFormat | Format identifier—format = 2 |
| int16 | Coordinate | X or Y value, in design units |
| GlyphID | ReferenceGlyph | GlyphID of control glyph |
| uint16 | BaseCoordPoint | Index of contour point on the ReferenceGlyph |

The third BaseCoord format (BaseCoordFormat3) also specifies the BaseCoord value in design units, but it uses a Device table rather than a contour point to adjust the value. This format offers the advantage of fine-tuning the BaseCoord value for any font size and device resolution. It is shown below.

| Type | Name | Description |
|---|---|---|
| uint16 | BaseCoordFormat | Format identifier—format = 3 |
| int16 | Coordinate | X or Y value, in design units |
| Offset | DeviceTable | Offset to Device table for X or Y value |

BaseCoord Format 4 is for use by multiple master fonts and is shown below.

| Type | Name | Description |
|---|---|---|
| uint16 | BaseCoordFormat | Format identifier, format = 4 |
| uint16 | IdBaseCoord | Metric id |

Head—Font Header

The Font Header table, described below, gives global information about the font.

| Type | Name | Description |
|---|---|---|
| Fixed | Table version number | 0x00010000 for version 1.0. |
| Fixed | fontRevision | Set by font manufacturer. |
| ULONG | checkSumAdjustment | To compute: set it to 0, sum the entire font as ULONG, then store 0xB1B0AFBA — sum. |
| ULONG | magicNumber | Set to 0x5F0F3CF5. |
| USHORT | flags | Bit 0 — baseline for font at y = 0; Bit 1 — left sidebearing at x = 0; Bit 2 — instructions may depend on point size; Bit 3 — force ppem to integer values for all internal scaler math; may use fractional ppem sizes if this bit is clear; Bit 4 — instructions may alter advance width (the advance widths might not scale linearly); Bits 5–10 — defined by Apple Bit 11 — font data is 'lossless,' as a result of having been compressed and decompressed with the Agfa MicroType Express engine. Bit 12 — font converted (produce compatible metrics) Note: All other bits must be zero. |
| USHORT | unitsPerEm | Valid range is from 16 to 16384 |
| LONGDATETIME | created | Number of seconds since 12:00 midnight, January 1, 1904. 64-bit integer |
| LONGDATETIME | modified | Number of seconds since 12:00 midnight, January 1, 1904. 64-bit integer |
| SHORT | xMin | For all glyph bounding boxes. |
| SHORT | yMin | For all glyph bounding boxes. |
| SHORT | xMax | For all glyph bounding boxes. |
| SHORT | yMax | For all glyph bounding boxes. |
| USHORT | macStyle | Bit 0 bold (if set to 1); Bit 1 italic (if set to 1) Bits 2–15 reserved (set to 0). |
| USHORT | lowestRecPPEM | Smallest readable size in pixels. |
| SHORT | fontDirectionHint | 0 Fully mixed directional glyphs; 1 Only strongly left to right; 2 Like 1 but also contains neutrals; |

-continued

| Type | Name | Description |
|---|---|---|
| SHORT | indexToLocFormat | −1 Only strongly right to left; −2 Like −1 but also contains neutrals. 1 0 for short offsets, 1 for long. |
| SHORT | glyphDataFormat | 0 for current format. | hhea—Horizontal Header

The Horizontal Header table contains information for horizontal layout. The values in the minRightSidebearing, minLeftSideBearing and xMaxExtent should be computed using only glyphs that have contours. Glyphs with no contours should be ignored for the purposes of these calculations. All reserved areas must be set to 0.

| Type | Name | Description |
|---|---|---|
| Fixed | Table version number | 0x00010000 for version 1.0. |
| FWord | Ascender | Typographic ascent. |
| FWord | Descender | Typographic descent. |
| FWord | LineGap | Typographic line gap. Negative LineGap values are treated as zero in Windows 3.1, System 6, and System 7. |
| uFWord | advanceWidthMax | Maximum advance width value in 'hmtx' table. |
| FWord | minLeftSideBearing | Minimum left sidebearing value in 'hmtx' table. |
| FWord | minRightSideBearing | Minimum right sidebearing value; calculated as Min(aw − lsb − (xMax − xMin)). |
| FWord | xMaxExtent | Max(lsb + (xMax − xMin)). |
| SHORT | caretSlopeRise | Used to calculate the slope of the cursor (rise/run); 1 for vertical. |
| SHORT | caretSlopeRun | 0 for vertical. |
| SHORT | caretOffset | The amount by which a slanted highlight on a glyph needs to be shifted to produce the best appearance. Set to 0 for non-slanted fonts |
| SHORT | (reserved) | set to 0 |
| SHORT | (reserved) | set to 0 |
| SHORT | (reserved) | set to 0 |
| SHORT | (reserved) | set to 0 |
| SHORT | metricDataFormat | 0 for current format. |
| USHORT | numberOfHMetrics | Number of hMetric entries in 'hmtx' table |

Name—Naming Table

The Naming Table allows multilingual strings to be associated with the OpenType™ font file. These strings can represent copyright notices, font names, family names, style names, and so on. To keep this table short, the font manufacturer may wish to make a limited set of entries in some small set of languages; later, the font can be "localized" and the strings translated or added. Other parts of the OpenType font file that require these strings can then refer to them simply by their index number. Clients that need a particular string can look it up by its platform ID, character encoding ID, language ID and name ID. Note that some platforms may require single-byte character strings, while others may require double-byte strings.

For historical reasons, some applications which install fonts perform version control using values in the Mac 'name' table. Because of this, a Mac 'name' table should exist in all fonts.

The Naming Table is organized as follows.

| Type | Description |
|---|---|
| USHORT | Format selector (=0). |
| USHORT | Number of NameRecords that follow n. |

-continued

| Type | Description |
|---|---|
| USHORT | Offset to start of string storage (from start of table). |
| n NameRecords | The NameRecords. |
| (Variable) | Storage for the actual string data. |

The NameRecords are sorted by platform ID, then platform-specific ID, then language ID, and then by name ID. Each NameRecord is organized as follows.

| Type | Description |
|---|---|
| USHORT | Platform ID. |
| USHORT | Platform-specific encoding ID. |
| USHORT | Language ID. |
| USHORT | Name ID. |
| USHORT | String length (in bytes). |
| USHORT | String offset from start of storage area (in bytes). |

Defined Platform ID values include the following.

| ID | Platform | Specific encoding |
|---|---|---|
| 0 | Apple Unicode | none |
| 1 | Macintosh | Script manager code |
| 2 | ISO | ISO encoding |
| 3 | Microsoft | Microsoft encoding |

The values 240 through 255 are reserved for user-defined platforms.

The Microsoft platform-specific encoding IDs (platform ID=3) are 0, Undefined character set or indexing scheme, and 1, Unicode indexing.

When building a Unicode font for Windows, the platform ID should be 3 and the encoding ID should be 1. When building a symbol font for Windows, the platform ID should be 3 and the encoding ID should be 0. When building a font that will be used on the Macintosh, the platform ID should be 1 and the encoding ID should be 0.

The language ID refers to a value which identifies the language in which a particular string is written. Language IDs assigned by Microsoft can be found, for example, at http://www.microsoft.com/typography/otspec/lcid-cp.txt.

Macintosh platform-specific encoding IDs (script manager codes), (platform ID=1) and Macintosh language IDs can be found, for example, at http://fonts.apple.com/TTRefMan/RM06/Chap6name.html.

ISO specific encodings (platform ID=2) are shown below. There are no ISO-specific language IDs.

| Code | ISO encoding |
|---|---|
| 0 | 7-bit ASCII |
| 1 | ISO 10646 |
| 2 | ISO 8859-1 |

The following Name IDs are defined, and they apply to all platforms.

| Code | Meaning |
|---|---|
| 0 | Copyright notice. |
| 1 | Font Family name |
| 2 | Font Subfamily name; for purposes of definition, this is assumed to address style (italic, oblique) and weight (light, bold, black, etc.) only. A font with no particular differences in weight or style should have the string "Regular" stored in this position. |
| 3 | Unique font identifier |
| 4 | Full font name; this should be a combination of strings 1 and 2. Exception: if the font is "Regular" as indicated in string 2, then use only the family name contained in string 1. This is the font name that Windows will expose to users. |
| 5 | Version string. Must begin with the syntax 'Version n.nn' (upper case, lower case, or mixed, with a space following the number). |
| 6 | Postscript name for the font. |
| 7 | Trademark; this is used to save any trademark notice/information for this font. |
| 8 | Manufacturer Name. |
| 9 | Designer; name of the designer of the typeface. |
| 10 | Description; description of the typeface. Can contain revision information, usage recommendations, history, features, and so on. |
| 11 | URL Vendor; URL of font vendor (with protocol, e.g., http://, ftp://). If a unique serial number is embedded in the URL, it can be used to register the font. |
| 12 | URL Designer; URL of typeface designer (with protocol, e.g., http://, ftp://). |
| 13 | License Description; description of how the font may be legally used, or different example scenarios for licensed use. |
| 14 | License Info URL; URL where additional licensing information can be found. |
| 15 | Reserved; set to zero. |
| 16 | Preferred Family (Windows only); In Windows, the Family name is displayed in the font menu; the Subfamily name is presented as the Style name. |
| 17 | Preferred Subfamily (Windows only). |
| 18 | Compatible Full (Macintosh only); On the Macintosh, the menu name is constructed using the FOND resource. This usually matches the Full Name. For the name of the font to appear differently than the Full Name, insert the Compatible Full Name in ID 18. |

OS/2 and Windows both require that all name strings be defined in Unicode. Thus all 'name' table strings for platform ID=3 (Microsoft) require two bytes per character. Macintosh fonts require single byte strings.

OS/2—OS/2 and Windows Metrics

The OS/2 table consists of a set of metrics that are required in OpenType fonts. There are two versions of this table, the second version having five additional fields: sxHeight, sCapHeight, usDefaultChar, usBreakChar, usMaxContext. The layout of version 2 of this table is as follows.

| Type | Name of Entry | Comments |
|---|---|---|
| USHORT | version | 0x0002 |
| SHORT | xAvgCharWidth | Average weighted escapement: the arithmetic average of the escapement (width) of all of the 26 lowercase letters a through z of the Latin alphabet and the space character. |
| USHORT | usWeightClass | Weight class: the visual weight (degree strokes) of the characters in the font. |
| USHORT | usWidthClass | Width class: relative change from the normal aspect ratio (width to height ratio) for the glyphs in a font. |
| SHORT | fsType | Type flags indicating font embedding licensing rights for the font. |
| SHORT | ySubscriptXSize | Subscript horizontal font size: recommended horizontal size in font design units for subscripts for this font. |
| SHORT | ySubscriptYSize | Subscript vertical font size. |
| SHORT | ySubscriptXOffset | Subscript x offset: recommended horizontal offset in font design units for subscripts for this font. |
| SHORT | ySubscriptYOffset | Subscript y offset. |
| SHORT | ySuperscriptXSize | Superscript horizontal font size. |
| SHORT | ySuperscriptYSize | Superscript vertical font size. |
| SHORT | ySuperscriptXOffset | Superscript x offset. |
| SHORT | ySuperscriptYOffset | Superscript y offset. |
| SHORT | yStrikeoutSize | Width of the strikeout stroke in font design units. |
| SHORT | yStrikeoutPosition | Position of the strikeout stroke relative to the baseline in font design units. |
| SHORT | sFamilyClass | Font-family class and subclass. |
| BYTE | panose[10] | Ten-byte PANOSE classification number |
| ULONG | ulUnicodeRange1 | Bits 0–31. Unicode Character Range: 32-bit unsigned long (4 copies) totaling 128 bits. This field is used to specify the Unicode blocks or ranges encompassed by the font file in |

-continued

| Type | Name of Entry | Comments |
|---|---|---|
| | | the 'cmap' subtable for platform 3, encoding ID 1 (Microsoft platform). |
| ULONG | ulUnicodeRange2 | Bits 32–63 |
| ULONG | ulUnicodeRange3 | Bits 64–95 |
| ULONG | ulUnicodeRange4 | Bits 96–127 |
| CHAR | achVendID[4] | Font Vendor Identification |
| USHORT | fsSelection | Font selection flags, contain information concerning the nature of the font patterns. |
| USHORT | usFirstCharIndex | The minimum Unicode index (character code) in this font, according to the cmap subtable for platform ID 3 and encoding ID 0 or 1. |
| USHORT | usLastCharIndex | The maximum Unicode index (character code) in this font, as above. |
| SHORT | sTypoAscender | The typographic ascender for this font. |
| SHORT | sTypoDescender | The typographic descender for this font. |
| SHORT | sTypoLineGap | The typographic line gap for this font. |
| USHORT | usWinAscent | The ascender metric for Windows. |
| USHORT | usWinDescent | The descender metric for Windows. |
| ULONG | ulCodePageRange1 | Bits 0–31 of Code Page Character Range. This field is used to specify the code pages encompassed by the font file in the 'cmap' subtable for platform 3, encoding ID 1. |
| ULONG | ulCodePageRange2 | Bits 32–63 |
| SHORT | sxHeight | Distance between the baseline and the approximate height of non-ascending lowercase letters measured in FUnits. |
| SHORT | sCapHeight | Distance between the baseline and the approximate height of uppercase letters measured in FUnits. |
| USHORT | usDefaultChar | Unicode encoding of the glyph Windows uses as the default character. |
| USHORT | usBreakChar | Unicode encoding of the glyph Windows uses as the break character. |
| USHORT | usMaxContext | Maximum length of a target glyph context for any feature in this font. | vhea—Vertical Header Table

The vertical header table (tag name: 'vhea') contains information needed for vertical fonts. The glyphs of vertical fonts are written either top to bottom or bottom to top. This table contains information that is general to the font as a whole. Information that pertains to specific glyphs is given in the vertical metrics table (tag name: 'vmtx') described separately. The formats of these tables are similar to those for horizontal metrics (hhea and hmtx).

Data in the vertical header table must be consistent with data that appears in the vertical metrics table. The advance height and top sidebearing values in the vertical metrics table must correspond with the maximum advance height and minimum bottom sidebearing values in the vertical header table.

The vertical header table format is organized as follows.

Vertical Header Table

| Type | Name | Description |
|---|---|---|
| Fixed | version | Version number of the vertical header table (0x00010000 for the initial version). |
| SHORT | ascent | Distance in FUnits from the vertical baseline to the previous line's descent. |
| SHORT | descent | Distance in FUnits from the vertical baseline to the next line's ascent. |
| SHORT | lineGap | Reserved; set to 0 |
| SHORT | advanceHeightMax | The maximum advance height measurement — in FUnits found in the font. This value must be consistent with the entries in the vertical metrics table. |
| SHORT | minTopSideBearing | The minimum top sidebearing measurement found in the font, in FUnits. This value must be consistent with the entries in the vertical metrics table. |
| SHORT | minBottomSideBearing | The minimum bottom sidebearing measurement found in the font, in FUnits. This value must be consistent with the entries in the vertical metrics table. |
| SHORT | yMaxExtent | Defined as yMaxExtent = minTopSideBearing + (yMax–yMin) |
| SHORT | caretSlopeRise | The value of the caretSlopeRise field divided by the value of the caretSlopeRun Field determines the slope of the caret. A value of 0 for the rise and a value of 1 for the run specifies a horizontal caret. A value of 1 for the rise and a value of 0 for the run specifies a vertical caret. Intermediate values are desirable for fonts whose glyphs are oblique or italic. For a vertical font, a horizontal caret is best. |
| SHORT | caretSlopeRun | See the caretSlopeRise field. Value = 1 for nonslanted vertical fonts. |
| SHORT | caretOffset | The amount by which the highlight on a slanted glyph needs to be shifted away from the glyph in order to produce the best appearance. Set value equal to 0 for nonslanted fonts. |
| SHORT | reserved | Set to 0. |
| SHORT | reserved | Set to 0. |
| SHORT | reserved | Set to 0. |
| SHORT | reserved | Set to 0. |
| SHORT | metricDataFormat | Set to 0. |
| USHORT | numOfLongVerMetrics | Number of advance heights in the vertical metrics table. |

What is claimed is:

1. A method of adding typographic features to a font, comprising:
   providing a feature file containing feature definitions expressed in a high-level feature definition language that has a form of statement for defining substitution rules and a form of statement for defining positioning rules;
   grouping the rule by type and determining an appropriate table format to use for each group of rules;
   reading and parsing the feature file in a computer program to generate internal representations of the feature definitions and storing the internal representation in computer memory;
   converting the feature definitions into font table or subtable definitions; and
   writing out the table or subtable definitions into a font file.

2. The method of claim 1, further comprising:

referencing a glyph aliasing database to derive a final glyph name from a user-friendly glyph name.

3. A method of adding typographic features to a font, comprising:

providing a text file editable by a text editor and containing feature definitions expressed in a high-level feature definition language, the feature definition language having a form of statement for defining substitution rules and a form of statement for defining positioning rules;

reading and parsing the text file in a computer program to generate internal representations of the feature definitions and storing the internal representation in computer memory;

converting the feature definitions into font table or subtable definitions;

writing out the table or subtable definitions into a font file; and identifying a specific font table or subtable inferentially from a substitution rule statement and converting the substitution rule statement into a definition for the identified specific font table or subtable.

4. A method of adding typographic features to a font, comprising:

providing a text file editable by a text editor and containing feature definitions expressed in a high-level feature definition language, the feature definition language having a form of statement for defining substitution rules and a form of statement for defining positioning rules;

reading and parsing the text file in a computer program to generate internal representations of the feature definitions and storing the internal representation in computer memory;

converting the feature definitions into font table or subtable definitions;

writing out the table or subtable definitions into a font file; and identifying a specific font table or subtable inferentially from a positioning rule statement and converting the positioning rule statement into a definition for the identified specific font table or subtable.

5. The method of claim 1, further comprising:

creating shared data structures without user intervention from the feature definitions and removing redundancies before writing out the feature definitions into an OpenType font file.

6. The method of claim 5, further comprising:

calculating the sizes of subtable format options for an OpenType table and selecting the smallest option for writing out corresponding feature definitions.

7. The method of claim 6, wherein the feature definition language does not have constructs to express a subtable format selection.

8. The method of claim 3, wherein the definition of a liga feature is expressed in the feature definition language as a feature block enclosing substitution rules.

9. The method of claim 3, wherein the definition of a liga feature comprises a substitution rule of the form "substitute <glyph sequence> by <glyph>", where <glyph sequence> contains a glyph class, the method comprising:

enumerating all specific glyph sequences defined by <glyph sequence> as glyph sequences that do not contain a glyph class.

10. The method of claim 1, wherein the feature definitions include a definition of a labeled block that defines a single lookup in an OpenType font.

11. The method of claim 1, wherein the feature definition language is based on declarative logic statements, and wherein the feature definition language does not have constructs to express a subtable format selection, the method further comprising:

creating shared data structures without user intervention from the feature definitions and removing redundancies before writing out the feature definitions into an OpenType font file; and calculating the sizes of subtable format options for an OpenType table and selecting the smallest option for writing out corresponding feature definitions.

12. A system operable to add typographic features to a font, comprising:

a programmable computer having an instruction processor, random access memory, and data file memory;

means for reading a feature file containing feature definitions expressed in a high-level feature definition language;

means for parsing the feature file to generate internal representations of the feature definitions;

means for processing a form of statement for defining substitution rules and a form of statement for defining positioning rules;

means for storing the internal representation in the random access memory;

means for converting the feature definitions into font table or subtable definitions;

means for writing out the table or subtable definitions into a font file stored in the data file memory; and means for grouping the rules by type and determining an appropriate table format to use for each group of rules.

13. The system of claim 12, further comprising:

means for referencing a glyph aliasing database to derive a final glyph name from a user-friendly glyph name.

14. A system operable to add typographic features to a font, comprising:

a programmable computer having an instruction processor, random access memory, and data file memory;

means for reading a text file editable by a text editor and containing feature definitions expressed in a high-level feature definition language;

means for parsing the text file to generate internal representations of the feature definitions;

means for storing the internal representation in the random access memory;

means for converting the feature definitions into font table or subtable definitions;

means for writing out the table or subtable definitions into a font file stored in the data file memory;

means for processing a form of statement for defining substitution rules and a form of statement for defining positioning rules; and means for identifying a specific font table or subtable inferentially from a substitution rule statement and converting the substitution rule statement into a definition for the identified specific font table or subtable.

15. A system operable to add typographic features to a font, comprising:

a programmable computer having an instruction processor, random access memory, and data file memory;

means for reading a text file editable by a text editor and containing feature definitions expressed in a high-level feature definition language;

means for parsing the text file to generate internal representations of the feature definitions;

means for storing the internal representation in the random access memory;

means for converting the feature definitions into font table or subtable definitions;

means for writing out the table or subtable definitions into a font file stored in the data file memory;

means for processing a form of statement for defining substitution rules and a form of statement for defining positioning rules; and means for identifying a specific font table or subtable inferentially from a positioning rule statement and converting the positioning rule statement into a definition for the identified specific font table or subtable.

16. The system of claim 12, further comprising:

means for creating shared data structures without user intervention from the feature definitions and removing redundancies before writing out the feature definitions into an OpenType font file.

17. The system of claim 16, further comprising:

means for calculating the sizes of subtable format options for an OpenType table and selecting the smallest option for writing out corresponding feature definitions.

18. The system of claim 12, wherein the feature definition language is based on declarative logic statements, the system further comprising:

means for creating shared data structures without user intervention from the feature definitions and removing redundancies before writing out the feature definitions into an OpenType font file; and means for processing a definition of a liga feature.

19. A computer program product, tangibly stored on a computer-readable medium, for adding typographic features to a font, comprising instructions operable to cause a computer to:

read a feature file containing feature definitions expressed in a high-level feature definition language;

process a form of statement for defining substitution rules and a form of statement for defining positioning rules;

group the rules by type and determine an appropriate table format to use for each group of rules;

parse the feature file to generate internal representations of the feature definitions;

store the internal representation in a memory;

convert the feature definitions into font table or subtable definitions; and write out the table or subtable definitions into a font file.

20. The product of claim 19, further comprising instructions operable to cause a computer to:

reference a glyph aliasing database to derive a final glyph name from a user-friendly glyph name.

21. A computer program product, tangibly stored on a computer-readable medium, for adding typographic features to a font, comprising instructions operable to cause a computer to:

read a text file editable by a text editor and containing feature definitions expressed in a high-level feature definition language;

parse the text file to generate internal representations of the feature definitions;

store the internal representation in a memory;

convert the feature definitions into font table or subtable definitions;

write out the table or subtable definitions into a font file;

process a form of statement for defining substitution rules and a form of statement for defining positioning rules; and identify a specific font table or subtable inferentially from a substitution rule statement and convert the substitution rule statement into a definition for the identified specific font table or subtable.

22. A computer program product, tangibly stored on a computer-readable medium, for adding typographic features to a font, comprising instructions operable to cause a computer to:

read a text file editable by a text editor and containing feature definitions expressed in a high-level feature definition language;

parse the text file to generate internal representations of the feature definitions;

store the internal representation in a memory;

convert the feature definitions into font table or subtable definitions;

write out the table or subtable definitions into a font file;

process a form of statement for defining substitution rules and a form of statement for defining positioning rules; and identify a specific font table or subtable inferentially from a positioning rule statement and convert the positioning rule statement into a definition for the identified specific font table or subtable.

23. The product of claim 19, further comprising instructions operable to cause a computer to:

create shared data structures without user intervention from the feature definitions and removing redundancies before writing out the feature definitions into an OpenType font file.

24. The product of claim 23, further comprising instructions operable to cause a computer to:

calculate the sizes of subtable format options for an OpenType table and selecting the smallest option for writing out corresponding feature definitions.

25. The product of claim 19, wherein the feature definition language is based on declarative logic statements, the product further comprising instructions operable to cause a computer to:

create shared data structures without user intervention from the feature definitions and removing redundancies before writing out the feature definitions into an OpenType font file.

* * * * *

UNITED STATES PATENT AND TRADEMARK OFFICE
CERTIFICATE OF CORRECTION

PATENT NO. : 6,426,751 B1
DATED : July 30, 2002
INVENTOR(S) : Patel et al.

It is certified that error appears in the above-identified patent and that said Letters Patent is hereby corrected as shown below:

Title page,
Item [56], References Cited, OTHER PUBLICATIONS, please correct the following:
"Apple Computer," 1st reference, change "www./fonts.apple.com/tooldir/" to
-- www./fonts.apple.com/Tools/tooldir/ -- and change "published" to -- (published --;
"Apple Computer," 2nd reference, delete "." after "com", and delete the space before "tooldir";
"Apple Computer," 6th reference, change "Chapómrt.html" to -- Chap6mort.html --;
"Apple Computer," 7th reference, change "/RMO6/" to -- /RM06/ --, and between "1996" and ".", insert -- ) --; and
After *Assistant Examiner*, please change "J. F. Cunningham" to -- G. F. Cunningham --;

Column 90,
Line 58, change "rule" to -- rules --;

Column 91,
Line 58, replace "The method of claim 3, wherein the definition of a liga feature is expressed in the feature definition language as a feature block enclosing substitution rules." with
-- The method of claim 3, wherein the feature definitions include a definition of a liga feature; and
    wherein the definition of a liga feature is expressed in the feature definition language as a feature block enclosing substitution rules. --;

Line 61, replace "The method of claim 3, wherein the definition of a liga feature comprises a substitution rule of the form "substitute <glyph sequence> by <glyph>", where <glyph sequence> contains a glyph class, the method comprising:
    enumerating all specific glyph sequences defined by <glyph sequence> as glyph sequences that do not contain a glyph class." with
-- The method of claim 3, wherein the feature definitions include a definition of a liga feature; and wherein the definition of a liga feature comprises a substitution rule of the form "substitute <glyph sequence> by <glyph>", where <glyph sequence> contains a glyph class, the method comprising:

UNITED STATES PATENT AND TRADEMARK OFFICE
CERTIFICATE OF CORRECTION

PATENT NO.    : 6,426,751 B1
DATED         : July 30, 2002
INVENTOR(S)   : Patel et al.

It is certified that error appears in the above-identified patent and that said Letters Patent is hereby corrected as shown below:

Column 91 (cont'd),
enumerating all specific glyph sequences defined by <glyph sequence> as glyph sequences that do not contain a glyph class. --

Signed and Sealed this

Twenty-seventh Day of April, 2004

JON W. DUDAS
*Acting Director of the United States Patent and Trademark Office*